(12) United States Patent
Chang et al.

(10) Patent No.: US 11,743,336 B2
(45) Date of Patent: Aug. 29, 2023

(54) METHOD AND SYSTEM FOR OPERATING AN ELECTRONIC DEVICE

(71) Applicant: YUNDING NETWORK TECHNOLOGY (BEIJING) CO., LTD., Beijing (CN)

(72) Inventors: Wei Chang, Beijing (CN); Xunlong Zhuo, Beijing (CN); Junyi Li, Beijing (CN); Shuwen Zhou, Beijing (CN); Dongliang Chen, Beijing (CN); Zhigang Cao, Beijing (CN); Binghui Peng, Beijing (CN); Hao Tang, Beijing (CN)

(73) Assignee: YUNDING NETWORK TECHNOLOGY (BEIJING) CO., LTD., Beijing (CN)

( * ) Notice: Subject to any disclaimer, the term of this patent is extended or adjusted under 35 U.S.C. 154(b) by 215 days.

(21) Appl. No.: 17/141,189

(22) Filed: Jan. 4, 2021

(65) Prior Publication Data

US 2021/0126976 A1 Apr. 29, 2021

Related U.S. Application Data

(63) Continuation of application No. PCT/CN2019/094682, filed on Jul. 4, 2019.

(30) Foreign Application Priority Data

Jul. 4, 2018 (CN) .......................... 201810723796.1
Aug. 3, 2018 (CN) .......................... 201810876628.6
(Continued)

(51) Int. Cl.
 H04L 67/125 (2022.01)
 G16Y 20/10 (2020.01)
(Continued)

(52) U.S. Cl.
 CPC .......... *H04L 67/125* (2013.01); *E05B 39/007* (2013.01); *G16Y 20/10* (2020.01);
(Continued)

(58) Field of Classification Search
 CPC ...... H04L 67/125; G16Y 20/10; G16Y 20/20; H04W 12/106
(Continued)

(56) References Cited

U.S. PATENT DOCUMENTS

2005/0204348 A1 9/2005 Horning et al.
2015/0229713 A1 8/2015 Lu et al.
(Continued)

FOREIGN PATENT DOCUMENTS

CN 2494867 Y 6/2002
CN 1361618 A 7/2002
(Continued)

OTHER PUBLICATIONS

International Search Report in PCT/CN2019/094682 dated Sep. 29, 2019, 4 pages.
(Continued)

*Primary Examiner* — Sibte H Bukhari
(74) *Attorney, Agent, or Firm* — Metis IP LLC

(57) ABSTRACT

A method and system for operating an electronic device are provided. The method may include one or more of the following operations. At least one request related to an electronic device may be transmitted. The at least one request includes a controlling request, a communication protocol determining request, or a firmware upgrade request. Operating data generated based on the at least one request may be obtained. The electronic device may be operated based on the operating data.

8 Claims, 48 Drawing Sheets

(30) Foreign Application Priority Data

| | | | |
|---|---|---|---|
| Nov. 30, 2018 | (CN) | ...................... | 201811452255.6 |
| Dec. 14, 2018 | (CN) | ...................... | 201811533840.9 |
| Dec. 14, 2018 | (CN) | ...................... | 201811534620.8 |
| Dec. 29, 2018 | (CN) | ...................... | 201811641072.9 |
| Jan. 23, 2019 | (CN) | ...................... | 201910062844.1 |
| Jan. 31, 2019 | (CN) | ...................... | 201910097384.6 |

(51) Int. Cl.
   *G16Y 20/20* (2020.01)
   *H04W 12/106* (2021.01)
   *E05B 39/00* (2006.01)
   *H04L 41/082* (2022.01)
   *H04W 88/16* (2009.01)
   *E05B 45/06* (2006.01)

(52) U.S. Cl.
   CPC ............ *G16Y 20/20* (2020.01); *H04L 41/082* (2013.01); *H04W 12/106* (2021.01); *H04W 88/16* (2013.01); *E05B 2045/064* (2013.01)

(58) Field of Classification Search
   USPC ........................................................ 709/208
   See application file for complete search history.

(56) References Cited

U.S. PATENT DOCUMENTS

| | | | | |
|---|---|---|---|---|
| 2015/0378330 | A1* | 12/2015 | Xi | G05B 15/02 700/11 |
| 2016/0232807 | A1* | 8/2016 | Ghaffari | A61B 5/389 |

FOREIGN PATENT DOCUMENTS

| | | | |
|---|---|---|---|
| CN | 1566604 | A | 1/2005 |
| CN | 1822015 | A | 8/2006 |
| CN | 101005588 | A | 7/2007 |
| CN | 101080104 | A | 11/2007 |
| CN | 101436141 | A | 5/2009 |
| CN | 101510475 | A | 8/2009 |
| CN | 201605911 | U | 10/2010 |
| CN | 101917656 | A | 12/2010 |
| CN | 201991329 | U | 9/2011 |
| CN | 202000860 | U | 10/2011 |
| CN | 102547691 | A | 7/2012 |
| CN | 102811187 | A | 12/2012 |
| CN | 102857566 | A | 1/2013 |
| CN | 103117857 | A | 5/2013 |
| CN | 203008705 | U | 6/2013 |
| CN | 103297524 | A | 9/2013 |
| CN | 103530917 | A | 1/2014 |
| CN | 103744306 | A | 4/2014 |
| CN | 103927849 | A | 7/2014 |
| CN | 104125208 | A | 10/2014 |
| CN | 104144149 | A | 11/2014 |
| CN | 104166565 | A | 11/2014 |
| CN | 104167040 | A | 11/2014 |
| CN | 204046642 | U | 12/2014 |
| CN | 104570755 | A | 4/2015 |
| CN | 104574771 | A | 4/2015 |
| CN | 104656585 | A | 5/2015 |
| CN | 104915591 | A | 9/2015 |
| CN | 105184912 | A | 12/2015 |
| CN | 105471982 | A | 4/2016 |
| CN | 105608832 | A | 5/2016 |
| CN | 105701372 | A | 6/2016 |
| CN | 105975241 | A | 9/2016 |
| CN | 205563764 | U | 9/2016 |
| CN | 205827133 | U | 12/2016 |
| CN | 106412121 | A | 2/2017 |
| CN | 106484471 | A | 3/2017 |
| CN | 106548526 | A | 3/2017 |
| CN | 106599675 | A | 4/2017 |
| CN | 106846756 | A | 6/2017 |
| CN | 106850361 | A | 6/2017 |
| CN | 206282375 | U | 6/2017 |
| CN | 107015879 | A | 8/2017 |
| CN | 107172039 | A | 9/2017 |
| CN | 107231473 | A | 10/2017 |
| CN | 107301030 | A | 10/2017 |
| CN | 107343160 | A | 11/2017 |
| CN | 107508919 | A | 12/2017 |
| CN | 107741841 | A | 2/2018 |
| CN | 107748633 | A | 3/2018 |
| CN | 108092884 | A | 5/2018 |
| CN | 208014035 | U | 10/2018 |
| CN | 109083503 | A | 12/2018 |
| KR | 20070045041 | A | 5/2007 |
| KR | 20140004368 | A | 1/2014 |
| WO | 2008060060 | A1 | 5/2008 |

OTHER PUBLICATIONS

Written Opinion in PCT/CN2019/094682 dated Sep. 29, 2019, 4 pages.
First Office Action in Chinese Application No. 201810876628.6 dated Dec. 27, 2019, 22 pages.
First Office Action in Chinese Application No. 201919097384.6 dated Jun. 11, 2020, 18 pages.
First Office Action in Chinese Application No. 201811452255.6 dated Oct. 28, 2020, 15 pages.
First Office Action in Chinese Application No. 201811533840.9 dated Nov. 3, 2020, 19 pages.
First Office Action in Chinese Application No. 201811534620.8 dated Dec. 23, 2020, 15 pages.
"The fingerprint lock opened the door, recognized for a long time, but did not open, how about the finger vein lock?", Web page <https://zhidao.baidu.com/question/438922784035641004.html>, Nov. 1, 2018.
"The low temperature touch screen fails, what should I do?", Web page <https://zhidao.baidu.com/question/455681895.html>, Oct. 3, 2018.
The Second Office Action in Chinese Application No. 201811641072.9 dated Jun. 2, 2021, 18 pages.
The Third Office Action in Chinese Application No. 201811641072.9 dated Nov. 22, 2021, 16 pages.

* cited by examiner

1100

```
┌─────────────────────────────────────┐
│ Obtaining information of a firmware │  ~ 1110
│   upgrade package from a server     │
└─────────────────────────────────────┘
                  │
                  ▼
┌─────────────────────────────────────┐
│ Obtaining data of the upgrade       │
│ version of the firmware to be       │
│ upgraded, the digest, and the       │
│ label of the digest, and verifying  │  ~ 1120
│ the upgrade version of the firmware │
│ to be upgraded based public key of  │
│ the at least one public-private key │
│          pair and the label         │
└─────────────────────────────────────┘
```

```
┌─────────────────────────────────────┐
│  Obtaining firmware upgrade package │ ─── 1210
│       information from a server     │
└─────────────────────────────────────┘
                  │
                  ▼
┌─────────────────────────────────────┐
│ Determine whether the accuracy of the upgrade │
│ version of the firmware to be upgraded is not │ ─── 1220
│ less than a first threshold using public keys in │
│ two or more public-private key pairs and a label │
└─────────────────────────────────────┘
                  │
                  ▼
┌─────────────────────────────────────┐
│ Verifying the upgrade version of the firmware to │
│ be upgraded in response to that the accuracy is │ ─── 1230
│       not less than the first threshold        │
└─────────────────────────────────────┘
```

```
Receiving an access request of a control
page of the second electronic device sent      ~ 1910
by the first electronic device
                    ↓
transmit page data of the control page of
the second electronic device to the first      ~ 1920
electronic device
```

```
Request Obtaining     ~ 2010
Unit
        ↓
Data Transmitting     ~ 2020
Unit
```

Determining a product of the value of the noise data and the time adjustment parameter as an initial value of the output volume — 3810

Determining a preset volume level that is closest to the initial value of the output volume from the plurality of preset volume levels — 3820

Designating the preset volume level as the output volume — 3830

FIG. 38

METHOD AND SYSTEM FOR OPERATING AN ELECTRONIC DEVICE

CROSS REFERENCE

This application is a Continuation of International Application No. PCT/CN2019/094682, filed on Jul. 4, 2019, which claims priority to Chinese Patent Application No. 201810723796.1, filed on Jul. 4, 2018, Chinese Patent Application No. 201811533840.9, filed on Dec. 14, 2018, Chinese Patent Application No. 201811534620.8, filed on Dec. 14, 2018, Chinese Patent Application No. 201811641072.9, filed on Dec. 29, 2018, Chinese Patent Application No. 201910062844.1, filed on Jan. 23, 2019, Chinese Patent Application No. 201811452255.6, filed on Nov. 30, 2018, Chinese Patent Application No. 201810876628.6, filed on Aug. 3, 2018, and Chinese Patent Application No. 201910097384.6, filed on Jan. 31, 2019, the entire contents of which are hereby incorporated by reference.

TECHNICAL FIELD

The present disclosure generally relates to systems and methods for device controlling, and in particular, to systems and methods for operating an electronic device, such as but not limited to an electronic lock.

BACKGROUND

With the development of technology, people's lives have been enriched by various types electronic devices (such as smartphone, smart home devices, etc.). How to effectively control and/or operate the electronic devices is very important for improving the user experience.

SUMMARY

In one aspect of the present disclosure, a method for operating an electronic device is provided. The method may be implemented on at least one electronic device, each of which has at least one processor and a storage. The method may include one or more of the following operations: transmitting at least one request related to an electronic device, wherein the at least one request includes a controlling request, a communication protocol determining request, or a firmware upgrade request; obtaining operating data, wherein the operating data is generated based on the at least one request; and/or operating the electronic device based on the operating data.

In some embodiments, the at least one request includes the controlling request, which includes an access request of a control page of a second electronic device, which sent by a first electronic device, and the operating data includes page data of the control page of the second electronic device, the operating the electronic device based on the operating data may include one or more of the following operations: displaying the control page of the second electronic device by the first electronic device; and/or controlling, based on an operation generated by a user on an operation object of the control page, the second electronic device by performing a preset instruction corresponding to the operation object.

In some embodiments, the electronic device includes a gateway, the communication protocol determining request includes device information of the gateway, the obtaining operating data may include one or more of the following operations: obtaining configuration information corresponding to the device information, wherein the configuration information includes information of a first communication protocol to be configured by the gateway and information of a first cloud platform. The operating the electronic device based on the operating data may include one or more of the following operations: determining a first communication protocol component corresponding to the information of the first communication protocol; and/or connecting the first cloud platform based on the first communication protocol component.

In some embodiments, the at least one request includes the firmware upgrading request, the obtaining operating data may include one or more of the following operations: obtaining information of the firmware upgrade package, wherein the information of the firmware upgrade package includes data of a upgrade version of a firmware to be upgraded, a digest of the upgrade version of the firmware to be upgraded, the digest being labelled by a private key of at least one public-private key pair, and a label of the digest, and wherein the public-private key pair includes a public key which stored in the firmware, and a private key which stored in a server. The operating the electronic device comprises may include one or more of the following operations: verifying the upgrade version of the firmware to be upgraded based on the public key of the at least one public-private key pair and the label.

In another aspect of the present disclosure, a method for operating an electronic device is provided. The method may be implemented on at least one computing device, each of which has at least one processor and a storage. The method may include one or more of the following operations: obtaining at least one request related to an electronic device, wherein the at least one request includes a controlling request, a communication protocol determining request, or a firmware upgrading request; generating operating data based on the at least one request; and/or transmitting the operating data to the electronic device.

In some embodiments, the at least one request includes the controlling request, which includes an access request of a control page of a second electronic device, the access request is sent by a first electronic device, and the transmitting the operating data to the electronic device may include one or more of the following operations: transmitting page data of the control page of the second electronic device to the first electronic device.

In some embodiments, the electronic device includes a gateway, the communication protocol determining request includes device information of the gateway, the operating data includes configuration information corresponding to the device information, the generating operating data based on the at least one request may include one or more of the following operations: determining the configuration information corresponding to the device information, wherein the configuration information includes information of a first communication protocol to be configured by the gateway and information of a first cloud platform. The transmitting the operating data to the electronic device may include one or more of the following operations: transmitting the configuration information to the gateway.

In some embodiments, the at least one request includes the firmware upgrading request, the operating data includes information of the firmware upgrade package, the generating operating data based on the at least one request may include one or more of the following operations: determining a firmware to be upgraded; obtaining at least one public-private key pair, wherein the public-private key pair includes a public key stored in the firmware and a private key stored in a server; obtaining a digest of an upgrade version of the firmware to be upgraded; labeling the digest by the private key of the at least one public-private key pair; and/or generating the information of a firmware upgrade package, wherein the information of the firmware upgrade package includes data of the upgrade version of the firmware to be upgraded, the digest, and a label of the digest. The transmitting the operating data to the electronic device may include one or more of the following operations: transmitting the information of the firmware upgrade package to the electronic device.

In another aspect of the present disclosure, a method for operating an electronic device is provided. The method may be implemented on at least one electronic device, each of which has at least one processor and a storage. The method may include one or more of the following operations: obtaining sensing data of the electronic device and/or sensing data of a surroundings of the electronic device; determining whether the sensing data satisfy a preset condition; and/or in response to a determination that the sensing data satisfies a preset condition, controlling the electronic device to execute a preset operation.

In some embodiments, the obtaining sensing data may include one or more of the following operations: obtaining a real-time acceleration of the electronic device from at least one sensor; the determining whether the sensing data satisfy a preset condition may include one or more of the following operations: determining whether the electronic device is being pried based on the real-time acceleration; and/or the controlling the electronic device to execute a preset operation may include one or more of the following operations: in response to a determination that the electronic device is being pried, transmitting an alarm signal to an alertor to trigger the alertor to raise an alarm.

In some embodiments, the electronic device includes an intelligent lock; the obtaining sensing data may include one or more of the following operations: obtaining an indoor temperature from at least one sensor; the determining whether the sensing data satisfy a preset condition may include one or more of the following operations; determining whether the indoor temperature is greater than or equal to a temperature threshold; and/or the controlling the electronic device to execute a preset operation may include one or more of the following operations: in response to a determination that the indoor temperature is greater than or equal to a temperature threshold, unlocking the intelligent lock.

In some embodiments, the sensing data includes noise data of a current surroundings of the electronic device, the method may further include one or more of the following operations: obtaining a current time; determining a preset volume control rule matched with the current time; determining, based on the preset volume control rule, whether an output volume corresponding to the current time is a fixed preset volume; in response to a determination that the output volume corresponding to the current time is the fixed preset volume, outputting a volume based on the fixed preset volume; and/or in response to a determination that the output volume corresponding to the current time is not the fixed preset volume, outputting a volume based on the noise data.

In some embodiments, the method may further include one or more of the following operations: determining whether the electronic device is abnormal; the obtaining sensing data may include one or more of the following operations: in response to a determination that the electronic device is abnormal, obtaining at least one target environmental parameter of a current surroundings of the electronic device, wherein the at least one target environmental parameter is related to the abnormality of the electronic device; the determining whether the sensing data satisfy a preset condition may include one or more of the following operations; determining whether an abnormality of the electronic device is caused by the at least one target environmental parameter; and/or the controlling the electronic device to execute a preset operation may include one or more of the following operations: in response to a determination that the abnormality of the electronic device is caused by the at least one target environmental parameter, reminding a user that the abnormality of the electronic device is related to the at least one target environmental parameter.

In another aspect of the present disclosure, a system for operating an electronic device is provided. The system may include at least one storage medium, and at least one processor in communication with the storage medium. The at least one storage medium may store a set of instructions. When executing the set of instructions, the at least one processor may be configured to direct the system to perform one or more of the following operations: transmitting at least one request related to an electronic device, wherein the at least one request includes a controlling request, a communication protocol determining request, or a firmware upgrade request; obtaining operating data, wherein the operating data is generated based on the at least one request; and/or operating the electronic device based on the operating data.

In some embodiments, the at least one request includes the controlling request, which includes an access request of a control page of a second electronic device, which sent by a first electronic device, and the operating data includes page data of the control page of the second electronic device, and to operate the electronic device based on the operating data, the at least one processor is further configured to direct the system to perform one or more of the following operations: displaying the control page of the second electronic device by the first electronic device; and/or controlling, based on an operation generated by a user on an operation object of the control page, the second electronic device by performing a preset instruction corresponding to the operation object.

In some embodiments, the electronic device includes a gateway, the communication protocol determining request includes device information of the gateway, to obtain the operating data, the at least one processor is further configured to direct the system to perform one or more of the following operations: obtaining configuration information corresponding to the device information, wherein the configuration information includes information of a first communication protocol to be configured by the gateway and information of a first cloud platform. To operate the electronic device based on the operating data, the at least one processor is further configured to direct the system to perform determining a first communication protocol component corresponding to the information of the first communication protocol; and/or connecting the first cloud platform based on the first communication protocol component.

In some embodiments, the at least one request includes the firmware upgrading request, and to obtain the operating data, the at least one processor is further configured to direct the system to perform one or more of the following operations: obtaining information of the firmware upgrade package, wherein the information of the firmware upgrade package includes data of a upgrade version of a firmware to be upgraded, a digest of the upgrade version of the firmware to be upgraded, the digest being labelled by a private key of at least one public-private key pair, and a label of the digest, and wherein the public-private key pair includes a public key which stored in the firmware, and a private key which stored in a server. To operate the electronic device, the at least one processor is further configured to direct the system to perform one or more of the following operations: verifying the upgrade version of the firmware to be upgraded based on the public key of the at least one public-private key pair and the label.

In another aspect of the present disclosure, a system for operating an electronic device is provided. The system may include at least one storage medium, and at least one processor in communication with the storage medium. The at least one storage medium may store a set of instructions. When executing the set of instructions, the at least one processor may be configured to direct the system to perform one or more of the following operations: obtaining at least one request related to an electronic device, wherein the at least one request includes a controlling request, a communication protocol determining request, or a firmware upgrading request; generating operating data based on the at least one request; and/or transmitting the operating data to the electronic device.

In some embodiments, the at least one request includes the controlling request, which includes an access request of a control page of a second electronic device, the access request is sent by a first electronic device, to transmit the operating data to the electronic device, the at least one processor is further configured to direct the system to perform one or more of the following operations: transmitting page data of the control page of the second electronic device to the first electronic device.

In some embodiments, the electronic device includes a gateway, the communication protocol determining request includes device information of the gateway, the operating data includes configuration information corresponding to the device information, to generate the operating data based on the at least one request, the at least one processor is further configured to direct the system to perform one or more of the following operations: determining the configuration information corresponding to the device information, wherein the configuration information includes information of a first communication protocol to be configured by the gateway and information of a first cloud platform. To transmit the operating data to the electronic device, the at least one processor is further configured to direct the system to perform one or more of the following operations: transmitting the configuration information to the gateway.

In some embodiments, the at least one request includes the firmware upgrading request, the operating data includes information of the firmware upgrade package, to generate the operating data based on the at least one request, the at least one processor is further configured to direct the system to perform one or more of the following operations: determining a firmware to be upgraded; obtaining at least one public-private key pair, wherein the public-private key pair includes a public key stored in the firmware and a private key stored in a server; obtaining a digest of an upgrade version of the firmware to be upgraded; labeling the digest by the private key of the at least one public-private key pair; and/or generating the information of a firmware upgrade package, wherein the information of the firmware upgrade package includes data of the upgrade version of the firmware to be upgraded, the digest, and a label of the digest. To transmit the operating data to the electronic device, the at least one processor is further configured to direct the system to perform one or more of the following operations: transmitting the information of the firmware upgrade package to the electronic device.

In another aspect of the present disclosure, a system for operating an electronic device is provided. The system may include at least one storage medium, and at least one processor in communication with the storage medium. The at least one storage medium may store a set of instructions. When executing the set of instructions, the at least one processor may be configured to direct the system to perform one or more of the following operations: obtaining sensing data of the electronic device and/or sensing data of a surroundings of the electronic device; determining whether the sensing data satisfy a preset condition; and/or in response to a determination that the sensing data satisfies a preset condition, controlling the electronic device to execute a preset operation.

In some embodiments, to obtain the sensing data, the at least one processor is further configured to direct the system to perform one or more of the following operations: obtaining a real-time acceleration of the electronic device from at least one sensor. To determine whether the sensing data satisfy a preset condition, the at least one processor is further configured to direct the system to perform one or more of the following operations: determining whether the electronic device is being pried based on the real-time acceleration. To control the electronic device to execute a preset operation, the at least one processor is further configured to direct the system to perform one or more of the following operations: in response to a determination that the electronic device is being pried, transmitting an alarm signal to an alertor to trigger the alertor to raise an alarm.

In some embodiments, the electronic device includes an intelligent lock, and to obtain the sensing data, the at least one processor is further configured to direct the system to perform one or more of the following operations: obtaining an indoor temperature from at least one sensor. To determine whether the sensing data satisfy a preset condition, the at least one processor is further configured to direct the system to perform one or more of the following operations: determining whether the indoor temperature is greater than or equal to a temperature threshold. To control the electronic device to execute a preset operation, the at least one processor is further configured to direct the system to perform one or more of the following operations: in response to a determination that the indoor temperature is greater than or equal to a temperature threshold, unlocking the intelligent lock.

In some embodiments, the sensing data includes noise data of a current surroundings of the electronic device, and the at least one processor is further configured to direct the system to perform one or more of the following operations: obtaining a current time; determining a preset volume control rule matched with the current time; determining, based on the preset volume control rule, whether an output volume corresponding to the current time is a fixed preset volume; in response to a determination that the output volume corresponding to the current time is the fixed preset volume, outputting a volume based on the fixed preset volume; and/or in response to a determination that the output volume corresponding to the current time is not the fixed preset volume, outputting a volume based on the noise data.

In some embodiments, the at least one processor is further configured to direct the system to perform one or more of the following operations: determining whether the electronic device is abnormal. To obtain the sensing data, the at least one processor is further configured to direct the system to perform one or more of the following operations: in response to a determination that the electronic device is abnormal, obtaining at least one target environmental parameter of a current surroundings of the electronic device, wherein the at least one target environmental parameter is related to the abnormality of the electronic device. To determine whether the sensing data satisfy a preset condition, the at least one processor is further configured to direct the system to perform one or more of the following operations; determining whether an abnormality of the electronic device is caused by the at least one target environmental parameter. To control the electronic device to execute a preset operation, the at least one processor is further configured to direct the system to perform one or more of the following operations: in response to a determination that the abnormality of the electronic device is caused by the at least one target environmental parameter, reminding a user that the abnormality of the electronic device is related to the at least one target environmental parameter.

In another aspect of the present disclosure, a non-transitory computer-readable storage medium is provided. The non-transitory computer-readable storage medium storing instructions, the instructions, when accessed by at least one processor of an electronic device, cause the electronic device to perform one or one of the following operations: transmitting at least one request related to an electronic device, wherein the at least one request includes a controlling request, a communication protocol determining request, or a firmware upgrade request; obtaining operating data, wherein the operating data is generated based on the at least one request; and/or operating the electronic device based on the operating data.

In some embodiments, the at least one request includes the controlling request, which includes an access request of a control page of a second electronic device, which sent by a first electronic device, and the operating data includes page data of the control page of the second electronic device, and to operate the electronic device based on the operating data, the instructions further cause the electronic device to perform one or more of the following operations: displaying the control page of the second electronic device by the first electronic device; and/or controlling, based on an operation generated by a user on an operation object of the control page, the second electronic device by performing a preset instruction corresponding to the operation object In some embodiments, the electronic device includes a gateway, the communication protocol determining request includes device information of the gateway, to obtain the operating data, the instructions further cause the electronic device to perform one or more of the following operations: obtaining configuration information corresponding to the device information, wherein the configuration information includes information of a first communication protocol to be configured by the gateway and information of a first cloud platform. To operate the electronic device based on the operating data, the instructions further cause the electronic device to perform determining a first communication protocol component corresponding to the information of the first communication protocol; and/or connecting the first cloud platform based on the first communication protocol component.

In some embodiments, the at least one request includes the firmware upgrading request, and to obtain the operating data, the instructions further cause the electronic device to perform one or more of the following operations: obtaining information of the firmware upgrade package, wherein the information of the firmware upgrade package includes data of a upgrade version of a firmware to be upgraded, a digest of the upgrade version of the firmware to be upgraded, the digest being labelled by a private key of at least one public-private key pair, and a label of the digest, and wherein the public-private key pair includes a public key which stored in the firmware, and a private key which stored in a server. To operate the electronic device, the instructions further cause the electronic device to perform one or more of the following operations: verifying the upgrade version of the firmware to be upgraded based on the public key of the at least one public-private key pair and the label.

In another aspect of the present disclosure, a non-transitory computer-readable storage medium is provided. The non-transitory computer-readable storage medium storing instructions, the instructions, when accessed by at least one processor of a computing device, cause the computing device to perform one or one of the following operations: obtaining at least one request related to an electronic device, wherein the at least one request includes a controlling request, a communication protocol determining request, or a firmware upgrading request; generating operating data based on the at least one request; and/or transmitting the operating data to the electronic device.

In some embodiments, the at least one request includes the controlling request, which includes an access request of a control page of a second electronic device, the access request is sent by a first electronic device, to transmit the operating data to the electronic device, the instructions further cause the computing device to perform one or more of the following operations: transmitting page data of the control page of the second electronic device to the first electronic device.

In some embodiments, the electronic device includes a gateway, the communication protocol determining request includes device information of the gateway, the operating data includes configuration information corresponding to the device information, to generate the operating data based on the at least one request, the instructions further cause the computing device to direct the system to perform one or more of the following operations: determining the configuration information corresponding to the device information, wherein the configuration information includes information of a first communication protocol to be configured by the gateway and information of a first cloud platform. To transmit the operating data to the electronic device, the instructions further cause the computing device to perform one or more of the following operations: transmitting the configuration information to the gateway.

In some embodiments, the at least one request includes the firmware upgrading request, the operating data includes information of the firmware upgrade package, to generate the operating data based on the at least one request, the instructions further cause the computing device to perform one or more of the following operations: determining a firmware to be upgraded; obtaining at least one public-private key pair, wherein the public-private key pair includes a public key stored in the firmware and a private key stored in a server; obtaining a digest of an upgrade version of the firmware to be upgraded; labeling the digest by the private key of the at least one public-private key pair; and/or generating the information of a firmware upgrade package, wherein the information of the firmware upgrade package includes data of the upgrade version of the firmware to be upgraded, the digest, and a label of the digest. To transmit the operating data to the electronic device, the instructions further cause the computing device to perform one or more of the following operations: transmitting the information of the firmware upgrade package to the electronic device.

In another aspect of the present disclosure, a non-transitory computer-readable storage medium is provided. The non-transitory computer-readable storage medium storing instructions, the instructions, when accessed by at least one processor of an electronic device, cause the electronic device to perform one or one of the following operations: obtaining sensing data of the electronic device and/or sensing data of a surroundings of the electronic device; determining whether the sensing data satisfy a preset condition; and/or in response to a determination that the sensing data satisfies a preset condition, controlling the electronic device to execute a preset operation.

In some embodiments, to obtain the sensing data, the at least one processor is further configured to direct the system to perform one or more of the following operations: obtaining a real-time acceleration of the electronic device from at least one sensor. To determine whether the sensing data satisfy a preset condition, the at least one processor is further configured to direct the system to perform one or more of the following operations: determining whether the electronic device is being pried based on the real-time acceleration. To control the electronic device to execute a preset operation, the at least one processor is further configured to direct the system to perform one or more of the following operations: in response to a determination that the electronic device is being pried, transmitting an alarm signal to an alertor to trigger the alertor to raise an alarm.

In some embodiments, the electronic device includes an intelligent lock, and to obtain the sensing data, the instructions further cause the electronic device to perform one or more of the following operations: obtaining an indoor temperature from at least one sensor. To determine whether the sensing data satisfy a preset condition, the instructions further cause the electronic device to perform one or more of the following operations; determining whether the indoor temperature is greater than or equal to a temperature threshold. To control the electronic device to execute a preset operation, the instructions further cause the electronic device to perform one or more of the following operations: in response to a determination that the indoor temperature is greater than or equal to a temperature threshold, unlocking the intelligent lock.

In some embodiments, the sensing data includes noise data of a current surroundings of the electronic device, and the instructions further cause the electronic device to perform one or more of the following operations: obtaining a current time; determining a preset volume control rule matched with the current time; determining, based on the preset volume control rule, whether an output volume corresponding to the current time is a fixed preset volume; in response to a determination that the output volume corresponding to the current time is the fixed preset volume, outputting a volume based on the fixed preset volume; and/or in response to a determination that the output volume corresponding to the current time is not the fixed preset volume, outputting a volume based on the noise data.

In some embodiments, the instructions further cause the electronic device to perform one or more of the following operations: determining whether the electronic device is abnormal. To obtain the sensing data, the instructions further cause the electronic device to perform one or more of the following operations: in response to a determination that the electronic device is abnormal, obtaining at least one target environmental parameter of a current surroundings of the electronic device, wherein the at least one target environmental parameter is related to the abnormality of the electronic device. To determine whether the sensing data satisfy a preset condition, the instructions further cause the electronic device to perform one or more of the following operations; determining whether an abnormality of the electronic device is caused by the at least one target environmental parameter. To control the electronic device to execute a preset operation, the instructions further cause the electronic device to perform one or more of the following operations: in response to a determination that the abnormality of the electronic device is caused by the at least one target environmental parameter, reminding a user that the abnormality of the electronic device is related to the at least one target environmental parameter.

In another aspect of the present disclosure, an anti-pry switch is provided. The anti-pry switch includes an annular capacitor with a through-hole in the middle; a core rod inserted into the through hole, being divided into a first segment and a second segment having unequal dielectric constants along an axial direction thereof, a capacitance value of the annular capacitor is a first capacitance value after the first segment being inserted into the through-hole, and the capacitance value of the annular capacitor is a second capacitance value after the second segment being inserted into the through-hole, the first capacitance value differs from the second capacitance value; a hold-down assembly, for contacting a first end of the core rod; and/or a spring assembly, for contacting a second end of the core rod, after the first end of the core rod is squeezed with the hold-down assembly, the first segment of the core rod is inserted through the through-hole, and after the hold-down assembly is away from the first end of the core rod, the second segment of the core rod is inserted through the through-hole.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 11 is a flowchart illustrating an exemplary process for verifying a firmware version according to some embodiments of the present disclosure;

FIG. 12 is a flowchart illustrating another exemplary process for verifying a firmware version according to some embodiments of the present disclosure;

FIG. 19 is a flowchart illustrating another exemplary process for controlling an electronic device according to some embodiments of the present disclosure;

FIG. 20 is a block diagram illustrating an exemplary computing device according to some embodiments of the present disclosure;

FIG. 38 is a flowchart illustrating an exemplary process for outputting the volume based on the fixed preset volume according to some embodiments of the present disclosure;

Figure 48:
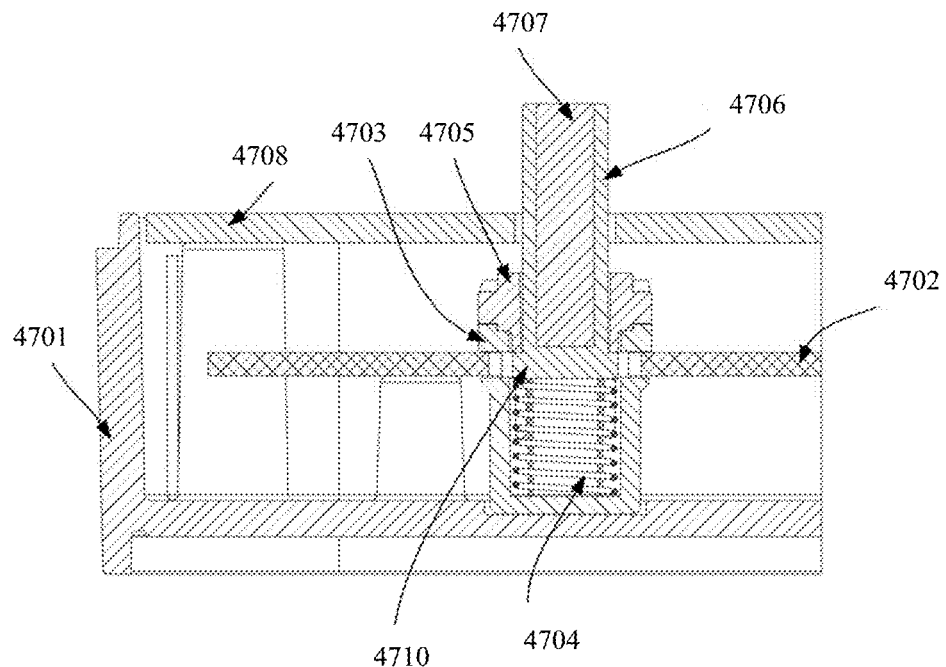
Figure 49:
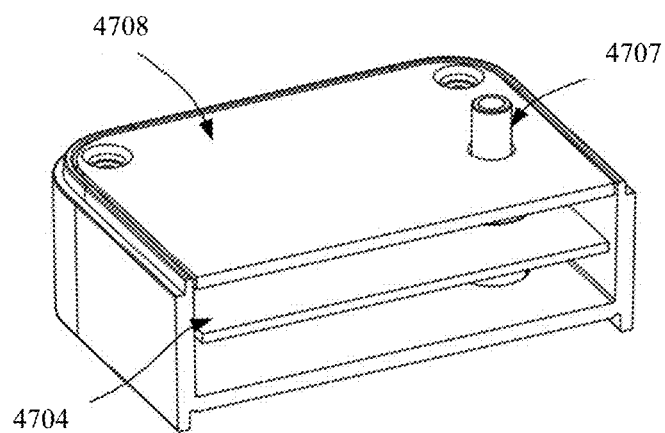
Figure 50:
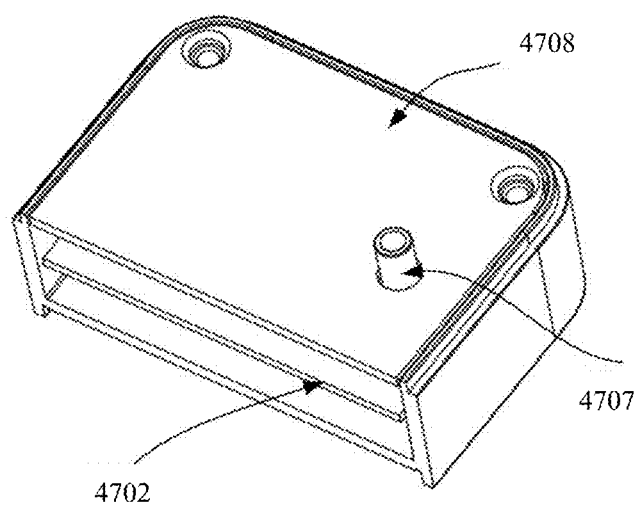

FIG. 48 a section view of an anti-pry switch according to some embodiments of the present disclosure;

FIG. 49 illustrates a schematic diagram of the anti-pry switch according to some embodiments of the present disclosure; and FIG. 50 illustrates another schematic diagram of the anti-pry switch according to some embodiments of the present disclosure.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Figure 1:
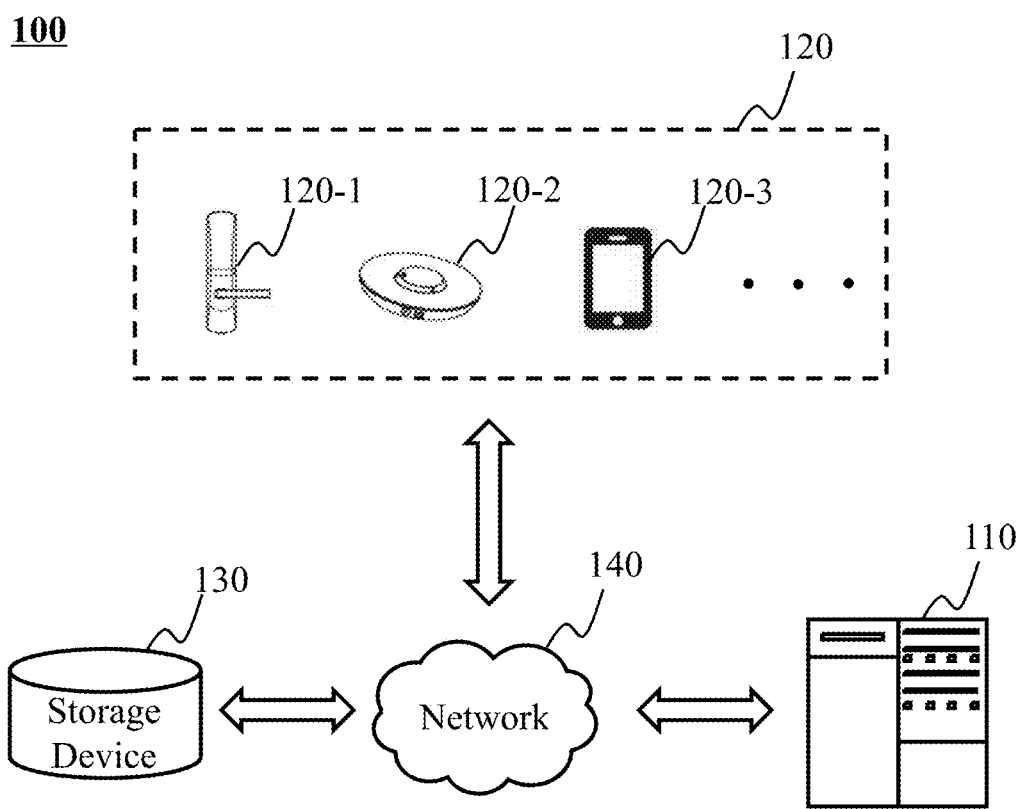
FIG. 1 is a schematic diagram illustrating an exemplary operating system according to some embodiments of the present disclosure.

Software modules/units/blocks configured for execution on computing devices (e.g., processing device 110 as illustrated in FIG. 1) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

FIG. 1 is a schematic diagram illustrating an exemplary operating system 100 according to some embodiments of the present disclosure. As illustrated, the operating system 100 may include a processing device 110, one or more electronic device 120, a storage device 130, and a network 140. The components in the operating system 100 may be connected in one or more of various ways. Merely by way of example, as illustrated in FIG. 1, the processing device 110 may be connected to the electronic device 120 through the network 140. As another example, the processing device 110 may be connected to the electronic device 120 directly as indicated by the bi-directional arrow in dotted lines linking the processing device 110 and the electronic device 120. As a further example, the storage device 130 may be connected to the processing device 110 directly or through the network 140. As still a further example, one or more electronic device 120 may be connected to the processing device 120 directly (as indicated by the bi-directional arrow in dotted lines linking the electronic device 130 and the processing device 110) or through the network 140.

The processing device 110 may process data and/or information obtained from the electronic device(s) 120, and/or the storage device 130. The data may include or relate to at least one request. For example, the processing device 110 may obtain at least one request from one or more electronic devices 120. The at least one request may include a controlling request, a communication protocol determining request, or a firmware upgrading request. As another example, the processing device 110 may generate operating data based on the at least one request. The operating data may include, for example, page data of a control page, configuration information, and/or information of a firmware upgrade package. Furthermore, the processing device 110 may transmit the operating data to one or more electronic devices. The one or more electronic device may be operated based on the operating data.

In some embodiments, the processing device 110 may be a single server, or a server group. The server group may be centralized or distributed. In some embodiments, the processing device 110 may be local or remote. For example, the processing device 110 may access information and/or data stored in the electronic device(s) 120, and/or the storage device 130 via the network 140. As another example, the processing device 110 may be directly connected to the electronic device(s) 120, and/or the storage device 130 to access stored information and/or data. In some embodiments, the processing device 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 110 may be implemented on a mobile device, for example, a smart phone. In some embodiments, the processing device 110 may be implemented on a computing device 200 having one or more components illustrated in FIG. 2 in the present disclosure.

The electronic device 120 may transmit data and/or information to the processing device 110, and obtain a processing result from the processing device 110. For example, the electronic device 120 may transmit a request such as a controlling request, a communication protocol determining request, a firmware upgrading request, or the like, or any combination thereof. The processing result may be operating data determined by the processing device 110 based on the request. For example, the processing result may include a control page of another electronic device. The electronic device 120 may control another electronic device based on the control page. As another example, the processing result may include configuration information of the electronic device 120. The electronic device 120 may determine a communication protocol based on the configuration information. As still another example, the processing result may include information of a firmware upgrade package.

The electronic device 120 may upgrade its own firmware after verifying the validity of the firmware upgrade package.

In some embodiments, the electronic device 120 may include a home device 120-1, a communication device 120-2, a mobile device 120-3, or the like, or any combination thereof. In some embodiments, the home device 120-1 may include an intelligent lock, a lamp, an air conditioner, an air cleaner, a television, a monitor, a floor mopping robot, an electric cooker, a fridge, a water heater, a washer, or the like, or any combination thereof. In certain embodiment, the home device 120-1 may include an intelligent. In some embodiments, the communication device 120-2 may include a router, a switch, a modem, an access point, a bridge, a gateway, an adapter, a network card, or the like, or any combination thereof. In certain embodiment, the communication device 120-2 may include a gateway. In some embodiments, the mobile device 120-3 may include a smartphone, a laptop computer, a tablet computer, a personal digital assistant (PDA), a smartwatch, an intelligent glass, a gaming device, a navigation device, a point of sale (POS) device, a virtual reality device, an augmented reality device, or the like, or any combination thereof.

In some embodiments, the electronic device 120 may obtain sensing data from one or more sensors. The sensor(s) may be a part of the electronic device 120, or may be installed remotely from the electronic device 120. Exemplary sensor may include an acceleration sensor, a velocity sensor, a gravity sensor, a temperature sensor, a humidity sensor, a noise sensor, an ultrasound sensor, an optical sensor, an infrared sensor, a laser sensor, or the like, or any combination thereof. In some embodiments, the electronic device 120 may execute a specified operation based on the sensing data obtained from the sensor(s). For example, based on an acceleration of the electronic device 120 (e.g., the intelligent lock) captured by an acceleration sensor, if a determination that the intelligent lock is being pried is made, the electronic device 120 (e.g., the intelligent lock) may generate an alarm. As another example, the electronic device 120 (e.g., the intelligent lock) may be unlocked if an indoor temperature captured by a temperature sensor is greater than or equal to a temperature threshold. As still another example, the electronic device 120 may output a volume based on noise data captured by a noise sensor. As still another example, the electronic device 120 may determine whether an abnormality of the electronic device 120 is caused by at least one environmental parameter captured by a temperature sensor and/or a humidity sensor.

The storage device 130 may store data and/or instructions. In some embodiments, the storage device 130 may store data obtained from the processing device 110 and/or the electronic device 120. In some embodiments, the storage device 130 may store data and/or instructions that the processing device 110 may execute or use to perform exemplary methods described in the present disclosure. In some embodiments, the storage device 130 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 140 to communicate with one or more components of the operating system 100 (e.g., the processing device 110, the electronic device(s) 120, etc.). One or more components of the operating system 100 may access the data or instructions stored in the storage device 130 via the network 140. In some embodiments, the storage device 130 may be directly connected to or communicate with one or more components of the operating system 100 (e.g., the processing device 110, the electronic device(s) 120, etc.). In some embodiments, the storage device 110 may be part of the processing device 110, or may be part of the electronic device 120.

The network 140 may include any suitable network that can facilitate the exchange of information and/or data for the operating system 100. In some embodiments, one or more components of the operating system 100 (e.g., the processing device 110, the electronic device(s) 120, or the storage device 130) may communicate information and/or data with one or more other components of the operating system 100 via the network 140. For example, the processing device 110 may obtain at least one request from the electronic device(s) 120 via the network 140. In some embodiments, the network 140 may be any type of wired or wireless network, or a combination thereof. The network 140 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 140 may include a cable network, a wireline network, a fiber-optic network, a telecommunications network, an intranet, a wireless local area network (WLAN), a metropolitan area network (MAN), a public telephone switched network (PSTN), a general package radio service (GPRS), a mobile communication network (e.g., 2G, 3G, 4G, 5G, 6G), a narrow band internet of things (NB-IoT), a LoRa, a Bluetooth™ network, a ZigBee™ network, a near field communication (NFC) network, or the like, or any combination thereof. In some embodiments, the network 140 may include one or more network access points. For example, the network 140 may include wired and/or wireless network access points such as base stations and/or internet exchange points through which one or more components of the operating system 100 may be connected to the network 140 to exchange data and/or information.

Figure 2:
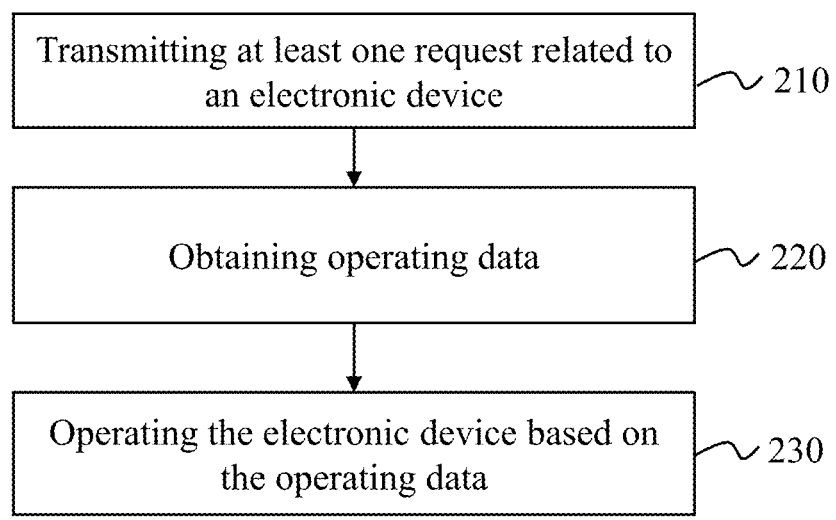
FIG. 2 is a flowchart illustrating an exemplary process for operating an electronic device according to some embodiments of the present disclosure.

FIG. 2 is a flowchart illustrating an exemplary process for operating an electronic device according to some embodiments of the present disclosure. In some embodiments, one or more operations of process 200 may be implemented in the operating system 100 illustrated in FIG. 1. For example, the process 200 may be implemented on the electronic device 120 of the operating system 100. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 2 and described below is not intended to be limiting.

In 210, the electronic device 120 (e.g., a first communication module 310) may transmit at least one request related to the electronic device, for example, the electronic device 120.

In some embodiments, the at least one request may include a controlling request, a communication protocol determining request, or a firmware upgrading request. In some embodiments, the controlling request may include an access request of a control page of another electronic device. For example, a first electronic device (e.g., a smartphone) may transmit the controlling request in order to control a second electronic device (e.g., an intelligent lock). In some embodiments, the communication protocol determining request may include device information of the electronic device 120, for example, a gateway. The device information may include information related to a product serial number, information related to a version number, information related to a model, or the like. In some embodiments, the firmware upgrading request may include an upgrade instruction.

In 220, the electronic device 120 (e.g., the first communication module 310) may obtain operating data.

In some embodiments, the operating data may be generated based on the at least one request. In some embodiments, the operating data may include page data of the control page, configuration information corresponding to the device information, information of a firmware upgrade package, or the like, or any combination thereof. In some embodiments, the page data of the control page may include at least one operation object and a preset instruction corresponding to the operation object. In some embodiments, the configuration information may include information of a communication protocol to be configured by the electronic device (e.g., gateway) and information of a cloud platform to be configured by the electronic device (e.g., gateway). In some embodiments, the information of a firmware upgrade package may include data of a upgrade version of a firmware to be upgraded, a digest of the upgrade version of the firmware to be upgraded, the digest being labelled by a private key of at least one public-private key pair, and a label of the digest.

In 230, the electronic device 120 (e.g., a first processing module 320) may operate the electronic device based on the operating data.

In some embodiments, the electronic device 120 (e.g., the first electronic device) may control the second electronic based on the page data of the control page. For example, the electronic device 120 may perform the preset instruction corresponding to the operation object to control the second electronic device based on an operation generated by a user on the operation object of the control page.

In some embodiments, the electronic device 120 may establish a connection with a cloud platform based on the configuration information. For example, the electronic device 120 may determine a first communication protocol component corresponding to the information of the first communication protocol, and connect the first cloud platform using the first communication protocol component.

In some embodiments, the electronic device 120 may verify the validity of the upgrade version of the firmware based on the information of a firmware upgrade package. For example, the electronic device 120 may verify the upgrade version of the firmware to be upgraded based on the public key of the at least one public-private key pair and the label included in the information of a firmware upgrade package.

It should be noted that the above description of the process 300 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 3:
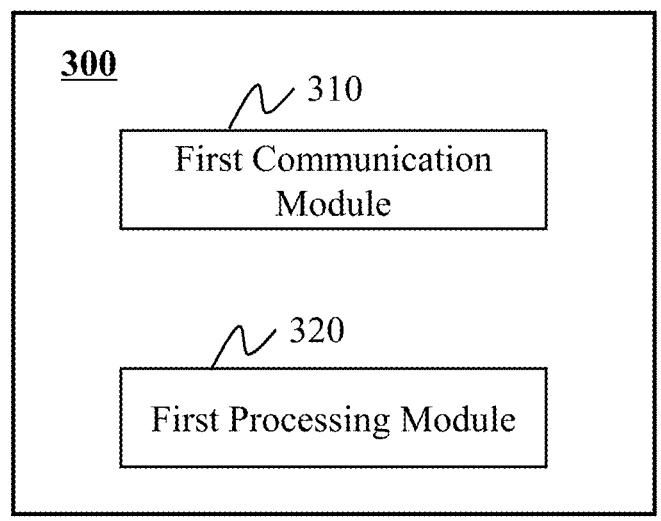
FIG. 3 is a block diagram illustrating an exemplary computing device according to some embodiments of the present disclosure.

FIG. 3 is a block diagram illustrating an exemplary computing device 300 according to some embodiments of the present disclosure. At least a portion of the computing device 300 may be implemented on the electronic device 120 in FIG. 1. As illustrated in FIG. 3, the computing device 300 may include a first communication module 310, and a first processing module 320.

The first communication module 310 may be configured to transmit at least one request related to the electronic device.

In some embodiments, the at least one request may include a controlling request, a communication protocol determining request, or a firmware upgrading request. In some embodiments, the controlling request may include an access request of a control page of another electronic device. For example, a first electronic device (e.g., a smartphone) may transmit the controlling request in order to control a second electronic device (e.g., an intelligent lock). In some embodiments, the communication protocol determining request may include device information of the electronic device 120, for example, a gateway. The device information may include information related to a product serial number, information related to a version number, information related to a model, or the like. In some embodiments, the firmware upgrading request may include an upgrade instruction.

In some embodiments, the first communication module 310 may further be configured to obtain operating data.

In some embodiments, the operating data may be generated based on the at least one request. In some embodiments, the operating data may include page data of the control page, configuration information corresponding to the device information, information of a firmware upgrade package, or the like, or any combination thereof. In some embodiments, the page data of the control page may include at least one operation object and a preset instruction corresponding to the operation object. In some embodiments, the configuration information may include information of a communication protocol to be configured by the electronic device (e.g., gateway) and information of a cloud platform to be configured by the electronic device (e.g., gateway). In some embodiments, the information of a firmware upgrade package may include data of a upgrade version of a firmware to be upgraded, a digest of the upgrade version of the firmware to be upgraded, the digest being labelled by a private key of at least one public-private key pair, and a label of the digest.

The first processing module 330 may be configured to operate the electronic device based on the operating data.

In some embodiments, the first processing module 330 may be configured to control the second electronic based on the page data of the control page. For example, the first processing module 330 be configured to perform the preset instruction corresponding to the operation object to control the second electronic device based on an operation generated by a user on the operation object of the control page.

In some embodiments, the first processing module 330 may be configured to establish a connection with a cloud platform based on the configuration information. For example, the first processing module 330 be configured to determine a first communication protocol component corresponding to the information of the first communication protocol, and connect the first cloud platform using the first communication protocol component.

In some embodiments, the first processing module 330 may be configured to verify the validity of the upgrade version of the firmware based on the information of a firmware upgrade package. For example, the first processing module 330 may be configured to verify the upgrade version of the firmware to be upgraded based on the public key of the at least one public-private key pair and the label included in the information of a firmware upgrade package.

It should be noted that the above description of the computing device 300 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

Figure 4:
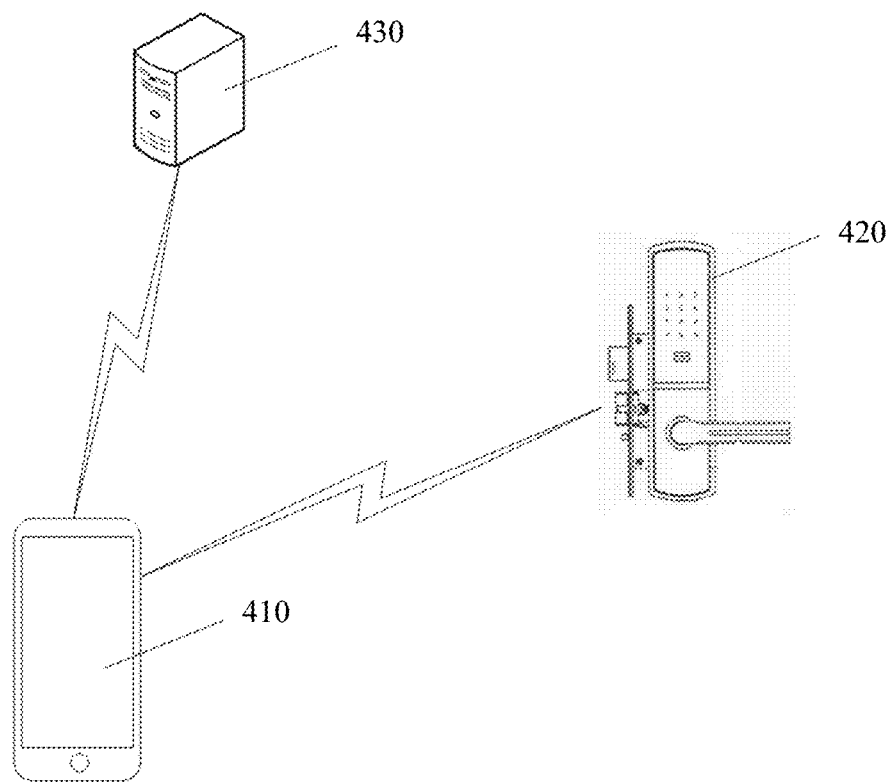
FIG. 4 is a schematic diagram illustrating an exemplary controlling system according to some embodiments of the present disclosure.
Figure 5:
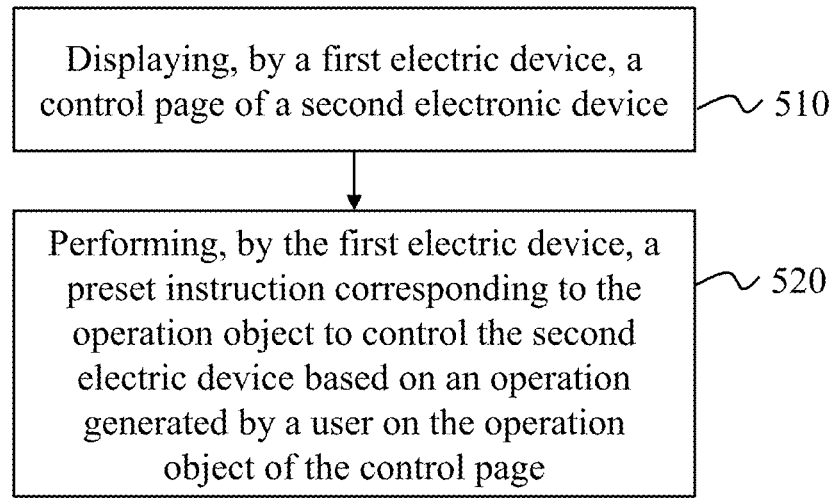
FIG. 5 is a flowchart illustrating an exemplary process for controlling an electronic device according to some embodiments of the present disclosure.

FIG. 5 is a flowchart illustrating an exemplary process for controlling an electronic device according to some embodiments of the present disclosure. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 5 and described below is not intended to be limiting. In some embodiments, one or more operations of process 500 may be implemented in the operating system 100 illustrated in FIG. 1. For example, the process 500 may be implemented on the electronic device 120 of the operating system 100. In some embodiments, process 500 may be implemented a first electronic device 410 illustrated in FIG. 4. The first electronic device 410 may be in communication with a second electronic device 420. As shown in FIG. 5, the method may include one or more of the following operations.

In 510, the first electronic device 410 may display a control page of the second electronic device 420. In some embodiments, page data of the control page may be transmitted by a web server 430 to the first electronic device 410.

In some embodiments, the first electronic device 410 may include a mobile phone, a computer, a tablet computer, a wearable electronic device, or the like. In an actual application, the first electronic device 410 may be installed with an application that may open a web page, such as a browser or an application having a browser function. Specifically, the application may have an operation object. The operation object may lead the application to open the control page of the second electronic device 420. For example, the main interface of the application may include an "electronic device (e.g., intelligent lock) control" button. When a user of the electronic device 410 clicks the button, the first electronic device 410 may send an access request of the control page of the second electronic device 420 to the web server 430 through the application. The web server 430 may transmit page data of the control page to the first electronic device 410 after receiving the access request. Thus, the first electronic device 410 may display the control page of the second electronic device 420 according to the page data of the control page.

In some embodiments, the second electronic device 420 may include an intelligent home device, for example, an intelligent lock, an intelligent rice cooker, an intelligent lamp, an intelligent water heater, or the like. It should be understood that the intelligent home device described in the present disclosure may be a home device that can communicate with other electronic devices and can perform corresponding processing according to control commands sent by another electronic device. Meanwhile, the second electronic device 420 described in the present disclosure may not be limited to intelligent home devices, and other electronic devices may also be suitable for the present disclosure.

In some embodiments, the web server 430 may be a server of a manufacturer of the second electronic device 420. The manufacturer may maintain and modify the control page of the second electronic device 420 via the web server 430. The way for modifying the control page may be various, for example, modifying the electronic device control flow instructions corresponding to the operation object in the control page of the second electronic device 420.

In some embodiments, the page data of the control page may include at least one operation object and a preset instruction corresponding to the operation object. The preset instruction may include an electronic device control flow instruction. In some embodiments, the operation object may include a button, a slide bar, an input box, or the like. In some embodiments, the electronic device control flow instruction may include a control flow that needs to be executed for controlling the electronic device 420. For example, firstly, the electronic device 410 (e.g., the mobile phone) may send a message to the electronic device 420 (e.g., the intelligent home device). Then, the electronic device 410 may wait for a time period. If a feedback is obtained from the electronic device 420 during the time period, the electronic device 410 may perform a processing based on the feedback. If there is no feedback obtained during the time period, the electronic device 410 may perform another processing. As another example, an interface of a Software Development Kit (SDK) may be invoked to send a message to the electronic device 420 (e.g., the intelligent home device). Then, another interface of the SDK may be invoked to send another message to the electronic device 420. In some embodiments, the SDK may be a toolkit provided by a third-party service provider to implement a function of software products, generally including an application programming interface (API), a document, an example, a tool, or the like.

Additionally or alternatively, the control page described in embodiments of the present disclosure may be a webpage conforming to the 5th generation HTML standard specification, that is, an H5 webpage. The H5 webpage may be a dynamic webpage being displayed on an electronic device (in particular, a mobile terminal such as a mobile phone or a tablet computer). Its supporting for touch screen interaction may far exceed the previous generation standard.

In 520, the first electronic device 410 may perform the preset instruction corresponding to the operation object to control the second electronic device 420 based on an operation generated by a user on the operation object of the control page. The user may be the operator or owner of the first electronic device 410. Corresponding to the operation object, the operation generated by the user may include click, press, slide, information input, or the like, or any combination thereof.

Specifically, in an actual implementation, the first electronic device 410 may directly control the second electronic device 420 based on the preset instruction included in the page data. The first electronic device 410 may also control the second electronic device 420 by invoking other controlling program(s) through the preset instruction included in the page data.

In some embodiments, the preset instruction corresponding to the operation object may be an electronic device control flow instruction corresponding to the operation object. Under the situation that the preset instruction is an electronic device control flow instruction, the first electronic device 410 may invoke other control program(s) in a certain order to control the second electronic device 420 by performing the electronic device control flow instruction.

In some embodiments, operation 520 may further include one or more of the following sub-operations.

The first electronic device 410 may execute a preset call instruction corresponding to the operation object based on the operation generated by the user on the operation object of the control page. The executing the call instruction may invoke at least one control program in a preset controlling program library to control the second electronic device 420. The preset controlling program library may be stored in the first electronic device 410.

In some embodiments, the preset controlling program library may include an SDK. The SDK may store a plurality of controlling programs for controlling the second electronic device 420. For example, the SDK may store a control program for the adjust a working state of second electronic device 420.

In some embodiments, the first electronic device 410 may encrypt at least one type of data transmitted during the controlling process of the second electronic device using the preset controlling program library.

In some embodiments, the invoking at least one control program in a preset controlling program library to control the second electronic device 420 may include one or more of the following sub-operations.

The first electronic device 410 may execute the preset call instruction corresponding to the operation object based on the operation generated by the user on the operation object of the control page. The executing the call instruction may invoke at least one interface of the preset controlling program library to invoke the control program corresponding to the at least one interface to generate a control message.

The first electronic device 410 may encrypt the control message using the preset controlling program library, and send the encrypted control message to the second electronic device 420 to control the second electronic device.

In some embodiments, the preset controlling program library may provide a plurality of interfaces of a plurality of controlling programs to allow other applications to invoke the interfaces. After different interfaces are invoked, different control programs may be executed to implement different control functions.

In an alternative embodiment of the present disclosure, for a second electronic device 420 (e.g., an intelligent lock) that requires higher security, The application that can open webpages in the first electronic device may obtain a user identifier input by the user or saved in the first electronic device after each display of the control page, and then perform initialization of the preset control program library according to the user identifier. And sending a control key acquisition request to the web server via a preset control program library. Then, according to the user identifier, an initialization of the preset controlling program library may be performed, and a control key acquisition request may be sent to a web server via the preset controlling program library (The preset controlling program library may first encrypt the control key acquisition request, and then send the encrypted control key acquisition request to the web server). And, the preset controlling program library may send a control key to the control page after obtaining the control key transmitted by the web server. Thus, when the user clicks on the operation object on the control page, the first electronic device 410 may send the control key together with the control message when the interface of the preset controlling program library is invoked. The second electronic device 420 may verify the validity of the control key. After determining that the control key is correct, the second electronic device 420 may perform a corresponding processing according to the received control message and send a processing result to the control page via the preset controlling program library. The control page in the first electronic device 410 may display the processing result to inform the user of a result of the controlling of the electronic device 420. For example, the first electronic device 410 may display the processing result as a text such as "the door is successfully opened".

In an actual implementation of the present disclosure, a server of a producer of the second electronic device 420 may be the web server 430. A package of various control programs of the second electronic device 420 may be created by the producer to generate the preset controlling program library. Therefore, a producer of the first electronic device 410 or a publisher of the application which can display the control page may embed the preset controlling program library into the first electronic device 410 or the application, so as to facilitate the subsequent invoking of the controlling program in the preset controlling program library.

In some embodiments, for security purpose, the first electronic device 410 may send a device identification of the second electronic device 420 and/or an application identifier of the application via the control page to the web server 430 for verifying.

It should be noted that the above description of the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 6:
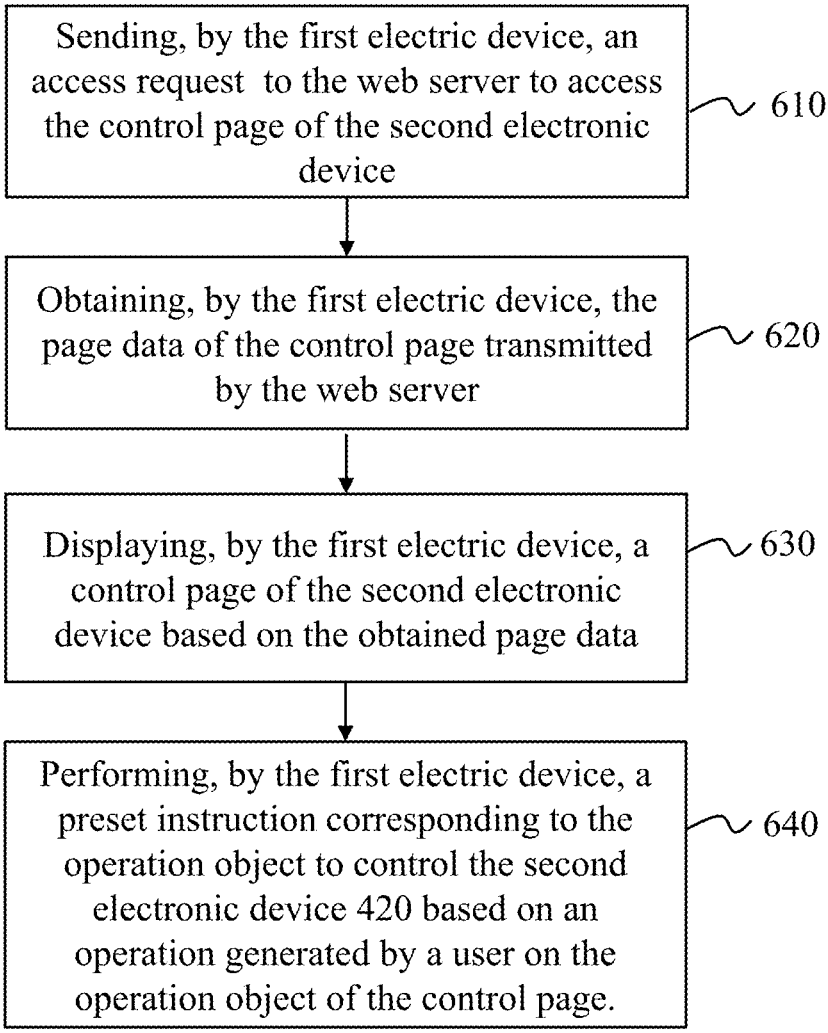
FIG. 6 is a flowchart illustrating another exemplary process for controlling an electronic device according to some embodiments of the present disclosure.

FIG. 6 is a flowchart illustrating another exemplary process for controlling an electronic device according to some embodiments of the present disclosure. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 6 and described below is not intended to be limiting. In some embodiments, one or more operations of process 600 may be implemented in the operating system 100 illustrated in FIG. 1. For example, the process 600 may be implemented on the electronic device 120 of the operating system 100. In some embodiments, process 600 may be implemented a first electronic device 410 as shown in FIG. 4. The first electronic device 410 may be in communication with a second electronic device 420. As shown in FIG. 5, the method may include one or more of the following operations.

In 610, the first electronic device 410 may send an access request to the web server to access the control page of the second electronic device 420.

In some embodiments, the first electronic device 410 may store the URL of the control page of the second electronic device 420.

Specifically, the access request may at least include user identification information of the user of the first electronic device 410. The user identification information of the user may include an account number, a password, or the like. The user identification information may be used by the web server 430 to perform an identity verification on the user to improve security and prevent others from illegally controlling the second electronic device 420.

In 620, the first electronic device 410 may obtain the page data of the control page transmitted by the web server 430.

In some embodiments, the page data obtained by the first electronic device 410 may be transmitted by the web server after the user identification information is approved.

Specifically, the user identification information of the user having the authority may be stored in the web server 430, so that the web server 430 may compare the received user identification information with the saved user identification information. If the received user identification information exists in the saved user identification information, the verification may be passed. It should be noted that the method for verification may be various, and not be limited to the present disclosure.

In 630, the first electronic device 410 may display a control page of the second electronic device 420 based on the obtained page data.

In some embodiments, operation 630 may be a specific implementation of operation 510 in FIG. 5

Specifically, the page data obtained by the first electronic device 410 may include an access token, which may represent authority of the user. Thus, in the present disclosure, the second electronic device may be controlled within the authority of the user based on the access token.

In 640, the first electronic device 410 may perform a preset instruction corresponding to the operation object to control the second electronic device 420 based on an operation generated by a user on the operation object of the control page.

The present disclosure provides a method for controlling an electronic device. By implementing the method, the first electronic device may display a control page of the second electronic device. The page data of the control page may be transmitted by a web server to the first electronic device. The first electronic device may perform a preset instruction corresponding to an operation object to control the second electronic device based on an operation generated by a user on the operation object of the control page. Since the controlling of the second electronic device may be implemented by the control page, the control page may be configured and modified by the web server. Therefore, it is not necessary for the producer of the first electronic device and/or the publisher of the application in the first electronic device to understand the control flow instruction of the second electronic device, which greatly reduces the burden of development of the publisher of the first electronic device and/or the application of the first electronic device. At the same time, due to the flexibility of the webpage, it is easy for the web server to modify the control page by implementing the method described in the present disclosure. Meanwhile, modification(s) may need not be performed on the first electronic device and/or the application(s) in the first electronic. therefore, the adaptability and flexibility of the method may be stronger.

It should be noted that the above description of the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 7:
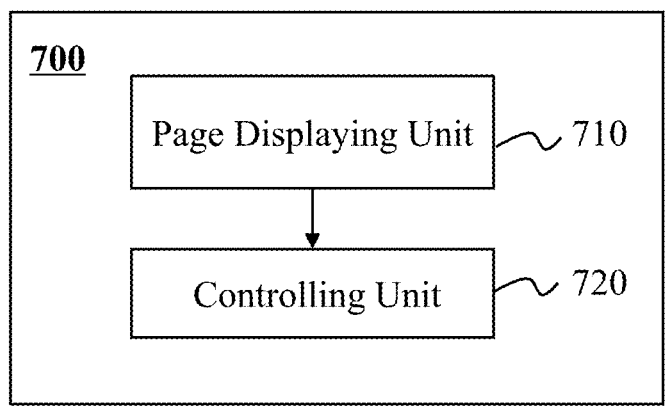
FIG. 7 is a block diagram illustrating an exemplary computing device according to some embodiments of the present disclosure.

FIG. 7 is a block diagram illustrating an exemplary computing device 700 according to some embodiments of the present disclosure. In some embodiments, at least a portion of the computing device 700 may be implemented in an electronic device, for example, the first electronic device 410 in FIG. 4. The first electronic device 410 may be in communication with a second electronic device 420. As illustrated in FIG. 7, the computing device 700 may include a page displaying unit 710, and a controlling unit 720.

The displaying unit 710 may be configured to display a control page of a second electronic device. In some embodiments, page data of the control page may be transmitted by a web server to the first electronic device.

In some embodiments, the first electronic device 410 may include a mobile phone, a computer, a tablet computer, a wearable electronic device, or the like. In an actual application, the first electronic device 410 may be installed with an application that may open a web page, such as a browser or an application having a browser function. Specifically, the application may have an operation object. The operation object may lead the application to open the control page of the second electronic device 420. For example, the main interface of the application may include an "electronic device (e.g., intelligent lock) control" button. When a user of the electronic device 410 clicks the button, the first electronic device 410 may send an access request of the control page of the second electronic device 420 to the web server 430 through the application. The web server 430 may transmit page data of the control page to the first electronic device 410 after receiving the access request. Thus, the first electronic device 410 may display the control page of the second electronic device 420 according to the page data of the control page.

In some embodiments, the second electronic device 420 may include an intelligent home device, for example, an intelligent lock, an intelligent rice cooker, an intelligent lamp, an intelligent water heater, or the like. It should be understood that the intelligent home device described in the present disclosure may be a home device that can communicate with other electronic devices and can perform corresponding processing according to control commands sent by another electronic device. Meanwhile, the second electronic device 420 described in the present disclosure may not be limited to intelligent home devices, and other electronic devices may also be suitable for the present disclosure.

In some embodiments, the web server 430 may be a server of a manufacturer of the second electronic device 420. The manufacturer may maintain and modify the control page of the second electronic device 420 via the web server 430. The way for modifying the control page may be various, for example, modifying the electronic device control flow instructions corresponding to the operation object in the control page of the second electronic device 420.

In some embodiments, the page data of the control page may include at least one operation object and a preset instruction corresponding to the operation object. The preset instruction may include an electronic device control flow instruction. In some embodiments, the operation object may include a button, a slide bar, an input box, or the like. In some embodiments, the electronic device control flow instruction may include a control flow that needs to be executed for controlling the electronic device 420. For example, firstly, the electronic device 410 (e.g., the mobile phone) may send a message to the electronic device 420 (e.g., the intelligent home device). Then, the electronic device 410 may wait for a time period. If a feedback is obtained from the electronic device 420 during the time period, the electronic device 410 may perform a processing based on the feedback. If there is no feedback obtained during the time period, the electronic device 410 may perform another processing. As another example, an interface of a Software Development Kit (SDK) may be invoked to send a message to the electronic device 420 (e.g., the intelligent home device). Then, another interface of the SDK may be invoked to send another message to the electronic device 420. In some embodiments, the SDK may be a toolkit provided by a third-party service provider to implement a function of software products, generally including an application programming interface (API), a document, an example, a tool, or the like.

Additionally or alternatively, the control page described in embodiments of the present disclosure may be a webpage conforming to the 5th generation HTML standard specification, that is, an H5 webpage. The H5 webpage may be a dynamic webpage being displayed on an electronic device (in particular, a mobile terminal such as a mobile phone or a tablet computer). Its supporting for touch screen interaction may far exceed the previous generation standard.

The controlling unit 720 may be configured to perform the preset instruction corresponding to the operation object to control the second electronic device based on an operation generated by a user on the operation object of the control page.

In some embodiments, the controlling unit 720 may encrypt at least one type of data transmitted during the controlling process of the second electronic device using a preset controlling program library.

Specifically, in an actual implementation, the controlling unit 720 may directly control the second electronic device 420 based on the preset instruction included in the page data. The controlling unit 720 may also control the second electronic device 420 by invoking other controlling program(s) through the preset instruction included in the page data.

In some embodiments, the preset instruction corresponding to the operation object may be an electronic device control flow instruction corresponding to the operation object. Under the situation that the preset instruction is an electronic device control flow instruction, the controlling unit 720 may invoke other control program(s) in a certain order to control the second electronic device 420 by performing the electronic device control flow instruction.

In some embodiments, the controlling unit 720 may further be configured to execute a preset call instruction corresponding to the operation object based on the operation generated by the user on the operation object of the control page. The executing the call instruction may invoke at least one control program in a preset controlling program library to control the second electronic device. The preset controlling program library may be stored in the first electronic device.

Additionally or alternatively, the controlling unit 720 may further include an instruction invoking sub-unit and an encryption sub-unit.

The instruction invoking sub-unit may be configured to execute the preset call instruction corresponding to the operation object based on the operation generated by the user on the operation object of the control page. The executing the call instruction may invoke at least one interface of the preset controlling program library to invoke the control program corresponding to the at least one interface to generate a control message.

The encryption sub-unit may be configured to encrypt the control message using the preset controlling program library, and send the encrypted control message to a second electronic device to control the second electronic device.

In other embodiments of the present disclosure, the computing module 700 may further include a request transmitting unit and a data obtaining unit.

The request transmitting unit may be configured to send an access request to the web server to access the control page of the second electronic device before the page displaying unit 710 displays the control page of the second electronic device.

In some embodiments, the access request may at least include user identification information of the user of the first electronic device. The page data obtained by the first electronic device 410 may be transmitted by the web server after the user identification information is approved.

The data obtaining unit may be configured to obtain the page data of the control page transmitted by the web server.

Based on the obtained page data of the control page, the page displaying unit 710 may be configured to display the control page of the second electronic device.

The present disclosure provides a processing module implemented in an electronic device, e.g., a first electronic device. The processing module may display a control page of the second electronic device, and may perform a preset instruction corresponding to an operation object to control the second electronic device based on an operation generated by a user on the operation object of the control page. Since the controlling of the second electronic device may be implemented by the control page, the control page may be configured and modified by the web server. Therefore, it is not necessary for the producer of the first electronic device and/or the publisher of the application in the first electronic device to understand the control flow instruction of the second electronic device, which greatly reduces the burden of development of the publisher of the first electronic device and/or the application of the first electronic device. At the same time, due to the flexibility of the webpage, it is easy for the web server to modify the control page by implementing the method described in the present disclosure. Meanwhile, modification(s) may need not be performed on the first electronic device and/or the application(s) in the first electronic. Therefore, the adaptability and flexibility of the method may be stronger.

It should be noted that the above description of the computing device 700 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

Figure 8:
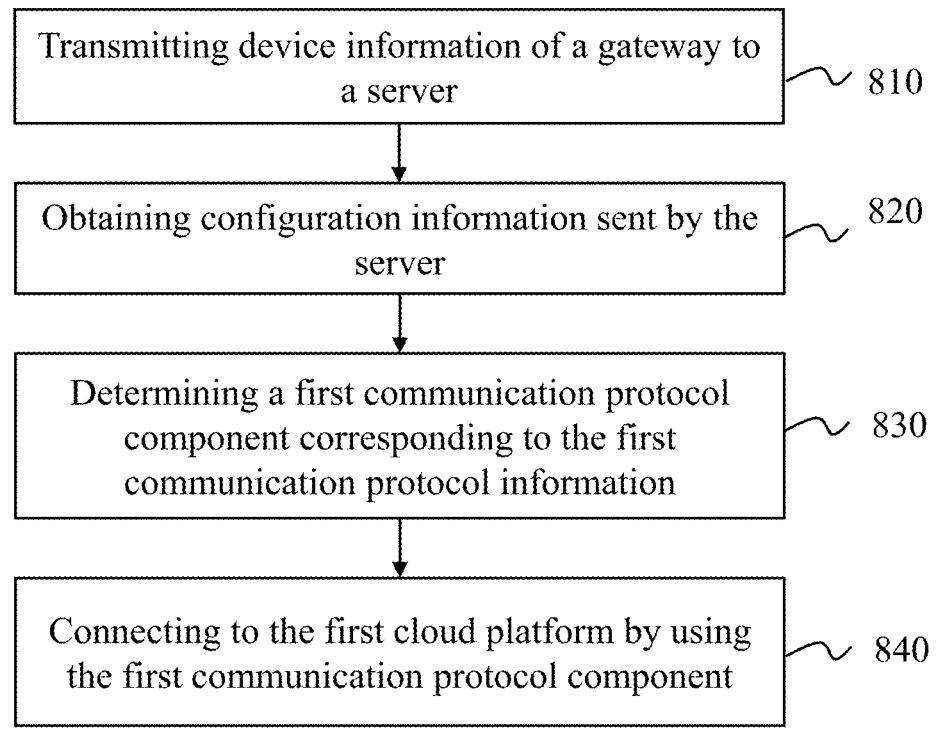
FIG. 8 is a flowchart illustrating an exemplary process for configuring an electronic device according to some embodiments of the present disclosure.

FIG. 8 is a flowchart illustrating another exemplary process for configuring an electronic device according to some embodiments of the present disclosure. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 800 and described below is not intended to be limiting. In some embodiments, one or more operations of process 800 may be implemented in the operating system 100 illustrated in FIG. 1. For example, the process 800 may be implemented on the electronic device 120 (e.g., a gateway) of the operating system 100. As shown in FIG. 8, the method may include one or more of the following operations.

In 810, device information of the gateway may be transmitted to a server.

After the gateway is powered on and initialized, the device information of the gateway may be transmitted to the server. In some embodiments, the device information of the gateway may include information related to a product serial number, information related to a version number, information related to a model, or the like. In some embodiments, one or more types of the above information may be sent to the server.

In 820, configuration information transmitted by the server may be obtained. In some embodiments, the configuration information may include information of a first communication protocol to be configured by the gateway and information of a first cloud platform to be configured by the gateway.

The configuration information corresponding to gateways of various models or various version numbers may be stored in the server. The configuration information may include information of a communication protocol to be configured by the gateway and information of a cloud platform to be configured by the gateway. After obtaining the device information, the server may determine the configuration information corresponding to the gateway based on the device information, and transmit the configuration information to the gateway.

In 830, a first communication protocol component corresponding to the information of the first communication protocol may be determined.

In some embodiments, the components corresponding to various communication protocols may be preset in the gateway, such as websocket, mqtt, coap, or the like. After obtaining the configuration information transmitted by the server, the gateway may determine the corresponding first communication protocol component based on the information of the first communication protocol included in the configuration information.

In 840, the first cloud platform may be connected using the first communication protocol component.

In some embodiments, the gateway may determine the first cloud platform that is connected to the first communication protocol component based on the information of the first cloud platform included in the configuration information. The first cloud platform may include Alibaba Cloud, Baidu Cloud, Tencent Cloud, Huawei Cloud, Google Cloud, AWS, or the like. The gateway may connect with the first cloud platform via the first communication protocol component.

The embodiments of the present disclosure provide a gateway configuration method. By implementing the method, the gateway may send the device information to the server. The server may send the configuration information including information of a first communication protocol to be configured by the gateway and information of a first cloud platform to the gateway. Then, based on the information of the first communication protocol and the information of the first cloud platform, the gateway may connect with the first cloud platform via the first communication protocol component. Based on the method described above, the gateway may connect with various cloud platforms via various communication protocols. And the expansibility and universality of the gateway may become stronger.

It should be noted that the above description of the process 800 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 9:
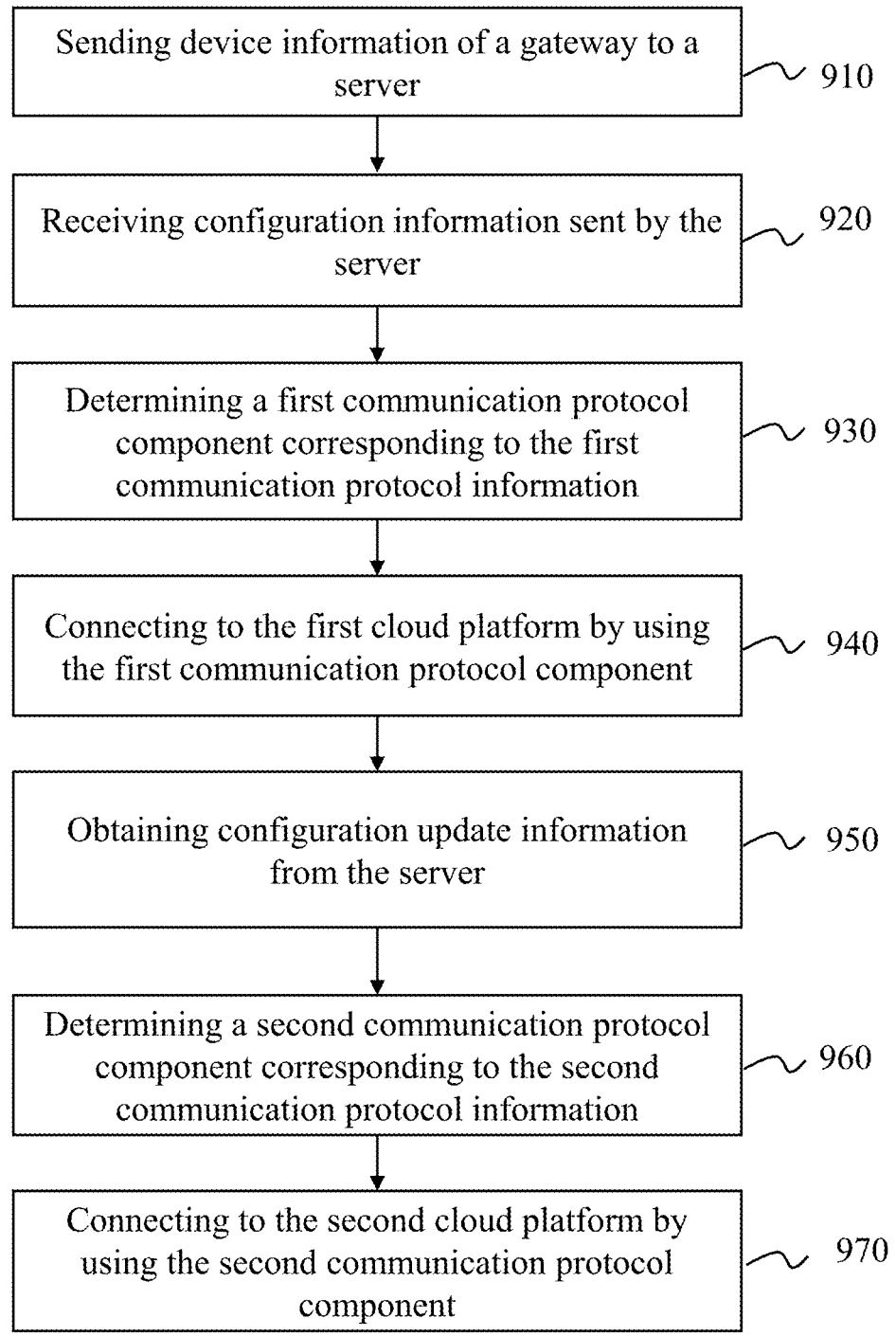
FIG. 9 is a flowchart illustrating another exemplary process for configuring an electronic device according to some embodiments of the present disclosure.

FIG. 9 is a flowchart illustrating another exemplary process for configuring an electronic device according to some embodiments of the present disclosure. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 900 and described below is not intended to be limiting. In some embodiments, one or more operations of process 800 may be implemented in the operating system 100 illustrated in FIG. 1. For example, the process 800 may be implemented on the electronic device 120 (e.g., a gateway) of the operating system 100. As shown in FIG. 9, the method may include one or more of the following operations.

In 910, device information of the gateway may be transmitted to a server.

In 920, configuration information transmitted by the server may be obtained. In some embodiments, the configuration information may include information of a first communication protocol to be configured by the gateway and information of a first cloud platform to be configured by the gateway.

In 930, a first communication protocol component corresponding to the information of the first communication protocol may be determined.

In 940, the first cloud platform may be connected using the first communication protocol component.

It should be noted that the operation 910 to 940 may be the same as or similar to the operation 810 to 840, and may not be repeated herein.

In 950, configuration update information transmitted by the server may be obtained. In some embodiments, the configuration update information may include information of a second communication protocol to be updated by the gateway, and information of a second cloud platform to be updated by the gateway.

In some embodiments, the server may determine whether the gateway needs to update the configuration information by monitoring the number of disconnections between the first communication protocol component and the first cloud platform in a preset time period. If the number of disconnections exceeds a preset threshold, the configuration update information may be transmitted to the gateway. The configuration update information may include the information of the second communication protocol and the information of the second cloud platform, which to be updated by the gateway. The gateway may obtain the configuration update information transmitted by the server after a re-powering initialization or a network disconnecting/reconnecting.

In 960, a second communication protocol component corresponding to the information of the second communication protocol may be determined.

In 970, the second cloud platform may be connected using the second communication protocol component.

The embodiments of the present disclosure provide a gateway configuration method. By implementing the method, after initializing the configuration information, the gateway may further update the configuration information to achieve the purpose of configuration optimizing.

It should be noted that the above description of the process 900 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 10:
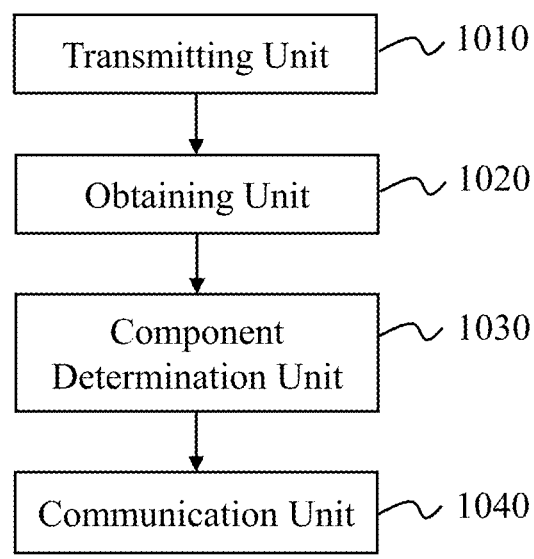
FIG. 10 is a block diagram illustrating an exemplary computing device according to some embodiments of the present disclosure.

FIG. 10 is a block diagram illustrating an exemplary computing device 1000 according to some embodiments of the present disclosure. In some embodiments, at least a portion of the computing device 1000 may be implemented in an electronic device, for example, a gateway. As illustrated in FIG. 10, the computing device 1000 may include a transmitting unit 1010, an obtaining unit 1020, a component determination unit 1030, and a communication unit 1040.

The transmitting unit 1010 may be configured to transmit the device information of the gateway to the server.

The obtaining unit 1020 may be configured to obtain the configuration information transmitted by the server. The configuration information may include information of a first communication protocol to be configured by the gateway, and information of a first cloud platform to be configured by the gateway.

The component determination unit 1030 may be configured to determine the first communication protocol component corresponding to the information of the first communication protocol.

The communication unit 1040 may be configured to connect to the first cloud platform using the first communication protocol component.

It should be noted that the above description of the computing device 1000 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

FIG. 11 is a flowchart illustrating an exemplary process for verifying a firmware version according to some embodiments of the present disclosure. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 11 and described below is not intended to be limiting. In some embodiments, one or more operations of process 1100 may be implemented in the operating system 100 illustrated in FIG. 1. For example, the process 1100 may be implemented on the electronic device 120 of the operating system 100. As shown in FIG. 11, the method may include one or more of the following operations.

In 1110, information of a firmware upgrade package may be obtained from a server (e.g., the processing device 110). In some embodiments, the information of the firmware upgrade package may include data of an upgrade version of a firmware to be upgraded, a digest of the upgrade version of the firmware to be upgraded, the digest being labelled by a private key of at least one public-private key pair, and a label of the digest. The public-private key pair may include a public key stored in the firmware to be upgraded and a private key stored in a server. Additionally, private keys belong two or more different public-private key pairs may be stored in the server, respectively.

In 1120, the data of the upgrade version of the firmware to be upgraded, the digest, and the label of the digest may be obtained, and the upgrade version of the firmware to be upgraded may be verified based on the public key of the at least one public-private key pair and the label.

In some embodiments, the information of the firmware upgrade package may be transmitted to the electric device by the server. Before transmitting the information of the firmware upgrade package, the server may determine a firmware to be upgraded, and generate at least one public-private key pair. Then, the server may obtain a digest of an upgrade version of the firmware to be upgraded, and label the digest based on the private key(s) of the at least one public-private key pair. After that, the server may pack the data of the upgrade version of the firmware to be upgraded, the digest, and the label of the digest as the information of the firmware upgrade package. And, the server may transmit the information of the firmware upgrade package to the electronic device to cause the electronic device to verify the upgrade version of firmware to be upgraded.

In some embodiments, the firmware to be upgraded may be a firmware embedded in the electronic device. After the verification of the upgrade version is passed, the electronic device may upgrade the firmware to the upgrade version. It may ensure the source of the upgrade version of the firmware is reliable.

In some embodiments, the data of the upgrade version of the firmware to be upgraded (also referred to as Flash Image), the digest (also referred to as Flash Digest), and the signature obtained by labeling the digest (the label, also referred as to Flash Sign) may be stored in the information of the firmware upgrade package (also referred to as OTA Info). It may be convenient to manage the data of the upgrade version, the digest of the upgrade version and the signature of the digest.

Furthermore, during a process of verifying the upgrade version of firmware to be upgraded, various data may only need to be obtained from the information of the firmware upgrade package.

Figure 14:
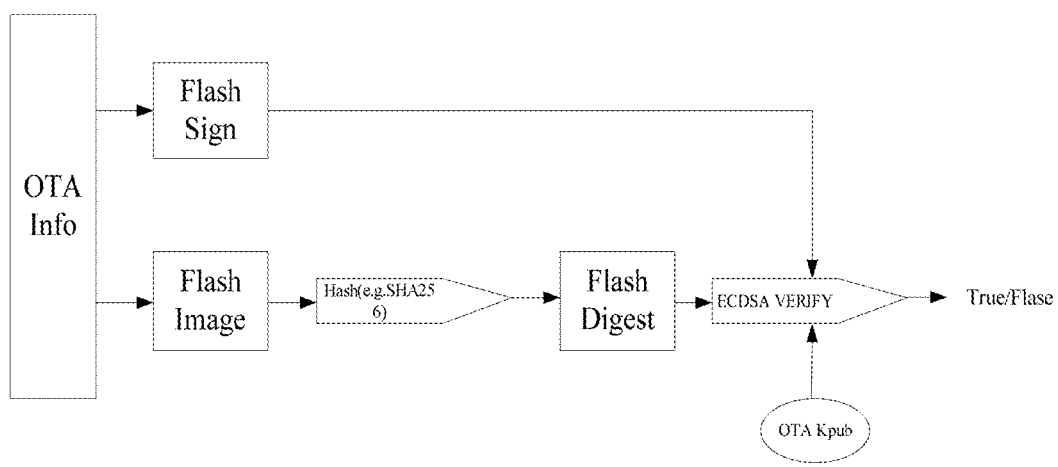
FIG. 14 is a flowchart illustrating an exemplary process for verifying a firmware version based on one public-private key pair according to some embodiments of the present disclosure.

In some embodiments, one public key and the label may be used to verify the upgrade version of the firmware to be upgraded when there is one public-private key pair. A relating process may be shown in FIG. 14.

Specifically, the public key may be matched and/or compared with the label of the digest. If the matching is successful, or the public key matches the private key indicated by the label, the digest corresponding to the label may pass the verification, and the upgrade version of the firmware to be upgraded may pass the verification. The source of the upgrade version may be determined as reliable. If the matching fails, or the public key does not match the private key indicated by the label, the digest corresponding to the label may fail the verification, and the upgrade version may not pass the verification. The source may be determined as unreliable, and the firmware may not be upgraded.

In some embodiments, when there is only one public-private key pair, the information of the firmware upgrade package may include the data of the upgrade version and label. The digest may not be included in the information of the firmware upgrade package, since the digest may not be required during the verification process.

In some embodiments, when there are two or more public-private key pairs, the public keys in the public-private key pairs and label may be used to verify the validity of the digest. After determining that the digest is valid, the digest may be used to verify the validity of the upgrade version of firmware to be upgraded.

Figure 15:
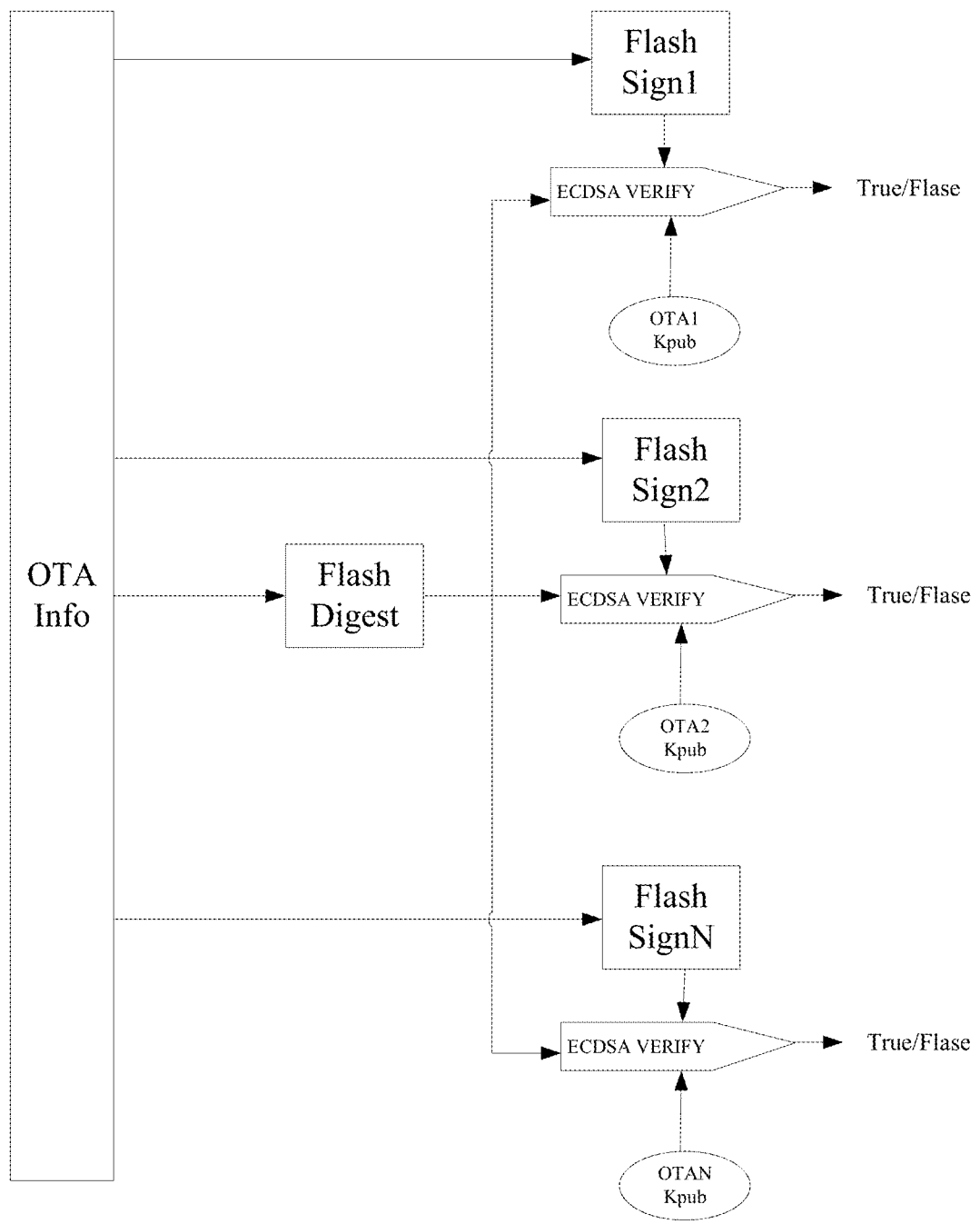
FIG. 15 is a flowchart illustrating an exemplary process for verifying a firmware version based on two or more public-private key pair according to some embodiments of the present disclosure.

Specifically, the label and the digest included in the information of the firmware upgrade package may be obtained. The digest may be verified based on the label. A relating process may be shown in FIG. 15. The private key indicates by the public-private key pair may be verified whether matches the label. If the private key indicated by the public-private key pair matches the label, the digest may pass the validity verification. Since there are two or more public-private key pairs, two or more labels may be determined by the private keys. The validity of the digest may need to be verified for multiple times. For example, the times of the validity verification may be the same as the number of the public-private key pairs.

In some embodiments, two or more public keys in the two or more public-private key pairs, the digest, and two or more labels may be verified using an algorithm. If the public keys, the digest, and the labels pass the verification, the digest may be determined as validity.

Specifically, the two or more public keys (KEYpubs), the digest (Flash Digest), and the two or more labels (Flash Sign) may be input into ECDSA for verification. If the verification is successful, the digest may be determined as validity.

In some embodiments, the private key in each public-private key pairs may correspond to a label. During the verification of the public keys, the digest, and the label, the public key may be verified whether matches the private key corresponding to the label. And the digest may be further verified using the public-private key pair. If the digest passed the above verification, it may indicate that the digest passes the validity verification. The digest may be valid.

Figure 16:
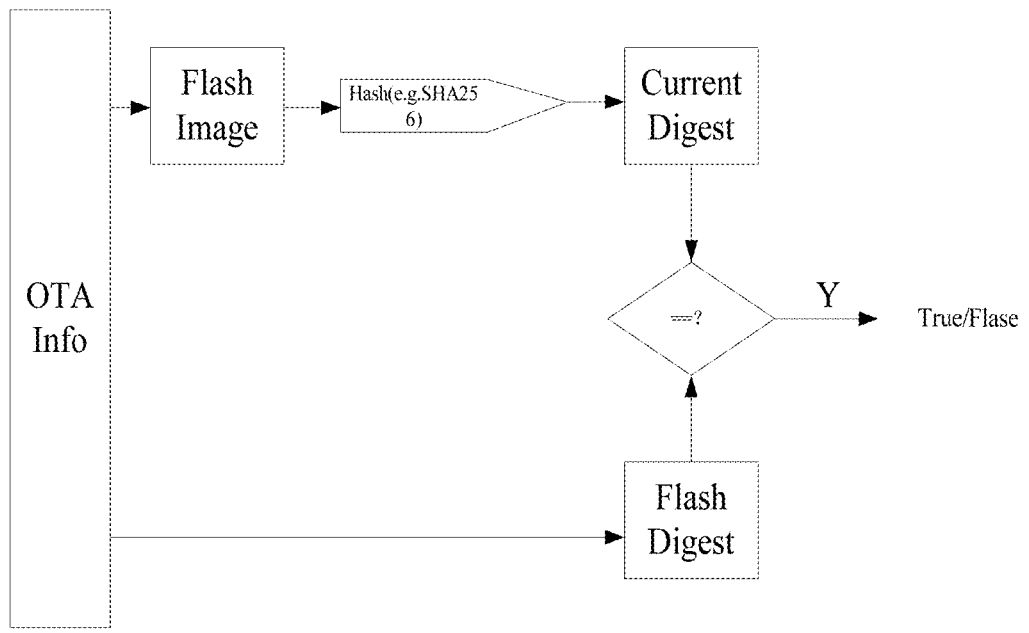
FIG. 16 is a flowchart illustrating another exemplary process for verifying a firmware version based on two or more public-private key pair according to some embodiments of the present disclosure.

After the digest passes the validity verification, the data of the upgrade version data (Flash Image) may be obtained, and the validity of the Flash Image may be determined using the digest (Flash Digest). A relating process may be shown in FIG. 16. The Flash Image may be transferred to a code area to upgrade the firmware after confirming that the flash image is valid.

The embodiments of the present disclosure provide a firmware verification method, which may be implemented on an electric device. By implementing the method, the information of the firmware upgrade package may be obtained from a server. The information of the firmware upgrade package may include data of an upgrade version of a firmware to be upgraded, a digest of the upgrade version of the firmware to be upgraded, the digest being labelled by a private key of at least one public-private key pair, and a label of the digest. The public-private key pair may include a public key stored in the firmware to be upgraded and a private key stored in a server. Additionally, private keys belong two or more different public-private key pairs may be stored in the server, respectively. The data of the upgrade version of the firmware to be upgraded, the digest, and the label of the digest may be obtained from the information of a firmware upgrade package, and the upgrade version of the firmware to be upgraded may be verified based on the public key of the at least one public-private key pair and the label.

In the present disclosure, the upgrade version of the firmware to be upgraded may be verified using the public key. The upgrade of the firmware may only be performed after the verification is passed. It may avoid a problem that a trusted signature verification is not performed on the firmware in the prior art. Therefore, malicious device upgrade for the device which embedded with the firmware may be prevented.

It should be noted that the above description of the process 1100 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 12 is a flowchart illustrating another exemplary process for verifying a firmware version according to some embodiments of the present disclosure. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 12 and described below is not intended to be limiting. In some embodiments, one or more operations of process 1200 may be implemented in the operating system 100 illustrated in FIG. 1. For example, the process 1200 may be implemented on the electronic device 120 of the operating system 100. As shown in FIG. 12, the method may include one or more of the following operations.

In 1210, information of a firmware upgrade package may be obtained from a server (e.g., the processing device 110). In some embodiments, the information of the firmware upgrade package may include data of an upgrade version of a firmware to be upgraded, a digest of the upgrade version of the firmware to be upgraded, the digest being labelled by a private key of at least one public-private key pair, and a label of the digest. The public-private key pair may include a public key stored in the firmware to be upgraded and a private key stored in a server. Additionally, private keys belong two or more different public-private key pairs may be stored in the server, respectively.

In 1220, the accuracy of the upgrade version of the firmware to be upgraded may be determined whether is greater than or equal to a first threshold using the public keys in two or more public-private key pairs and the label.

In 1230, verification for the upgrade version of the firmware to be upgraded may be determined as successful in response to a determination that the accuracy is not less than the first threshold.

In some embodiments, when there is only one public-private key pair, a conclusion of whether the verification is successful may be directly obtained using the public key and the label.

In some embodiments, when there are two or more public-private key pair, the number of the public key and the private key may not be less than two, respectively, and the number of the labels obtained according to the private key may not be less than two. Each public key and the corresponding label may be used to verify the validity of the digest. For example, a first public key and a first label corresponding to the first public key may be used to verify the validity of the digest. A second public key and a second label corresponding to the second public key may be used to verify the validity of the digest. And so on. A plurality of results of the verification may be obtained. The number of the results may be the same as the number of the public-private key pairs. In some embodiments, the accuracy may be referred to as a ratio of the number of verification results that the digest is valid to the total number of verifications. A verification for the digest may be determined as successful in response to a determination that the accuracy is not less than the first threshold.

Merely by way of an example, for three public-private key pairs, a verification for the digest may be determined as successful in response to a determination that the accuracy is not less than ⅔. Three signatures may be obtained by labeling the digest using three private keys. And three verification for the digest may be performed using three public keys and the three signatures, respectively. For example, a first verification result denoted as Ture (e.g., valid) may be obtained using a first public key and a first signature. A second verification result denoted as False (e.g., invalid) may be obtained using a second public key and a second signature. And, a third verification result denoted as Ture (e.g., valid) may be obtained using a third public key and a third signature. The accuracy may be determined as ⅔, and the verification of digest may be determined as successful. In a certain example, the first private key and the third private key may be determined as normal. The second private key may be determined as abnormal such as being lost and/or leaked, since the second verification result is False.

In some embodiments, in response to the determination that the accuracy is greater than or equal to the first threshold, the validity of the upgrade version may be verified using the digest. In response to the determination that the accuracy is less than the first threshold, process 1200 may be ended.

Furthermore, when at least one private key of the two or more public-private key pairs is abnormal, at least one new public-private key pair may be generated. The number of the new generated public-private key pairs may be the same as the number of private keys being abnormal. The at least one private key being abnormal stored in the server may be replaced by a private key included in the generated at least one new public-private key pair. The at least one public key corresponding to the at least one private key being abnormal may be replaced by the public key in the new generated at least one new public-private key pair through a firmware upgrade.

In some embodiments, after at least one private key of the two or more public-private key pairs occurs abnormality, at least one new public-private key pair may be generated, and the number of the new generated public-private key pair may be same as the number of private keys being abnormal. For example, if one private key is abnormal, one new public-private key pair may be generated. If two private keys are abnormal, two public-private key pairs may be generated.

Furthermore, a ration of the number of the normal private keys in the two or more public-private key pairs to the total number of the private keys in the two or more public-private key pairs may not less than the first threshold.

Merely by way of example, for three public-private key pairs, the first threshold may be set as ⅔. In a situation that that one of the three private keys may be abnormal, and two of the three private keys may be normal, the ratio of the number of the normal private keys to the total number of private keys may be ⅔. It may be the same as the first threshold. The abnormal private key and the public key corresponding to the abnormal private key may be replaced. In a situation that that two of the three private keys may be abnormal, and one of the three private keys may be normal, the ratio of the number of the normal private keys to the total number of private keys may be ⅓, which may be less than the first threshold. The replacement of the abnormal private keys and the public key corresponding to the abnormal private key may not be performed.

After generating the new public-private key pair corresponding to the abnormal private key, the abnormal private key and the corresponding public key may be replaced by the private key and public key included in the new generated public-private key pair. Therefore, all of the public-private key pairs may not have the abnormal private key and public key corresponding to the abnormal private key after replacement.

In some embodiments, the new generated private key may be directly stored on the server to replace the abnormal private key. The new generated private key may be stored in the same position as the private key that needs to be replaced. The abnormal private key may be transferred to another position to store, and the new generated private key may be stored in the location where the abnormal private key previously stored. For example, the private key may be stored in the first location. When the private key occurs abnormality, a new public-private key pair may be generated. And the private key may be transferred from the first position to a second position. The new private key included in the new generated public-private key pair may be stored in the first position. Thereby, the private key may be replaced by the new private key.

In some embodiments, the public key corresponding to the abnormal private key may be replaced. The public key corresponding to the abnormal private key may be replaced by a public key included in the new generated public-private key pair through upgrading the firmware version.

For example, for three public-private key pairs, one private key may be abnormal and two private keys may be normal, and the first threshold may be set as ⅔. The accuracy may not be less than the first threshold, and the firmware may be upgraded. After upgrading, the public key corresponding to the abnormal private key stored in the firmware may be replaced with the new generated public key, which may be used for verification in a next firmware upgrade.

Furthermore, in a situation that a ration of the number of the normal private keys in the two or more public-private key pairs to the total number of the private keys in the two or more public-private key pairs is less than the first threshold, and the accuracy may also less than the first threshold.

Meanwhile, when a first ratio of the number of the normal private keys in the two or more public-private key pairs to the total number of the private keys in the two or more public-private key pairs is not less than a second threshold, the verification of the upgrade version of firmware may be performed using the normal private keys and of a predetermined number abnormal private keys. In some embodiments, the second threshold may be less than the first threshold. In some embodiments, the use of the normal private keys may avoid excessive using of abnormal private keys and the data leakage and/or other losses caused by an inaccurate upgrade version tampered by a hacker and/or lawless person. In some embodiments, a second ratio of the sum of the predetermined number and the number of normal private keys to the total number of private keys may be the same as the first threshold.

Merely by way of example, for three public-private key pairs, the first threshold may set as ⅔, and the second threshold may be set as ⅓. One private key may be abnormal, and two private keys may be normal. The results of the verification of the upgrade version may satisfy the requirement that the accuracy is not less than ⅔. If there are two abnormal private keys, the ratio of the number of normal private keys to the total number of private keys may be ⅓. The ratio is less than the first threshold, and is the same as the second threshold. Therefore, the verification of the upgrade version may be performed using a second threshold way. In other words, the verification of the upgrade version may be performed using one normal private key and one abnormal private key. The ration of the sum of one normal private key and one abnormal private key to the total number of the private key is ⅔, which is not less than the first threshold.

The firmware verification method disclosed according to some embodiments of the present disclosure may determine the firmware to be upgraded, generate at least one set of public-private key pair, obtain the flash digest of the upgrade version of the firmware to be upgraded, successively label the flash digest using private key(s) in at least one set of public-private key pair, send the firmware upgrade package information to the electric device. The electric device may verify the upgrade version of the firmware to be upgraded using the firmware upgrade package information and the public key in at least one set of public-private key pair. In some embodiments, the firmware upgrade package information may include data of the upgrade version of the firmware to be upgraded, the flash digest, and the label on the flash digest.

The embodiments of the present disclosure provide a firmware verification method, which may be implemented on an electric device. By implementing the method, a firmware to be upgraded may be determined, and at least one public-private key pair may be generated. The public-private key pair may include a public key stored in the firmware and a private key stored in a server. A digest of an upgrade version of the firmware to be upgraded may be obtained, and the digest may be labelled by the private key of the at least one public-private key pair. Information of a firmware upgrade package may be transmitted to an electronic device to cause the electronic device to verify the upgrade version of the firmware to be upgraded based on the information of the firmware upgrade package and the public key of the at least one public-private key pair. The information of the firmware upgrade package information may include data of the upgrade version of the firmware to be upgraded, the digest, and the label of the digest.

In the present disclosure, the digest of the upgrade version of the firmware to be upgraded may be labelled using the private key. The upgrade of the firmware may only be performed after the verification is passed. It may avoid a problem that a trusted signature verification is not performed on the firmware in the prior art. Therefore, malicious device upgrade for the device which embedded with the firmware may be prevented.

The embodiments of the present disclosure provide a firmware verification method, which may be implemented on an electric device. By implementing the method, the information of the firmware upgrade package may be obtained from a server. The information of the firmware upgrade package may include data of an upgrade version of a firmware to be upgraded, a digest of the upgrade version of the firmware to be upgraded, the digest being labelled by a private key of at least one public-private key pair, and a label of the digest. The public-private key pair may include a public key stored in the firmware to be upgraded and a private key stored in a server. Additionally, private keys belong two or more different public-private key pairs may be stored in the server, respectively. The data of the upgrade version of the firmware to be upgraded, the digest, and the label of the digest may be obtained from the information of a firmware upgrade package, and the upgrade version of the firmware to be upgraded may be verified based on the public key of the at least one public-private key pair and the label.

In the present disclosure, the upgrade version of the firmware to be upgraded may be verified using the public key. The upgrade of the firmware may only be performed after the verification is passed. It may avoid a problem that a trusted signature verification is not performed on the firmware in the prior art. Therefore, malicious device upgrade for the device which embedded with the firmware may be prevented.

It should be noted that the above description of the process 1200 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 13:
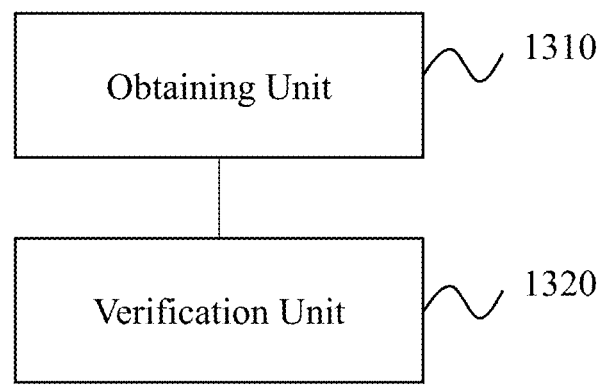
FIG. 13 is a block diagram illustrating an exemplary computing device according to some embodiments of the present disclosure.

FIG. 13 is a block diagram illustrating an exemplary computing device 1300 according to some embodiments of the present disclosure. In some embodiments, the computing device 1300 may be implemented in the electronic device 120 illustrated in FIG. 1. As illustrated in FIG. 13, the computing device 1300 may include an obtaining unit 1310, and a verification unit 1320.

The obtaining unit 1310 may be configured to obtain information of a firmware upgrade package from a server. In some embodiments, the information of the firmware upgrade package may include data of an upgrade version of a firmware to be upgraded, a digest of the upgrade version of the firmware to be upgraded, the digest being labelled by a private key of at least one public-private key pair, and a label of the digest. The public-private key pair may include a public key stored in the firmware to be upgraded and a private key stored in a server. Additionally, private keys belong two or more different public-private key pairs may be stored in the server, respectively.

The verification unit 1320 may be configured to obtain the data of the upgrade version of the firmware to be upgraded, the digest, and the label of the digest, and verify the upgrade version of the firmware to be upgraded based on the public key of the at least one public-private key pair and the label.

In some embodiments, the information of the firmware upgrade package may be transmitted to the electric device by the server. Before transmitting the information of the firmware upgrade package, the server may determine a firmware to be upgraded, and generate at least one public-private key pair. Then, the server may obtain a digest of an upgrade version of the firmware to be upgraded, and label the digest based on the private key(s) of the at least one public-private key pair. After that, the server may pack the data of the upgrade version of the firmware to be upgraded, the digest, and the label of the digest as the information of the firmware upgrade package. And, the server may transmit the information of the firmware upgrade package to the electronic device to cause the electronic device to verify the upgrade version of firmware to be upgraded.

In some embodiments, the firmware to be upgraded may be a firmware embedded in the electric device. After the verification of the upgrade version is passed, the electric device may upgrade the firmware to the upgrade version. It may ensure the source of the upgrade version of the firmware is reliable.

In some embodiments, the data of the upgrade version of the firmware to be upgraded The data of the upgrade version of the firmware to be upgraded (also referred to as Flash Image), the digest (also referred to as Flash Digest), and the signature obtained by labeling the digest (the label, also referred as to Flash Sign) may be stored in the information of the firmware upgrade package (also referred to as OTA Info). It may be convenient to manage the data of the upgrade version, the digest of the upgrade version and the signature of the digest.

Furthermore, during a process of verifying the upgrade version of firmware to be upgraded, various data may only need to be obtained from the information of the firmware upgrade package.

In some embodiments, one public key and the label may be used to verify the upgrade version of the firmware to be upgraded when there is one public-private key pair. A relating process may be shown in FIG. 14.

Specifically, the public key may be matched and/or compared with the label of the digest. If the matching is successful, or the public key matches the private key indicated by the label, the digest corresponding to the label may pass the verification, and the upgrade version of the firmware to be upgraded may pass the verification. The source of the upgrade version may be determined as reliable. If the matching fails, or the public key does not match the private key indicated by the label, the digest corresponding to the label may fail the verification, and the upgrade version may not pass the verification. The source may be determined as unreliable, and the firmware may not be upgraded.

In some embodiments, when there is only one public-private key pair, the information of the firmware upgrade package may include the data of the upgrade version and label. The digest may not be included in the information of the firmware upgrade package, since the digest may not be required during the verification process.

In some embodiments, when there are two or more public-private key pair, the public keys in the public-private key pairs and label may be used to verify the validity of the digest. After determining that the digest is valid, the digest may be used to verify the validity of the upgrade version of firmware to be upgraded.

Specifically, the label and the digest included in the information of the firmware upgrade package may be obtained. The digest may be verified based on the label. A relating process may be shown in FIG. 15. The private key indicates by the public-private key pair may be verified whether matches the label. If the private key indicated by the public-private key pair matches the label, the digest may pass the validity verification. Since there are two or more public-private key pairs, two or more labels may be determined by the private keys. The validity of the digest may need to be verified for multiple times. For example, the times of the validity verification may be the same as the number of the public-private key pairs.

In some embodiments, two or more public keys in the two or more public-private key pairs, the digest, and two or more labels may be verified using an algorithm. If the public keys, the digest, and the labels pass the verification, the digest may be determined as validity.

Specifically, the two or more public keys (KEYpubs), the digest (Flash Digest), and the two or more labels (Flash Sign) may be input into ECDSA for verification. If the verification is successful, the digest may be determined as validity.

In some embodiments, the private key in each public-private key pair may correspond to a label. During the verification of the public keys, the digest, and the label, the public key may be verified whether matches the private key corresponding to the label. And the digest may be further verified using the public-private key pair. If the digest passed the above verification, it may indicate that the digest passes the validity verification. The digest may be valid.

After the digest passes the validity verification, the data of the upgrade version data (Flash Image) may be obtained, and the validity of the Flash Image may be determined using the digest (Flash Digest). A relating process may be shown in FIG. 16. The Flash Image may be transferred to a code area to upgrade the firmware after confirming that the flash image is valid.

In some embodiments, the verification unit 1320 may further configured to determine whether an accuracy of the upgrade version of the firmware to be upgraded is greater than or equal to a first threshold using the public keys in two or more public-private key pairs and the label, and determine that the verification for the upgrade version of the firmware to be upgraded is successful in response to a determination that the accuracy is not less than the first threshold.

In some embodiments, when there is only one public-private key pair, a conclusion of whether the verification is successful may be directly obtained using the public key and the label.

In some embodiments, when there are two or more public-private key pair, the number of the public key and the private key may not be less than two, respectively, and the number of the labels obtained according to the private key may not be less than two. Each public key and the corresponding label may be used to verify the validity of the digest. For example, a first public key and a first label corresponding to the first public key may be used to verify the validity of the digest. A second public key and a second label corresponding to the second public key may be used to verify the validity of the digest. And so on. A plurality of results of the verification may be obtained. The number of the results may be the same as the number of the public-private key pairs. In some embodiments, the accuracy may be referred to as a ratio of the number of verification results that the digest is valid to the total number of verifications. A verification for the digest may be determined as successful in response to a determination that the accuracy is not less than the first threshold.

Merely by way of an example, for three public-private key pairs, a verification for the digest may be determined as successful in response to a determination that the accuracy is not less than $2/3$. Three signatures may be obtained by labeling the digest using three private keys. And three verification for the digest may be performed using three public keys and the three signatures, respectively. For example, a first verification result denoted as Ture (e.g., valid) may be obtained using a first public key and a first signature. A second verification result denoted as False (e.g., invalid) may be obtained using a second public key and a second signature. And, a third verification result denoted as Ture (e.g., valid) may be obtained using a third public key and a third signature. The accuracy may be determined as $2/3$, and the verification of digest may be determined as successful. In a certain example, the first private key and the third private key may be determined as normal. The second private key may be determined as abnormal such as being lost and/or leaked, since the second verification result is False.

In some embodiments, in response to the determination that the accuracy is greater than or equal to the first threshold, the validity of the upgrade version may be verified using the digest. In response to the determination that the accuracy is less than the first threshold, process 1200 may be ended.

Furthermore, when at least one private key of the two or more public-private key pairs is abnormal, at least one new public-private key pair may be generated. The number of the new generated public-private key pairs may be the same as the number of private keys being abnormal. The at least one private key being abnormal stored in the server may be replaced by a private key included in the generated at least one new public-private key pair. The at least one public key corresponding to the at least one private key being abnormal may be replaced by the public key in the new generated at least one new public-private key pair through a firmware upgrade.

In some embodiments, after at least one private key of the two or more public-private key pairs occurs abnormality, at least one new public-private key pair may be generated, and the number of the new generated public-private key pair may be same as the number of private keys being abnormal. For example, if one private key is abnormal, one new public-private key pair may be generated. If two private keys are abnormal, two public-private key pairs may be generated.

Furthermore, a ration of the number of the normal private keys in the two or more public-private key pairs to the total number of the private keys in the two or more public-private key pairs may not less than the first threshold.

Merely by way of example, for three public-private key pairs, the first threshold may be set as $2/3$. In a situation that that one of the three private keys may be abnormal, and two of the three private keys may be normal, the ratio of the number of the normal private keys to the total number of private keys may be $2/3$. It may be the same as the first threshold. The abnormal private key and the public key corresponding to the abnormal private key may be replaced. In a situation that that two of the three private keys may be abnormal, and one of the three private keys may be normal, the ratio of the number of the normal private keys to the total number of private keys may be $1/3$, which may be less than the first threshold. The replacement of the abnormal private keys and the public key corresponding to the abnormal private key may not be performed.

After generating the new public-private key pair corresponding to the abnormal private key, the abnormal private key and the corresponding public key may be replaced by the private key and public key included in the new generated public-private key pair. Therefore, all of the public-private key pairs may not have the abnormal private key and public key corresponding to the abnormal private key after replacement.

In some embodiments, the new generated private key may be directly stored on the server to replace the abnormal private key. The new generated private key may be stored in the same position as the private key that needs to be replaced. The abnormal private key may be transferred to another position to store, and the new generated private key may be stored in the location where the abnormal private key previously stored. For example, the private key may be stored in the first location. When the private key occurs abnormality, a new public-private key pair may be generated. And the private key may be transferred from the first position to a second position. The new private key included in the new generated public-private key pair may be stored in the first position. Thereby, the private key may be replaced by the new private key.

In some embodiments, the public key corresponding to the abnormal private key may be replaced. The public key corresponding to the abnormal private key may be replaced by a public key included in the new generated public-private key pair through upgrading the firmware version.

For example, for three public-private key pairs, one private key may be abnormal and two private keys may be normal, and the first threshold may be set as $2/3$. The accuracy may not be less than the first threshold, and the firmware may be upgraded. After upgrading, the public key corresponding to the abnormal private key stored in the firmware may be replaced with the new generated public key, which may be used for verification in a next firmware upgrade.

Furthermore, in a situation that a ration of the number of the normal private keys in the two or more public-private key pairs to the total number of the private keys in the two or more public-private key pairs is less than the first threshold, and the accuracy may also less than the first threshold.

Meanwhile, when the ration of the number of the normal private keys in the two or more public-private key pairs to the total number of the private keys in the two or more public-private key pairs is not less than a second threshold, the verification of the upgrade version of firmware may be performed using the normal private keys and of a predetermined number abnormal private keys. In some embodiments, the second threshold may be less than the first threshold. In some embodiments, the use of the normal private keys may avoid excessive using of abnormal private keys and the data leakage and/or other losses caused by an inaccurate upgrade version tampered by a hacker and/or lawless person. In some embodiments, a ratio of the sum of the predetermined number and the number of normal private keys to the total number of private keys may be the same as the first threshold.

Merely by way of example, for three public-private key pairs, the first threshold may set as $2/3$, and the second threshold may be set as $1/3$. One private key may be abnormal, and two private keys may be normal. The results of the verification of the upgrade version may satisfy the requirement that the accuracy is not less than $2/3$. If there are two abnormal private keys, the ratio of the number of normal private keys to the total number of private keys may be $1/3$. The ratio is less than the first threshold, and is the same as the second threshold. Therefore, the verification of the upgrade version may be performed using a second threshold way. In other words, the verification of the upgrade version may be performed using one normal private key and one abnormal private key. The ration of the sum of one normal private key and one abnormal private key to the total number of the private key is $2/3$, which is not less than the first threshold.

The firmware verification method disclosed according to some embodiments of the present disclosure may determine the firmware to be upgraded, generate at least one set of public-private key pair, obtain the flash digest of the upgrade version of the firmware to be upgraded, successively label the flash digest using private key(s) in at least one set of public-private key pair, send the firmware upgrade package information to the electric device. The electric device may verify the upgrade version of the firmware to be upgraded using the firmware upgrade package information and the public key in at least one set of public-private key pair. In some embodiments, the firmware upgrade package information may include data of the upgrade version of the firmware to be upgraded, the flash digest, and the label on the flash digest.

The embodiments of the present disclosure provide a processing device for verifying firmware verification. The processing may execute one or more of the following operations. The information of the firmware upgrade package may be obtained from a server. The information of the firmware upgrade package may include data of an upgrade version of a firmware to be upgraded, a digest of the upgrade version of the firmware to be upgraded, the digest being labelled by a private key of at least one public-private key pair, and a label of the digest. The public-private key pair may include a public key stored in the firmware to be upgraded and a private key stored in a server. Additionally, private keys belong two or more different public-private key pairs may be stored in the server, respectively. The data of the upgrade version of the firmware to be upgraded, the digest, and the label of the digest may be obtained from the information of a firmware upgrade package, and the upgrade version of the firmware to be upgraded may be verified based on the public key of the at least one public-private key pair and the label.

In the present disclosure, the upgrade version of the firmware to be upgraded may be verified using the public key. The upgrade of the firmware may only be performed after the verification is passed. It may avoid a problem that a trusted signature verification is not performed on the firmware in the prior art. Therefore, malicious device upgrade for the device which embedded with the firmware may be prevented.

It should be noted that the above description of the computing device 1300 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

Figure 17:
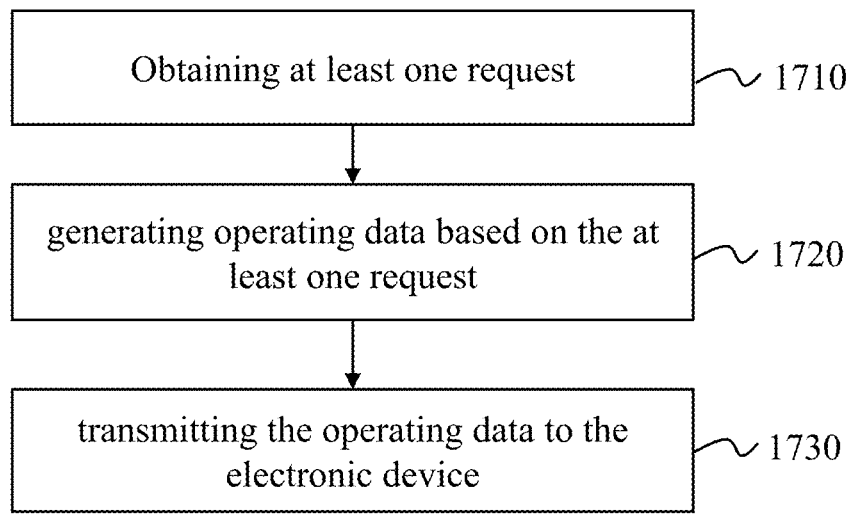
FIG. 17 is a flowchart illustrating an exemplary process for operating an electronic device according to some embodiments of the present disclosure.

FIG. 17 is a flowchart illustrating an exemplary process for operating an electronic device according to some embodiments of the present disclosure. In some embodiments, one or more operations of process 1700 illustrated in FIG. 17 for operating an electronic device may be implemented in the operating system 100 illustrated in FIG. 1. For example, the process 1700 illustrated in FIG. 17 may be stored in the storage device 130 in the form of instructions, and invoked and/or executed by the processing device 110. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 17 and described below is not intended to be limiting.

In 1710, the processing device 110 (e.g., a first communication module 1810) may obtain at least one request from one or more electronic devices (e.g., the electronic device(s) 120).

In some embodiments, the at least one request may include a controlling request, a communication protocol determining request, or a firmware upgrading request. When an electronic device needs to perform certain functions, for example, to control another electronic device, to communicate with a cloud platform, or to upgrade a firmware, it may send a request to the server and receives information or data needed to perform the function from the server.

In some embodiments, the at least one request may include a controlling request, a communication protocol determining request, or a firmware upgrading request. In some embodiments, the controlling request may include an access request of a control page of another electronic device. For example, a first electronic device (e.g., a smartphone) may transmit the controlling request in order to control a second electronic device (e.g., an intelligent lock). In some embodiments, the communication protocol determining request may include device information of the electronic device 120, for example, a gateway. The device information may include information related to a product serial number, information related to a version number, information related to a model, or the like. In some embodiments, the firmware upgrading request may include an upgrade instruction.

In 1720, the processing device 110 (e.g., a second processing module 1820) may generate operating data based on the at least one request.

In some embodiments, the operating data may include page data of the control page, configuration information corresponding to the device information, information of a firmware upgrade package, or the like, or any combination thereof.

In some embodiments, the page data of the control page may include at least one operation object and a preset instruction corresponding to the operation object.

In some embodiments, the configuration information may include information of a communication protocol to be configured by the electronic device (e.g., gateway) and information of a cloud platform to be configured by the electronic device (e.g., gateway).

In some embodiments, the information of a firmware upgrade package may include data of an upgrade version of a firmware to be upgraded, a digest of the upgrade version of the firmware to be upgraded, the digest being labelled by a private key of at least one public-private key pair, and a label of the digest.

In 1730, the processing device 110 (e.g., the second communication module 1810) may transmit the operating data to the electronic device.

In some embodiments, the processing device 110 may transmit the operating data to the electronic device via a wired or a wireless way, for example, Wi-Fi.

It should be noted that the above description of the process 1700 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 18:
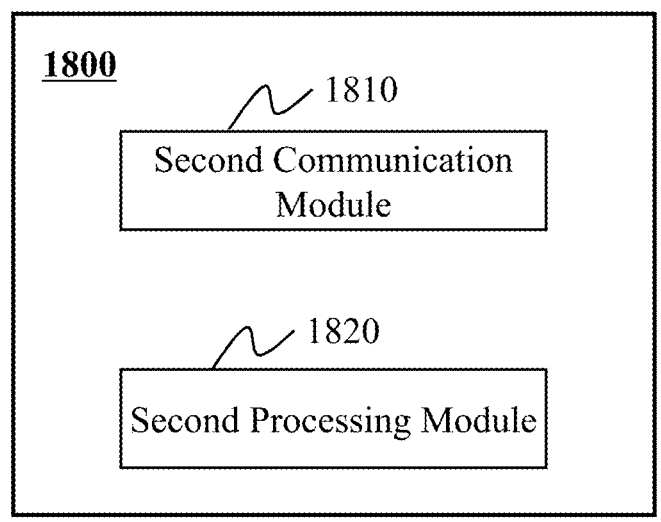
FIG. 18 is a block diagram illustrating an exemplary computing device according to some embodiments of the present disclosure.

FIG. 18 is a block diagram illustrating an exemplary computing device 1800 according to some embodiments of the present disclosure. At least a portion of the computing device 1800 may be implemented on the processing device 110 in FIG. 1. As illustrated in FIG. 18, the computing device 1800 may include a second communication module 1810, and a second processing module 1820.

The second communication module 1810 may be configured to obtain at least one request from one or more electronic devices (e.g., the electronic device(s) 120).

In some embodiments, the at least one request may include a controlling request, a communication protocol determining request, or a firmware upgrading request. When an electronic device needs to perform certain functions, for example, to control another electronic device, to communicate with a cloud platform, or to upgrade a firmware, it may send a request to the server and receives information or data needed to perform the function from the server.

In some embodiments, the at least one request may include a controlling request, a communication protocol determining request, or a firmware upgrading request. In some embodiments, the controlling request may include an access request of a control page of another electronic device. For example, a first electronic device (e.g., a smartphone) may transmit the controlling request in order to control a second electronic device (e.g., an intelligent lock). In some embodiments, the communication protocol determining request may include device information of the electronic device 120, for example, a gateway. The device information may include information related to a product serial number, information related to a version number, information related to a model, or the like. In some embodiments, the firmware upgrading request may include an upgrade instruction.

The second processing module 1820 may be configured to generate operating data based on the at least one request.

In some embodiments, the operating data may include page data of the control page, configuration information corresponding to the device information, information of a firmware upgrade package, or the like, or any combination thereof.

In some embodiments, the page data of the control page may include at least one operation object and a preset instruction corresponding to the operation object.

In some embodiments, the configuration information may include information of a communication protocol to be configured by the electronic device (e.g., gateway) and information of a cloud platform to be configured by the electronic device (e.g., gateway).

In some embodiments, the information of a firmware upgrade package may include data of an upgrade version of a firmware to be upgraded, a digest of the upgrade version of the firmware to be upgraded, the digest being labelled by a private key of at least one public-private key pair, and a label of the digest.

In some embodiments, the second communication module 1810 may further be configured to transmit the operating data to the electronic device.

In some embodiments, the second communication module 1810 may transmit the operating data to the electronic device via a wired or a wireless way, for example, Wi-Fi.

It should be noted that the above description of the computing device 1800 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

FIG. 19 is a flowchart illustrating another exemplary process for controlling an electronic device according to some embodiments of the present disclosure. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 19 and described below is not intended to be limiting. In some embodiments, one or more operations of process 1900 may be implemented in the operating system 100 illustrated in FIG. 1. For example, the process 1900 may be implemented on the processing device 110 of the operating system 100. In some embodiments, process 1900 may be implemented in a computer device, for example, a web server 430 illustrated in FIG. 4. The web server 430 may be in communication with the first electronic device 410. The first electronic device 410 may be in communication with a second electronic device 420. As shown in FIG. 5, the method may include one or more of the following operations.

In 1910, the web server 430 may obtain an access request of a control page of the second electronic device 420 sent by the first electronic device 410.

In 1920, the web server 430 may transmit page data of the control page to the first electronic device 410 to cause the first electronic device 410 to display the control page of the second electronic device 420, and further cause the first electronic device 410 to execute a control flow instruction corresponding to at least one operation object to control the second electronic device 420. In some embodiments, the first electronic device 410 may execute the control flow instruction based on an operation generated by a user on the operation object of the control page. The page data may include at least one operation object and at least one electronic device control flow instruction corresponding to the at least one operation object.

In some embodiments, the web server 430 may be a server of a manufacturer of the second electronic device 420. The manufacturer may maintain and modify the control page of the second electronic device 420 via the web server 430. The way for modifying the control page may be various, for example, modifying the electronic device control flow instructions corresponding to the operation object in the control page of the second electronic device 420.

In some embodiments, the page data of the control page may include at least one operation object and a preset instruction corresponding to the operation object. The preset instruction may include an electronic device control flow instruction. In some embodiments, the operation object may include a button, a slide bar, an input box, or the like. In some embodiments, the electronic device control flow instruction may include a control flow that needs to be executed for controlling the electronic device 420. For example, firstly, the electronic device 410 (e.g., the mobile phone) may send a message to the electronic device 420 (e.g., the intelligent home device). Then, the electronic device 410 may wait for a time period. If a feedback is obtained from the electronic device 420 during the time period, the electronic device 410 may perform processing based on the feedback. If there is no feedback obtained during the time period, the electronic device 410 may perform another processing. As another example, an interface of a Software Development Kit (SDK) may be invoked to send a message to the electronic device 420 (e.g., the intelligent home device). Then, another interface of the SDK may be invoked to send another message to the electronic device 420. In some embodiments, the SDK may be a toolkit provided by a third-party service provider to implement a function of software products, generally including an application programming interface (API), a document, an example, a tool, or the like.

Additionally or alternatively, the control page described in embodiments of the present disclosure may be a webpage conforming to the 5th generation HTML standard specification, that is, an H5 webpage. The H5 webpage may be a dynamic webpage being displayed on an electronic device (in particular, a mobile terminal such as a mobile phone or a tablet computer). Its supporting for touch screen interaction may far exceed the previous generation standard.

In some embodiments, for security purpose, the web server 430 may verify a device identification of the second electronic device 420 and/or an application identifier of the application sent by the first electronic device 410 via the control page.

Specifically, the user identification information of the user having the authority may be stored in the web server 430, so that the web server 430 may compare the received user identification information with the saved user identification information. If the received user identification information exists in the saved user identification information, the verification may be passed. It should be noted that the method for verification may be various, and not be limited to the present disclosure.

The present disclosure provides a method for controlling an electronic device. By implementing the method, the web server may obtain an access request of a control page of the second electronic device sent by the first electronic device. And the web server may transmit page data of the control page to the first electronic device to cause the first electronic device 410 to display the control page of the second electronic device 420, and further cause the first electronic device 410 to execute a control flow instruction corresponding to at least one operation object to control the second electronic device. Since the controlling of the second electronic device may be implemented by the control page, the control page may be configured and modified by the web server. Therefore, it is not necessary for the producer of the first electronic device and/or the publisher of the application in the first electronic device to understand the control flow instruction of the second electronic device, which greatly reduces the burden of development of the publisher of the first electronic device and/or the application of the first electronic device. At the same time, due to the flexibility of the webpage, it is easy for the web server to modify the control page by implementing the method described in the present disclosure. Meanwhile, modification(s) may need not be performed on the first electronic device and/or the application(s) in the first electronic. therefore, the adaptability and flexibility of the method may be stronger.

It should be noted that the above description of the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 21:
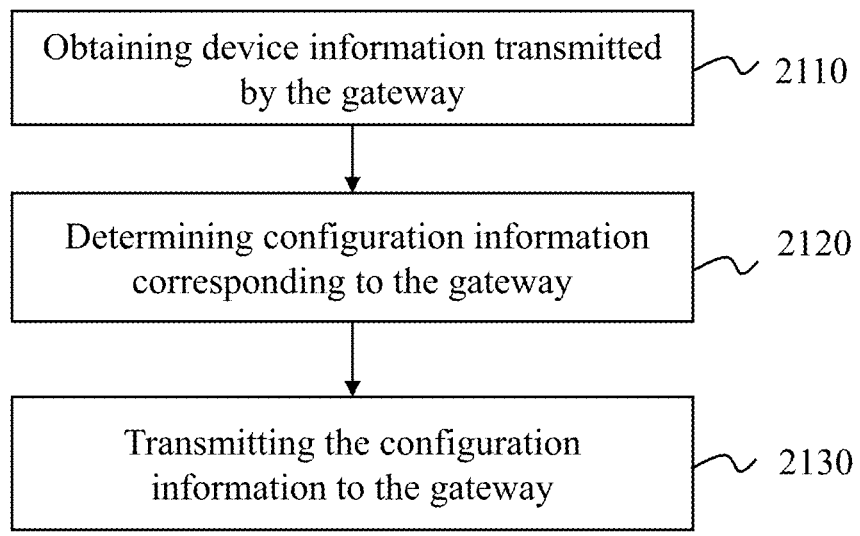
FIG. 21 is a flowchart illustrating another exemplary process for configuring an electronic device according to some embodiments of the present disclosure.

FIG. 20 is a block diagram illustrating an exemplary computing device 2000 according to some embodiments of the present disclosure. In some embodiments, at least a portion of the computing device 2000 may be implemented, for example, the web server 430 in FIG. 4. The web server 430 may be in communication with the first electronic device 410. The first electronic device 410 may be in communication with a second electronic device 420. As illustrated in FIG. 21, the computing device 2000 may include a request obtaining unit 2010, and a data transmitting unit 2020.

The request obtaining unit 2010 may be configured to obtain an access request of a control page of the second electronic device sent by the first electronic device.

The data transmitting unit 2020 may be configured to transmit page data of the control page to the first electronic device to cause the first electronic device to display the control page of the second electronic device, and further cause the first electronic device to execute a control flow instruction corresponding to at least one operation object to control the second electronic device. In some embodiments, the first electronic device may execute the control flow instruction based on an operation generated by a user on the operation object of the control page. The page data may include at least one operation object and at least one electronic device control flow instruction corresponding to the at least one operation object.

The web server may include a processor and a memory. The request obtaining unit and a data transmitting unit may be stored in the memory as program units. The program units stored in the memory may be executed by the processor to implement the corresponding function described in the present disclosure.

The processor may contain one or more kernels. The kernels may invoke the corresponding program unit(s) stored in the memory. The second electronic device may be controlled by adjusting parameters of the kernels.

The memory may include a non-persistent memory, a random access memory (RAM), and/or a non-volatile memory in a computer readable medium. For example, a read only memory (ROM) or a flash memory. The memory may include at least one memory chip.

It should be noted that the above description of the processing engine is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

FIG. 21 is a flowchart illustrating another exemplary process for configuring an electronic device according to some embodiments of the present disclosure. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 2100 and described below is not intended to be limiting. In some embodiments, one or more operations of process 2100 may be implemented in the operating system 100 illustrated in FIG. 1. For example, the process 2100 may be implemented on the processing device 110 (e.g., a server) of the operating system 100. As shown in FIG. 21, the method may include one or more of the following operations.

In 2110, the device information transmitted by the gateway may be obtained.

In 2120, the configuration information corresponding to the device information of the gateway may be determined. In some embodiments, the configuration information may include information of a communication protocol to be configured by the gateway and information of a cloud platform to be configured by the gateway.

It should be noted that, after the server obtains the information related to a product serial number, the information related to a version number, and information related to a model, the determination of the configuration information may include determining the configuration information corresponding to the device information of the gateway based on the information related to the product serial number.

In 2130, the configuration information may be transmitted to the gateway to cause the gateway to determine a first communication protocol component corresponding to the information of the first communication protocol, and further connect the first cloud platform using the first communication protocol component.

The embodiments of the present disclosure provide a gateway configuration method. By implementing the method, the server may determine the configuration information corresponding to the device information of the gateway after obtaining the device information transmitted by the gateway. The configuration information may include information of a communication protocol to be configured by the gateway and information of a cloud platform to be configured by the gateway. Then, the server may transmit the configuration information to the gateway to cause the gateway to determine a first communication protocol component corresponding to the information of the first communication protocol, and further connect the first cloud platform using the first communication protocol component. Based on the method described above, the gateway may connect with various cloud platforms via various communication protocols.

On the basis of the embodiments described above, the server may also monitor the number of disconnections between the first communication protocol component and the first cloud platform in a preset time period. If the number of disconnections exceeds a preset threshold, the configuration update information may be transmitted to the gateway to cause the gateway to determine the second communication protocol component corresponding to the information of the second communication protocol, and further connect the second cloud platform using the second communication protocol component. The configuration update information may include the information of the second communication protocol to be updated by the gateway and the information of the second cloud platform to be updated by the gateway.

It should be noted that the above description of the process 2100 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 22:
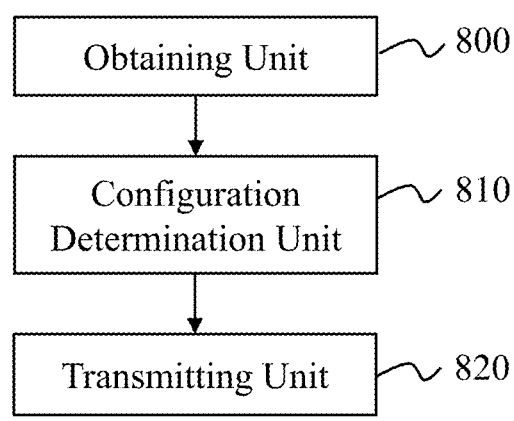
FIG. 22 is a block diagram illustrating an exemplary computing device according to some embodiments of the present disclosure.

FIG. 22 is a block diagram illustrating an exemplary computing device 2200 according to some embodiments of the present disclosure. In some embodiments, the computing device 2200 may be implemented as the processing device 110 illustrated in FIG. 1. In some embodiments, at least a portion of the computing device 2200 may be implemented in a processing device, for example, a server. As illustrated in FIG. 22, the computing device 2200 may include an obtaining unit 2210, a configuration information determination unit 2220, and a transmitting unit 2230

The obtaining unit 2210 may be configured to obtain the device information transmitted by the gateway.

The configuration information determination unit 2220 may be configured to determine the configuration information corresponding to the device information of the gateway. The configuration information may include information of a communication protocol to be configured by the gateway and information of a cloud platform to be configured by the gateway.

The transmitting unit 2230 may be configured to transmit the configuration information to the gateway to cause the gateway determines a first communication protocol component corresponding to the information of the first communication protocol, and further connect the first cloud platform using the first communication protocol component.

The computing device 2200 may include a processor and a memory. The obtaining unit 2210, the configuration information determination unit 2220, and the sending unit 2230 described above may be stored in the memory as program units. The program units stored in the memory may be executed by the processor to implement the corresponding function described in the present disclosure.

The processor may contain one or more kernels. The kernels may invoke the corresponding program unit(s) stored in the memory. The second electronic device may be controlled by adjusting parameters of the kernels.

The memory may include a non-persistent memory, a random access memory (RAM), and/or a non-volatile memory in a computer readable medium. For example, a read only memory (ROM) or a flash memory. The memory may include at least one memory chip.

It should be noted that the above description of the computing device 2200 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

Figure 23:
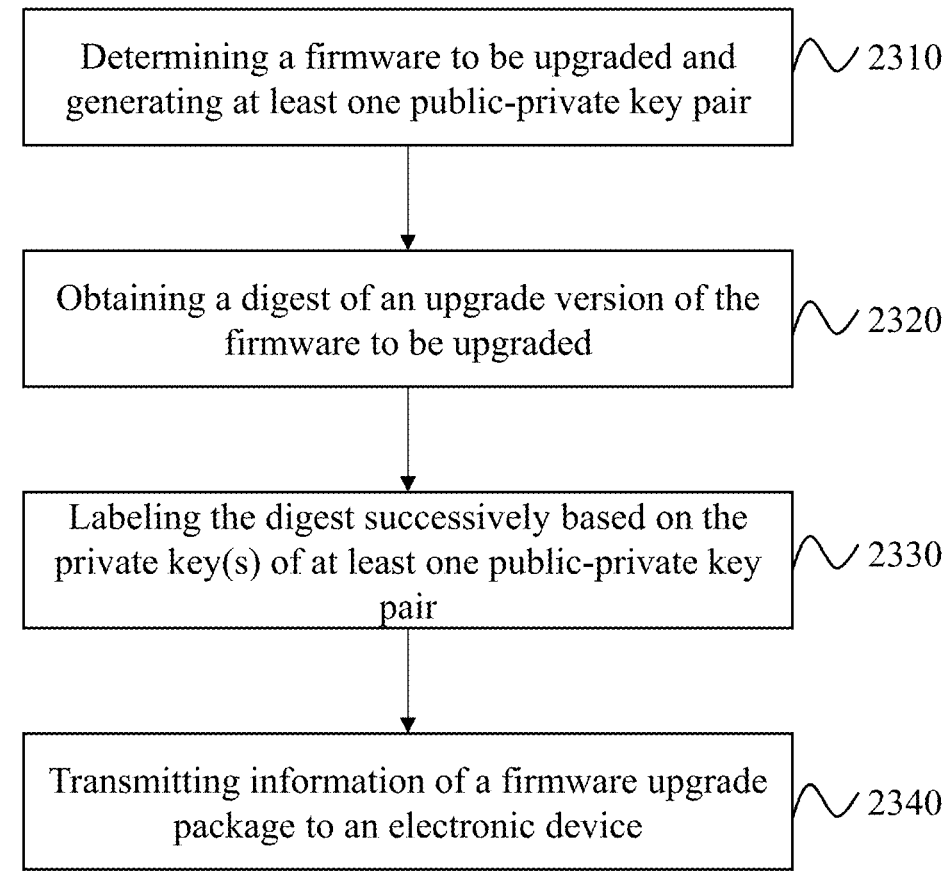
FIG. 23 is a flowchart illustrating another exemplary process for verifying a firmware version according to some embodiments of the present disclosure.

FIG. 23 is a flowchart illustrating another exemplary process for verifying a firmware version according to some embodiments of the present disclosure. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 23 and described below is not intended to be limiting. In some embodiments, one or more operations of process 2300 may be implemented in the operating system 100 illustrated in FIG. 1. For example, the process 2300 may be implemented on the processing device 110 (e.g., a server) of the operating system 100. As shown in FIG. 23, the method may include one or more of the following operations.

In 2310, a firmware to be upgraded may be determined, and at least one public-private key pair may be generated. In some embodiments, the public-private key pair may include a public key stored in the firmware to be upgraded and a private key stored in a server. Additionally, private keys belong two or more different public-private key pairs may be stored in the server, respectively.

In some embodiments, a firmware may be embedded in a device. After manufacturing, a certain of a firmware may be embedded in a device. When there is an upgrade version for the firmware in the server, the upgrade version may be downloaded to upgrade the firmware.

In an upgrading process, in order to avoid a source of the upgrade version being unreliable, the server may generate a public-private key pair. The public-private key pair may be used to in a process of signature verification on the upgrade version.

In some embodiments, at least one public-private key pair may be pre-stored in the firmware embedded in the device after the device is produced. The public key (e.g., a KEYpub) included in the at least one public-private key pair may be stored in the firmware, and the private key (e.g., a KEYpriv) included in the at least one public-private key pair may be stored on the server. In some embodiments, the server may include an administrator, a storage device, or the like, or any combination thereof. For example, the private key may be stored in the administrator for subsequent use.

In some embodiments, at least one public-private key pair may be generated when the firmware embedded in the device needs to upgrade. In some embodiments, the public key in the generated at least of public-private key pair may be stored in the firmware to be upgraded, and the private key in the generated at least one public-private key pair may be stored in the server.

In some embodiments, the private keys in two or more public-private key pairs may be stored in the server, respectively. The private keys may be stored in different servers or different locations of a server. For example, a first private key of the private keys may be stored in a first administrator, a second private key of the private keys may be stored in a second administrator, and a third private key of the private keys may be stored in a third administrator, so as to avoid leakage or lost of the private keys and ensure the security of the private keys in the two or more public-private key pairs.

In 2320, a digest of an upgrade version of the firmware to be upgraded may be obtained.

In some embodiments, the digest may include a flash digest, for example, a hash value. The hash value may be used to determine an integrity of the upgrade version of the firmware.

In some embodiments, in order to implement the signature verification on the firmware upgrade version, a signature algorithm, for example, ECDSA (Elliptic Curve Digital Signature Algorithm) may be used. The ECDSA may include a combination of ECC (Elliptic Curve Cryptography) algorithm and a DSA (Digital Signature Algorithm). The signature verification process of the ECDSA may be similar to a signature verification process of the DSA and the processing device 110 may use the ECC algorithm to perform the signature verification.

In some embodiments, a digest algorithm in the ECDSA may include a SHA256 (e.g., SHA256with ECDSA), a SHA1 (e.g., SHA1with ECDSA), or the like, or any other appropriate algorithm(s). For example, under a situation that the performance satisfies a requirement, SHA256with ECDSA may be used. As another example, under a special situation, SHA1with ECDS may be used.

In 2330, the digest may be labelled based on the private key(s) of the at least one public-private key pair.

In some embodiments, the flash digest may be labelled using the private key in the public-private key pairs to obtain a signature flash sign.

In some embodiments, one private key may be used to label the flash digest to obtain a signature flash sign when there is one public-private key pair. In some embodiments, each private key in two or more public-private key pairs may successively be used to label the flash digest to obtain two or more signature flash signs, for example, flash sign 1, flash sign 2, . . . , flash sign N.

Merely by way of example, given that the at least one public-private key pairs includes three public-private key pairs. A first private key may be used to label the flash digest to obtain the signature flash sign 1, a second private key may be used to label the flash digest to obtain the signature flash sign 2, and third private key may be used to label the flash digest to obtain the signature flash sign 3.

In 2340, information of a firmware upgrade package may be transmitted to an electronic device to cause the electronic device to verify the upgrade version of the firmware to be upgraded based on the information of the firmware upgrade package and the public key of the at least one public-private key pair. In some embodiments, the information of the firmware upgrade package information may include data of the upgrade version of the firmware to be upgraded, the digest, and the label of the digest.

In some embodiments, the information of the firmware upgrade package may be transmitted to the electronic device, and the electronic device may verify the upgrade version of the firmware to be upgraded based on the public key stored in the firmware to be upgraded and the label of the digest.

In some embodiments, the public key may be pre-stored in the firmware to be upgraded. The public key may correspond to the private key, and the public key and the private key may form a public-private key pair. The private key may be used to label the digest of the upgrade version to obtain a signature, and the public key may be matched or compared with the signature to confirm whether the digest of the upgrade version passes a verification, thereby determining whether the source of the upgrade version is reliable.

In response to a determination that the digest of the upgrade version passes the verification, the source of the upgrade version may be determined as reliable. In response to a determination that the digest of the upgrade version fails the verification, the source of the upgrade version may be determined as unreliable.

In some embodiments, the unreliable source of the upgrade version may indicate an abnormality of the private key(s) included in the at least one public-private key pair, for example, leaking and/or losing. It may cause the upgrade version of the firmware to be exploited by a hacker or other lawless person.

In some embodiments, at least one new public-private key pair corresponding to the at least one private key being abnormal may be generated. The number of the new generated public-private key pairs may be the same as the number of private keys being abnormal. The at least one private key being abnormal stored in the server may be replaced by a private key included in the generated at least one new public-private key pair. The at least one public key corresponding to the at least one private key being abnormal may be replaced by the public key in the new generated at least one new public-private key pair through a firmware upgrade.

In some embodiments, after at least one private key of the two or more public-private key pairs occurs abnormality, at least one new public-private key pair may be generated, and the number of the new generated public-private key pair may be same as the number of private keys being abnormal. For example, if one private key is abnormal, one new public-private key pair may be generated. If two private keys are abnormal, two public-private key pairs may be generated.

The abnormality of the private key may include leaking, losing, or the like.

For example, the private key may be stored in a storage device. If data stored in the storage device are lost or deleted, correspondingly the private key may occur abnormality and the public-private key pair may need to be updated.

In some embodiments, the private key may be stored in the storage device. the deletion and/or leakage of the data stored in the storage device may be determined based on whether the data is accessed by an unknown user. In some embodiments, the private key may be stored in the administrator. The administrator may upload the information about data leaking and/or losing, which may be used to determine that the private key is abnormal.

The embodiments of the present disclosure provide a firmware verification method. By implementing the method, a firmware to be upgraded may be determined, and at least one public-private key pair may be generated. The public-private key pair may include a public key stored in the firmware and a private key stored in a server. A digest of an upgrade version of the firmware to be upgraded may be obtained, and the digest may be labelled by the private key of the at least one public-private key pair. Information of a firmware upgrade package may be transmitted to an electronic device to cause the electronic device to verify the upgrade version of the firmware to be upgraded based on the information of the firmware upgrade package and the public key of the at least one public-private key pair. The information of the firmware upgrade package information may include data of the upgrade version of the firmware to be upgraded, the digest, and the label of the digest.

In the present disclosure, the digest of the upgrade version of the firmware to be upgraded may be labelled using the private key. The upgrade of the firmware may only be performed after the verification is passed. It may avoid a problem that a trusted signature verification is not performed on the firmware in the prior art. Therefore, malicious device upgrade for the device which embedded with the firmware may be prevented.

It should be noted that the above description of the process 2300 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 24:
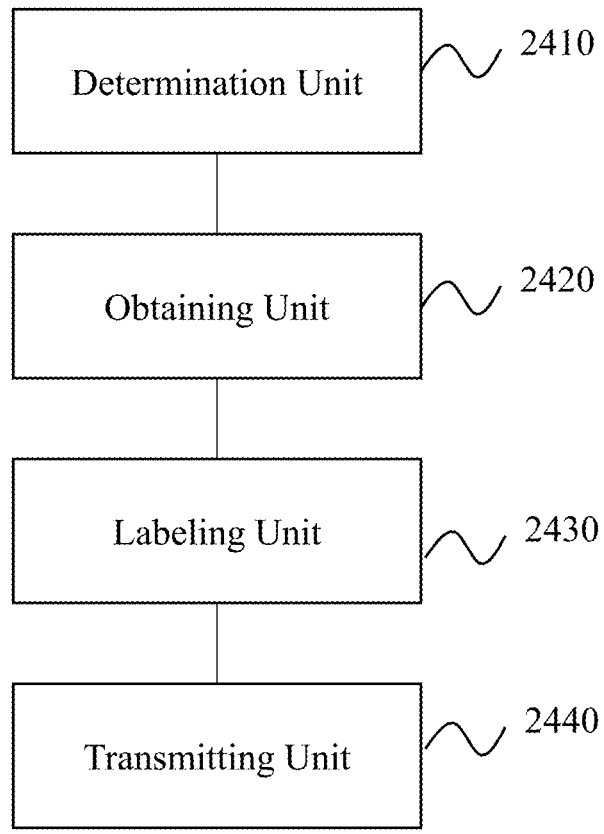
FIG. 24 is a block diagram illustrating an exemplary computing device according to some embodiments of the present disclosure.

FIG. 24 is a block diagram illustrating an exemplary computing device 2400 according to some embodiments of the present disclosure. In some embodiments, the computing device 2400 may be implemented as the processing device 110 illustrated in FIG. 1. In some embodiments, at least a portion of the computing device 2400 may be implemented in a processing device, for example, a server. As illustrated in FIG. 24, the computing device 2400 may include a determining unit 2410, an obtaining unit 2420, a labeling unit 2430, and a transmitting unit 2440.

The determination unit 2410 may be configured to determine a firmware to be upgraded, and generate at least one public-private key pair. In some embodiments, the public-private key pair may include a public key stored in the firmware to be upgraded and a private key stored in a server. Additionally, private keys belong two or more different public-private key pairs may be stored in the server, respectively.

In some embodiments, a firmware may be embedded in a device. After manufacturing, a certain firmware may be embedded in a device. When there is an upgrade version for the firmware in the server, the upgrade version may be downloaded to upgrade the firmware.

In an upgrading process, in order to avoid a source of the upgrade version being unreliable, the server may generate a public-private key pair. The public-private key pair may be used to in a process of signature verification on the upgrade version.

In some embodiments, at least one public-private key pair may be pre-stored in the firmware embedded in the device after the device is produced. The public key (e.g., a KEYpub) included in the at least one public-private key pair may be stored in the firmware, and the private key (e.g., a KEYpriv) included in the at least one public-private key pair may be stored on the server. In some embodiments, the server may include an administrator, a storage device, or the like, or any combination thereof. For example, the private key may be stored in the administrator for subsequent use.

In some embodiments, at least one public-private key pair may be generated when the firmware embedded in the device needs to upgrade. In some embodiments, the public key in the generated at least of public-private key pair may be stored in the firmware to be upgraded, and the private key in the generated at least one public-private key pair may be stored in the server.

In some embodiments, the private keys in two or more public-private key pairs may be stored in the server, respectively. The private keys may be stored in different servers, or different locations of a server. For example, a first private key of the private keys may be stored in a first administrator, a second private key of the private keys may be stored in a second administrator, and a third private key of the private keys may be stored in a third administrator, so as to avoid leakage or lost of the private keys and ensure the security of the private keys in the two or more public-private key pairs.

The obtaining unit 2420 may be configured to obtain a digest of an upgrade version of the firmware to be upgraded.

In some embodiments, the digest may include a flash digest, for example, a hash value. The hash value may be used to determine an integrity of the upgrade version of the firmware.

In some embodiments, in order to implement the signature verification on the firmware upgrade version, a signature algorithm, for example, ECDSA (Elliptic Curve Digital Signature Algorithm) may be used. The ECDSA may include a combination of ECC (Elliptic Curve Cryptography) algorithm and a DSA (Digital Signature Algorithm). The signature verification process of the ECDSA may be similar to a signature verification process of the DSA and the processing device 110 may use the ECC algorithm to perform the signature verification.

In some embodiments, a digest algorithm in the ECDSA may include a SHA256 (e.g., SHA256with ECDSA), a SHA1 (e.g., SHA1with ECDSA), or the like, or any other appropriate algorithm(s). For example, under a situation that the performance satisfies a requirement, SHA256with ECDSA may be used. As another example, under a special situation, SHA1with ECDS may be used.

The labeling unit 2430 may be configured to label the digest based on the private key(s) of the at least one public-private key pair.

In some embodiments, the flash digest may be labelled using the private key in the public-private key pairs to obtain a signature flash sign.

In some embodiments, one private key may be used to label the flash digest to obtain a signature flash sign when there is one public-private key pair. In some embodiments, each private key in two or more public-private key pairs may successively be used to label the flash digest to obtain two or more signature flash signs, for example, flash sign 1, flash sign 2, . . . , flash sign N.

Merely by way of example, given that the at least one public-private key pairs includes three public-private key pairs. A first private key may be used to label the flash digest to obtain the signature flash sign 1, a second private key may be used to label the flash digest to obtain the signature flash sign 2, and third private key may be used to label the flash digest to obtain the signature flash sign 3.

The transmitting unit 2440 may be configured to transmit information of a firmware upgrade package to an electronic device to cause the electronic device to verify the upgrade version of the firmware to be upgraded based on the information of the firmware upgrade package and the public key of the at least one public-private key pair. In some embodiments, the information of the firmware upgrade package information may include data of the upgrade version of the firmware to be upgraded, the digest, and the label of the digest.

In some embodiments, the information of the firmware upgrade package may be transmitted to the electronic device, and the electronic device may verify the upgrade version of the firmware to be upgraded based on the public stored in the firmware to be upgraded and the label of the digest.

In some embodiments, the public key may be pre-stored in the firmware to be upgraded. The public key may correspond to the private key, and the public key and the private key may form a public-private key pair. The private key may be used to label the digest of the upgrade version to obtain a signature, and the public key may be matched or compared with the signature to confirm whether the digest of the upgrade version passes a verification, thereby determining whether the source of the upgrade version is reliable.

In response to a determination that the digest of the upgrade version passes the verification, the source of the upgrade version may be determined as reliable. In response to a determination that the digest of the upgrade version fails the verification, the source of the upgrade version may be determined as unreliable.

In some embodiments, the unreliable source of the upgrade version may indicate an abnormality of the private key(s) included in the at least one public-private key pair, for example, leaking and/or losing. It may cause the upgrade version of the firmware to be exploited by a hacker or other lawless person.

In some embodiments, the processing device 2500 may further include a key updating unit. The key updating unit may be configured to generate at least one new public-private key pair corresponding to the at least one private key being abnormal. The number of the new generated public-private key pairs may be the same as the number of private keys being abnormal. The at least one private key being abnormal stored in the server may be replaced by a private key included in the generated at least one new public-private key pair. The at least one public key corresponding to the at least one private key being abnormal may be replaced by the public key in the generated at least one new public-private key pair through firmware upgrade.

In some embodiments, after at least one private key of the two or more public-private key pairs occurs abnormality, at least one new public-private key pair may be generated, and the number of the new generated public-private key pair may be same as the number of private keys being abnormal. For example, if one private key is abnormal, one new public-private key pair may be generated. If two private keys are abnormal, two public-private key pairs may be generated.

The abnormality of the private key may include leaking, losing, or the like.

For example, the private key may be stored in a storage device. If data stored in the storage device are lost or deleted, correspondingly the private key may occur abnormality and the public-private key pair may need to be updated.

In some embodiments, the private key may be stored in the storage device. the deletion and/or leakage of the data stored in the storage device may be determined based on whether the data is accessed by an unknown user. In some embodiments, the private key may be stored in the administrator. The administrator may upload the information about data leaking and/or losing, which may be used to determine that the private key is abnormal.

The embodiments of the present disclosure provide a processing device for verifying firmware verification. The processing may execute one or more of the following operations. A firmware to be upgraded may be determined, and at least one public-private key pair may be generated. The public-private key pair may include a public key stored in the firmware and a private key stored in a server. A digest of an upgrade version of the firmware to be upgraded may be obtained, and the digest may be labelled by the private key of the at least one public-private key pair. Information of a firmware upgrade package may be transmitted to an electronic device to cause the electronic device to verify the upgrade version of the firmware to be upgraded based on the information of the firmware upgrade package and the public key of the at least one public-private key pair. The information of the firmware upgrade package information may include data of the upgrade version of the firmware to be upgraded, the digest, and the label of the digest.

In the present disclosure, the digest of the upgrade version of the firmware to be upgraded may be labelled using the private key. The upgrade of the firmware may only be performed after the verification is passed. It may avoid a problem that a trusted signature verification is not performed on the firmware in the prior art. Therefore, malicious device upgrade for the device which embedded with the firmware may be prevented.

It should be noted that the above description of the computing device 2400 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

Figure 25:
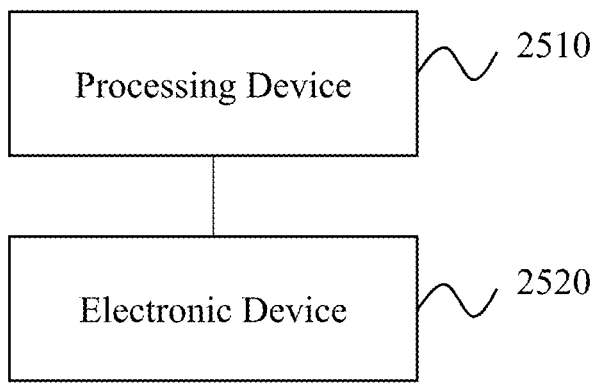
FIG. 25 is a block diagram illustrating an exemplary firmware verification system 2500 according to some embodiments of the present disclosure.

FIG. 25 is a block diagram illustrating an exemplary firmware verification system 2500 according to some embodiments of the present disclosure. In some embodiments, the system 2400 may be implemented in the operating system 100 illustrated in FIG. 1. As illustrated in FIG. 25, the system 2500 may include a processing device 2510, and an electronic device 2520.

Referring to FIG. 24, the processing device 2510 may include a determining unit, an obtaining unit, a labeling unit, and a transmitting unit.

The determination unit may be configured to determine a firmware to be upgraded, and generate at least one public-private key pair.

The obtaining unit may be configured to obtain a digest of an upgrade version of the firmware to be upgraded.

The labeling unit may be configured to label the digest based on the private key(s) of the at least one public-private key pair.

The transmitting unit may be configured to transmit information of a firmware upgrade package to an electronic device to cause the electronic device to verify the upgrade version of the firmware to be upgraded based on the information of the firmware upgrade package and the public key of the at least one public-private key pair. In some embodiments, the information of the firmware upgrade package information may include data of the upgrade version of the firmware to be upgraded, the digest, and the label of the digest.

Referring to FIG. 13, the electronic device 2520 may include an obtaining unit, and a verification unit.

The obtaining unit may be configured to obtain information of a firmware upgrade package from the server. In some embodiments, the information of the firmware upgrade package may include data of an upgrade version of a firmware to be upgraded, a digest of the upgrade version of the firmware to be upgraded, the digest being labelled by a private key of at least one public-private key pair, and a label of the digest. The public-private key pair may include a public key stored in the firmware to be upgraded and a private key stored in a server. Additionally, private keys belong two or more different public-private key pairs may be stored in the server, respectively.

The verification unit may be configured to obtain the data of the upgrade version of the firmware to be upgraded, the digest, and the label of the digest, and verify the upgrade version of the firmware to be upgraded based on the public key of the at least one public-private key pair and the label.

The processing device 2510 and the electronic device 2520 in the firmware verification system 2500 disclosed in this embodiment may be the same as the embodiments mentioned above, and may not be repeated herein.

Figure 26:
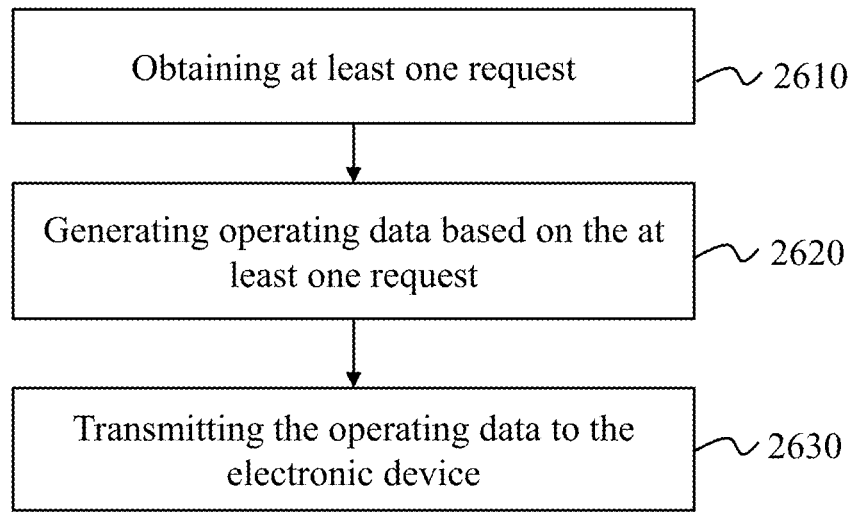
FIG. 26 is a flowchart illustrating another exemplary process for operating an electronic device according to some embodiments of the present disclosure.
Figure 27:
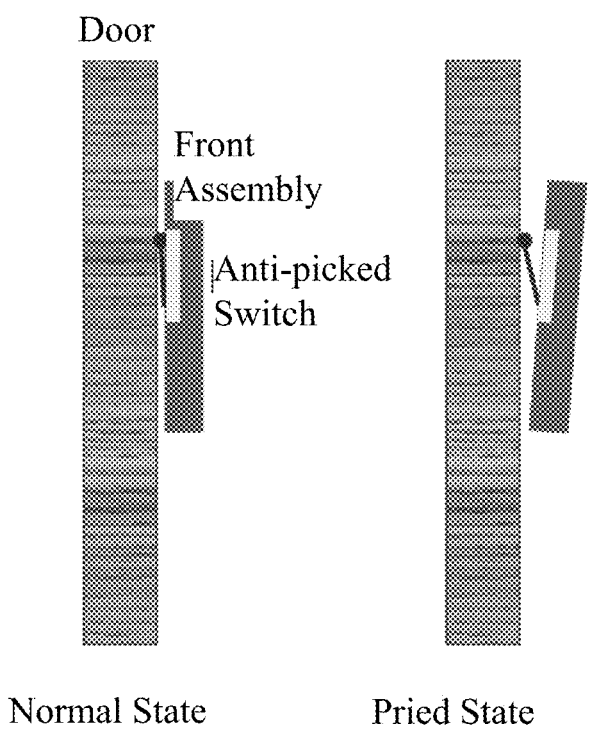
FIG. 27 illustrates a state comparison of the intelligent lock before and after prying in prior art.

FIG. 26 is a flowchart illustrating an exemplary process for operating an electronic device according to some embodiments of the present disclosure. In some embodiments, one or more operations of process 2600 illustrated in FIG. 26 for operating an electronic device may be implemented in the operating system 100 illustrated in FIG. 1. For example, the process 2600 illustrated in FIG. 26 may be stored in the storage device 130 in the form of instructions, and invoked and/or executed by the electronic device 120. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 26 and described below is not intended to be limiting.

In 2610, the electronic device 120 (e.g., the first communication module 310) may obtain sensing data of the electronic device 120 and/or sensing data of a surroundings of the electronic device 120. In some embodiments, the sensing data may be captured by one or more sensors, including an acceleration sensor, a velocity sensor, a gravity sensor, a temperature sensor, a humidity sensor, a noise sensor, an ultrasound sensor, an optical sensor, an infrared sensor, a laser sensor, a gyroscope, or the like, or any combination thereof. Correspondingly, the sensing data may include an acceleration of the electronic device 120, a velocity of the electronic device 120, a gravity of the surroundings, a temperature of the surroundings, a humidity of the surroundings, a noise of the surroundings, an ultrasound spectrum of the surroundings, an optical image of the surroundings, an infrared image of the surroundings, a point cloud frame of the surroundings, an orientation and an angular velocity of the electronic device 120, or the like, or any combination thereof. In some embodiments, the sensor(s) may be a part of the electronic device 120, or may be installed remotely from the electronic device 120. For example, a noise sensor such as a mic may be a part of the electronic device 120 such as a smartphone. As another example, the electronic device 120 such as an intelligent door lock may obtain the sensing data such as indoor temperature from a temperature sensor installed on a wall of the room. In some embodiments, the electronic device 120 may obtain the sensing data by connecting with the sensor(s) directly, for example, via a wired network or a wireless network. In some embodiments, the sensor(s) may transmit the sensing data to a storage, for example, the storage device 130. The electronic device 120 may obtain the sensing data by accessing the storage device 130 via the network 140.

In 2620, the electronic device 120 (e.g., the first processing module 320) may determine whether the sensing data satisfy a preset condition. In some embodiments, the preset condition may include a comparison, for example, a comparison with a threshold. In some embodiments, the preset condition may include whether the acceleration of the electronic device 120 is greater than a preset acceleration, whether the temperature of the surroundings is greater than or equal to a temperature threshold, whether an output volume is a fixed preset volume, whether an abnormality of the electronic device 120 is caused by at least one environmental parameter, whether a change of the orientation of the electronic device 120 is greater than or equal to a preset orientation change threshold, whether the angular velocity of the electronic device 120 is greater than or equal to a preset angular velocity threshold, or the like, or any combination thereof. Given the electronic device 120 is an intelligent lock mounted on a door, in some occasions, the sensing data captured by the electronic device 120 may be used to monitor a state of the electronic device 120 and a state of the door. For example, assuming the intelligent electronic device 120 was locked, if the acceleration of the electronic device 120 is greater than the preset acceleration, the change of the orientation of the electronic device 120 is greater than or equal to the preset orientation change threshold, and/or the angular velocity of the electronic device 120 is greater than or equal to the preset angular velocity threshold, the electronic device 120 may be considered to be unlocked. As another example, assuming the door was closed, in response to a determination that the electronic device 120 is considered to be unlocked, the door may be considered to have been opened. As still another example, if the electronic device 120 was considered to be unlocked and the door was considered to have been opened, the door may be determined to be open. If the sensing data satisfy the preset threshold, process 2600 may proceed to 2630. Otherwise, process 2600 may be ended. For example, if the acceleration of the electronic device 120 is smaller than the preset acceleration, the change of the orientation of the electronic device 120 is smaller than the preset orientation change threshold, and/or the angular velocity of the electronic device 120 is smaller than the preset angular velocity threshold, the electronic device 120 may keep locked and the door may keep closed.

In 2620, the electronic device 120 (e.g., the first processing module 320) may execute a preset operation. In some embodiments, the preset operation may include an operation corresponding to the satisfied preset condition. For example, if the acceleration of the electronic device 120 is greater than a preset acceleration, the electronic device 120 may generate an alarm signal and send the alarm signal to an alertor. The alertor may generate an alarm based on the alarm signal to remind the user of the electronic device 120 that the electronic device 120 is being destroyed. As another example, if the electronic device 120 is considered to be unlocked, the electronic device 120 may generate an alarm signal indicating that the electronic device is unlocked (or the door is opened) and direct an imaging sensor (e.g., the optical sensor, the infrared sensor, an imaging sensor integrated into or independent from the electronic device 120) to obtain an image of the surroundings of the electronic 120 and/or the door. The alertor may obtain the alarm signal from the electronic device 120 and obtain the image of the surroundings from the imaging sensor. The alertor may generate an alarm based on the alarm signal and the image of the surroundings to remind the user that the electronic device is unlocked (or the door is opened) and display one or more images or a video of the surroundings to the user. The user may check a real-time image or a real-time video of the surroundings based on the alarm. As another example, given the electronic device 120 is an intelligent lock, if the temperature of the surroundings is greater than or equal to a temperature threshold, the intelligent lock may be unlocked automatically, allowing people to escape from abnormal indoor environments quickly, such as fire. As another example, if the output volume of the electronic device 120 is not a fixed preset volume, the electronic device 120 may output a volume based on the noise data. As another example, if the abnormality of the electronic device 120 is caused by the at least one environmental parameter such as a temperature and/or a humidity, the electronic device 120 may generate prompt information to remind the user that the abnormality is related to the at least one target environmental parameter. As another example, under the situation that the electronic device 120 is considered to be unlocked and the door is considered to be open, if the acceleration of the electronic device 120 has been decreased to be lower than a threshold corresponding to a locked state of the door, the electronic device 120 may change its state from unlocked to locked.

It should be noted that the above description of the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 28:
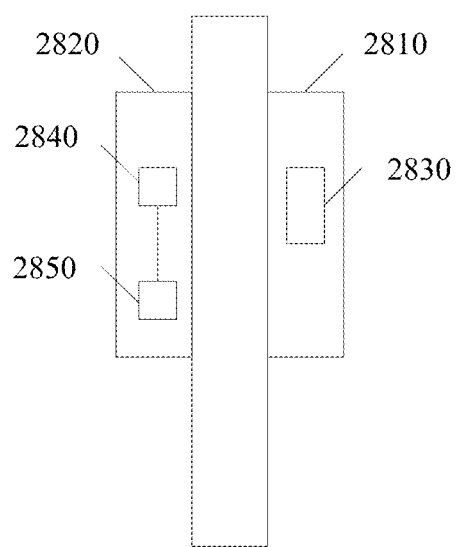
FIG. 28 is a schematic diagram illustrating an exemplary intelligent lock with an anti-pry device of according to some embodiments of the present disclosure.

FIG. 28 is a schematic diagram illustrating an exemplary electronic device with an anti-pry apparatus according to some embodiments of the present disclosure. The anti-pry apparatus may be a part of the electronic device. In some embodiments, the electronic device may include a front assembly 2810 installed on the outside of a room and a rear assembly 2820 installed on the inside of the room.

In some embodiments, the front assembly 2810 may include an acceleration sensor 2830 configured to collect an acceleration of the front assembly 2810.

Understandably, an electronic device installed outside of a room or a house, for example, an intelligent lock, a surveillance camera, a visible doorbell, or the like, may be pried The acceleration sensor 2830 may collect the acceleration of the front assembly 2810 in real time. In some embodiments, the first preset time may be a predetermined period, which may be set based on experience or experimental results.

In some embodiments, a damping device (e.g., a silicone pad) may be mounted between the installation site of the front assembly 2810 and the front assembly 2810 to reduce the influence of external vibration on the acceleration sensor 2830.

In some embodiments, the damping device may be mounted on a contacting position between the front assembly 2810 and the acceleration sensor 2830 to reduce the influence of external vibration on the acceleration sensor 2830.

In some embodiments, the rear assembly 2820 may include a processor 2840 and an alertor 2850.

Figure 29:
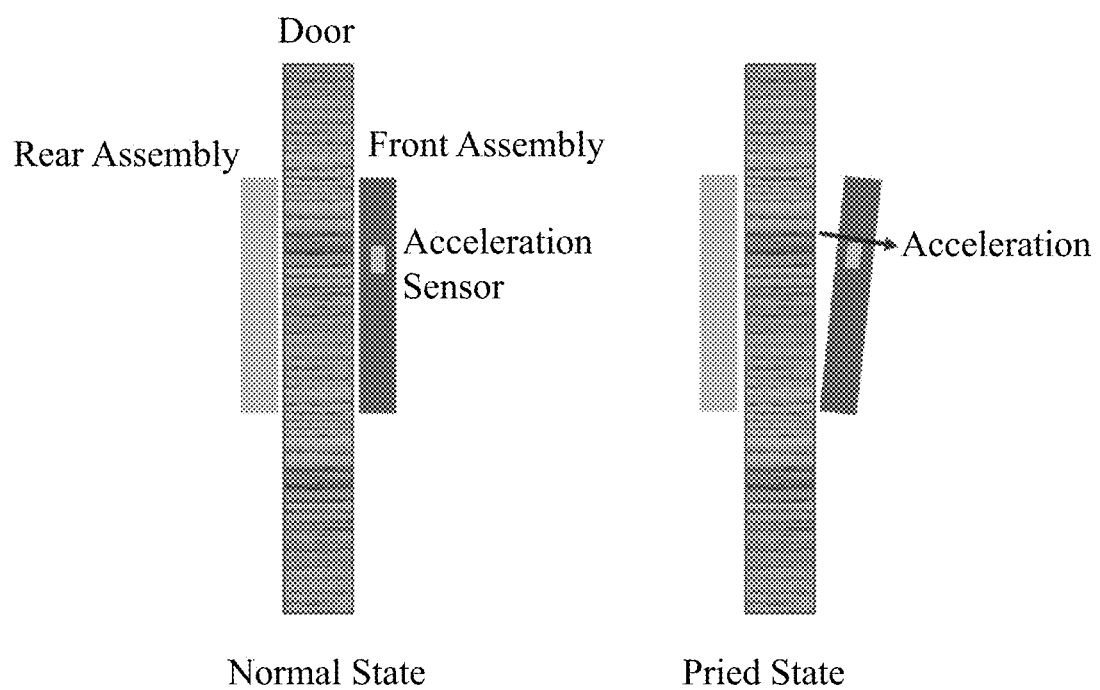
FIG. 29 illustrates a state comparison of the acceleration sensor before and after the electronic device is pried according to some embodiments of the present disclosure.
Figure 30:
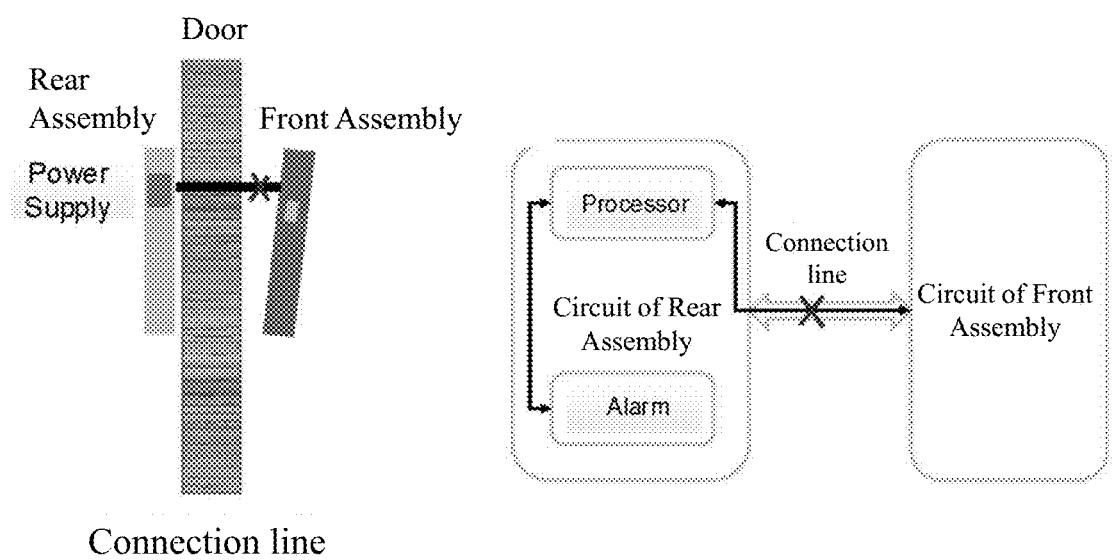
FIG. 30 illustrates a disconnection of the connecting line between the front assembly and rear assembly of the electronic device after being pried according to some embodiment of the present disclosure.

Taking intelligent lock as an example, the front assembly 2810 and the rear assembly 2820 of the electronic device may be mounted on both sides of a door. Referring to FIG. 29, FIG. 29 illustrates a state comparison of the acceleration sensor before and after the electronic device is pried according to some embodiments of the present disclosure. As shown in FIG. 29, in a normal state, the door is closed, and the acceleration sensor 2830 may not detect a large acceleration. In a pried state, the front assembly 2810 may generate a large acceleration. The processor 2840 may determine whether the intelligent lock is being pried according to the acceleration of the front assembly 2810, and trigger the alertor 2850 to raise an alarm in response to a determination that the intelligent lock is being pried In some embodiments, referring to FIG. 30, FIG. 30 illustrates a disconnection of the connecting line between the front assembly and rear assembly of the electronic device after being pried according to some embodiment of the present disclosure. As illustrated in FIG. 30, a set of lines may be arranged between the front assembly 2810 and the rear assembly 2820. The set of lines may include a power line, a connecting line, or the like, or any combination thereof. Specifically, a connection line may be arranged between the processor 2840 and the front assembly 2810. In some embodiments, a disconnection of the connecting line may be caused by an artificial cutting. In this case, the processor 2840 may determine that the electronic device is being pried. The processor 2840 may detect whether the connecting line is disconnected, and trigger the alertor 2850 to raise an alarm in response to the determination that the connection line is disconnected.

In some embodiments, the electronic device with the anti-pry device may also include a power supply mounted in the rear assembly 2820. The power supply may include a battery pack to supply power to the electronic device. Specifically, the power supply may be connected to and power the acceleration sensor 2830, the processor 2840, and the alertor 2850. In some embodiments, the power supply may be mounted in the rear assembly 2802, which is convenient for battery changing and easy installing. Meanwhile, it may prevent the battery from being stolen to cause the alarm function invalid.

In some embodiments, the electronic device may only include the front assembly 2810 installed on the outside of the room. The processor 2840, the alertor 2850, and the power supply may be integrated in the assembly 2810.

The embodiments of the present disclosure provide an electronic device with the anti-pry device. The electronic device may include an acceleration sensor to obtain the acceleration of the front assembly in real time. The acceleration may be used to determine whether the electronic device is being pried. In response to the determination that the electronic device is being pried, the alertor may be triggered to raise alarm. Software may be used to filter special scenes such as decoration and knocking, which may reduce the probability of false alarms. The disconnection detection for the connection line connecting the front and rear assembly may improve the reliability of the electronic device.

Figure 31:
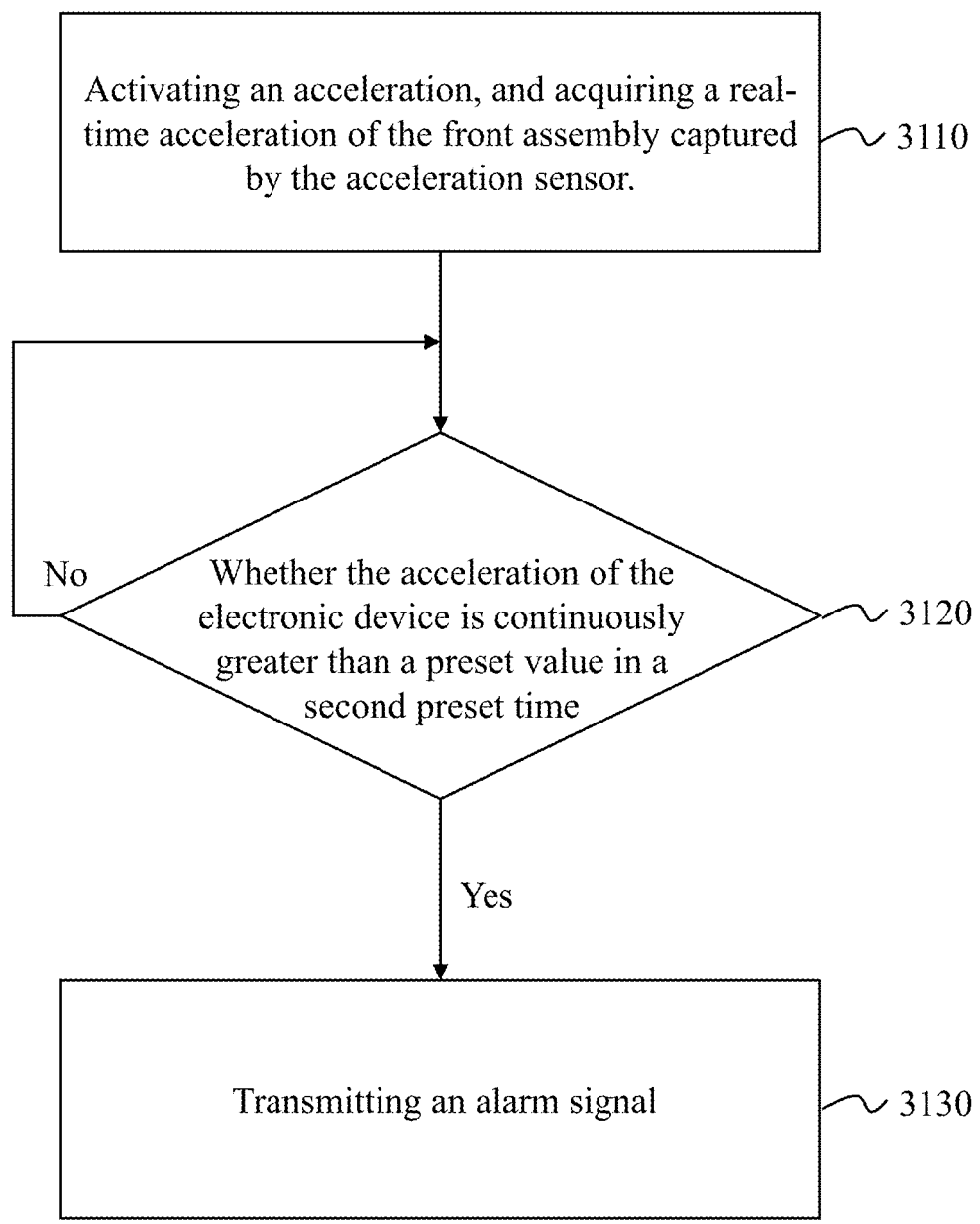
FIG. 31 is a flowchart illustrating an exemplary process of anti-prying of an electronic device according to some embodiments of the present disclosure.

FIG. 31 is a flowchart illustrating an exemplary process of anti-prying of an electronic device according to some embodiments of the present disclosure. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 31 and described below is not intended to be limiting. In some embodiments, one or more operations of process 3100 may be implemented in the operating system 100 illustrated in FIG. 1. For example, the process 3100 may be implemented on the electronic device 120 (e.g., an intelligent lock, or the processor of the intelligent lock) of the operating system 100. As shown in FIG. 31, the method may include one or more of the following operations.

In 3110, the processor may activate an acceleration sensor after the electronic device is powered on, and obtain a real-time acceleration of the front assembly captured by the acceleration sensor.

In some embodiments, the front assembly may be mounted outside of the room. In some embodiments, the electronic device may include an intelligent lock. The processor may activate the acceleration sensor after detecting that the door is closed, and acquire a real-time acceleration of the front assembly captured by the acceleration sensor.

The detecting whether the door is closed may be implemented by detecting a mechanical structure of the door lock tongue, or through a sensor, or any method which can detect that the door is closed.

After detecting the door is closed, the processor may activate the acceleration sensor after a first preset time.

In 3120, the processor may determine whether the electronic device is being pried according to the real-time acceleration of the front assembly.

In some embodiments, the processor may determine whether the real-time acceleration of the front assembly is continuously greater than a preset value in a second preset time. In response to a determination that the real-time acceleration of the front assembly is continuously greater than a preset value in the second preset time, the processor may generate a determination that the electronic device is being pried.

In some embodiments, the second preset time may be a period after the first preset time. The second preset time may be adjusted according to experience and experimental results.

For example, the second preset time may be set as 0.5s. When the detected real-time acceleration is continuously greater than the preset value (e.g., 0.1 times the gravitational acceleration) within 0.5 s, the processor may generate the determination that the intelligent lock is being pried.

In some embodiments, if the electronic device is being pried, process 3100 may proceed to step 3130. In 3130, the processor may transmit an alarm signal to an alertor to trigger the alertor to raise an alarm.

The alarm may include a voice alarm, a light flashing alarm, a beep alarm, or the like, or any combination thereof.

If the electronic device is not being pried, process 3100 may proceed back to step 3120.

In some embodiments, the method may further include one or more of the following operations.

The processor may detect whether the connection line arranged between the front assembly and the rear assembly is disconnected. In response to a determination that the connecting line is disconnected, the processor may transmit an alarm signal to an alertor to trigger the alertor to raise an alarm. The rear assembly may be mounted inside the room.

The disconnection of the connection line between the front assembly and the rear assembly may be caused by an artificial cutting. In this case, the processor may generate the determination that the electronic device is being pried, and transmit the alarm signal to the alertor to trigger the alertor to raise an alarm.

The present disclosure provides a method of anti-prying of an electronic device. By implementing the method, the acceleration sensor may be activated immediately when the electronic device is powered on, or when detecting the door is closed. A real-time acceleration of the front assembly may be obtained. The real-time acceleration may be used to determine whether the electronic device is being pried. Compared to a traditional method using a mechanical switch to determine whether the electronic device is being pried, the method disclosed in the present disclosure may reduce the impact of installation environment and installation methods on the effectiveness of the anti-pry device in the electronic device. The method may also reduce the requirements for the installation of the electronic device, and the probability of false alarms. Furthermore, the method may improve the reliability of the electronic device alarm device. Meanwhile, the detection of disconnection of the connection line connecting the front and rear assembly may improve the reliability of the intelligent lock.

The embodiments of the present disclosure may also provide a processor. In some embodiments, at least a portion of the processor may be implemented on the anti-prying device of the electronic device. The processor may include an acceleration obtaining unit, and a determination unit.

The acceleration obtaining unit may be configured to activate an acceleration sensor immediately when the electronic device is powered on, or after detecting that the door is closed, and acquire a real-time acceleration of the front assembly captured by the acceleration sensor. The front assembly may be mounted outside of the room.

The acceleration obtaining unit may activate the acceleration sensor immediately when the electronic device is powered on, or after a first preset time when the door is detected to be closed.

The determination unit may be configured to determine whether the electronic device is being pried according to the real-time acceleration of the front assembly. If the intelligent lock is being pried, the determination unit may transmit an alarm signal to an alertor to trigger the alertor to raise an alarm.

In some embodiments, the processor may further include a detection unit. The detection unit may be configured to detect whether the connection line arranged between the front assembly and the rear assembly is disconnected. If the connection line arranged between the front assembly and the rear assembly is disconnected, the detection unit may transmit an alarm signal to an alertor to trigger the alertor to raise an alarm. The rear assembly may be mounted inside the door.

The determination unit may be configured to determine whether the real-time acceleration of the front assembly is continuously greater than a preset value in a second preset time. If the real-time acceleration of the front assembly is continuously greater than a preset value in the second preset time, the determination that the intelligent lock is being pried may be generated.

The processor provided according to some embodiments of the present disclosure may determine whether the electronic device is being pried by detecting the acceleration of the front assembly and the connection line arranged between the front assembly and the rear assembly. The processor may transmit an alarm signal to an alertor to trigger the alertor to raise an alarm in response to the determination that the intelligent lock is being pried. The acceleration sensor may instead of the traditional mechanical switch in the electronic device, which may improve the accuracy of detecting prying. The detection of disconnection of the connection line connecting the front assembly and rear assembly may improve the reliability of the electronic device.

It should be noted that the above description of the process 3100 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 32:
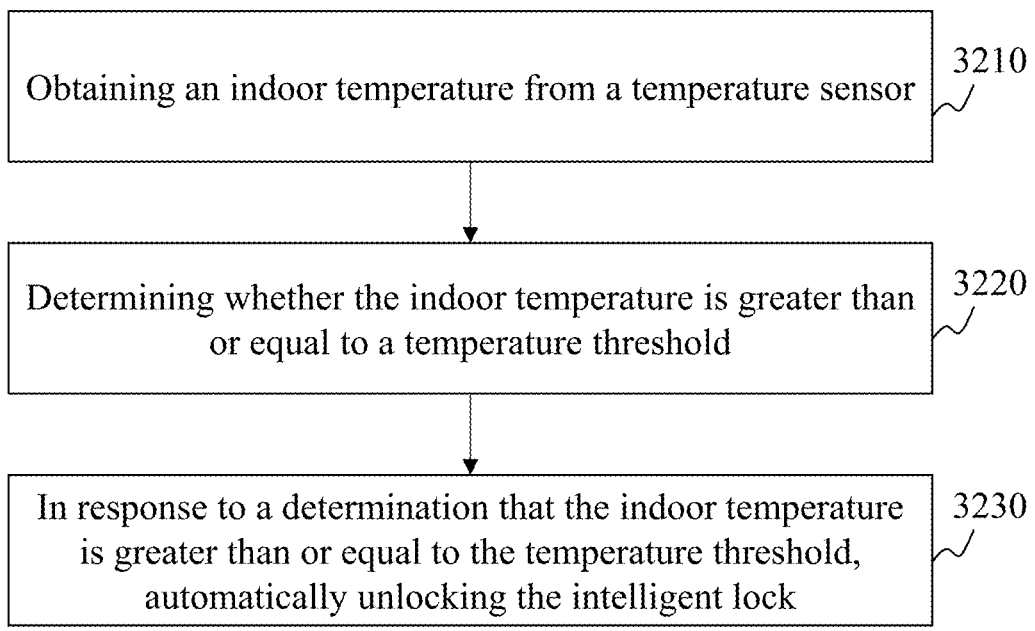
FIG. 32 is a flowchart illustrating an exemplary process for automatically unlocking an intelligent lock according to some embodiments of the present disclosure.

FIG. 32 is a flowchart illustrating an exemplary process for automatically unlocking an intelligent lock according to some embodiments of the present disclosure. In some embodiments, process 3200 may be executed by the system 100. For example, the process 3200 may be implemented as a set of instructions (e.g., an application) stored in a storage device (e.g., the storage device 130). In some embodiments, the electronic device 120 may execute the set of instructions and may accordingly be directed to perform the process 3200.

In 3210, the electronic device 120 (e.g., a microcontroller unit (MCU) of an intelligent lock) may obtain an indoor temperature from a temperature sensor. The temperature sensor may be mounted inner side the intelligent lock, or any suitable location indoor.

In some embodiment, in order to automatically unlock the intelligent lock in a high-temperature abnormality (e.g., a fire) inside a room, and ensure indoor person escape in time, the electronic device 120 may obtain the indoor temperature periodically from the temperature sensor. The temperature sensor may be mounted inside the intelligent lock for obtaining the indoor temperature. For example, the temperature sensor may be mounted on the surface of an inner assembly of the intelligent lock, thereby the indoor temperature obtained by the temperature sensor being more approximate to an actual indoor temperature. Merely by way of an example, the indoor temperature may be obtained by accessing data from the temperature sensor periodically, for example, every 1 second or 2 seconds. A specific location where the temperature sensor is mounted may be any suitable location inside the intelligent lock. A specific time interval between which the indoor temperature is obtained by the electronic device 110 may be any suitable intervals. It should be noted that the examples regarding the specific location and the specific time interval provided herein are for illustration, and not intended to limit the scope of the present disclosure.

In some embodiments, the indoor temperature obtained from the temperature sensor may be displayed on the intelligent lock. In such case, a first location for displaying temperature may be preset on the intelligent lock, for example, on the surface of the inner assembly of the intelligent lock. Optionally, a display screen may be installed on the intelligent lock to display the indoor temperature obtained from the temperature sensor. The indoor temperature obtained from the temperature sensor may be displayed on the first location, for example, on the surface of the inner assembly of the intelligent lock. The indoor temperature obtained from the temperature sensor may also be displayed on the display screen of the intelligent lock. Accordingly, a person inside a room may acquire a real-time indoor temperature at any time. The first location for displaying temperature may be any suitable location of the intelligent lock. A second location for mounting the display screen may be any suitable location on the intelligent lock. It should be noted that the examples regarding the first location and the second location provided herein are for illustration, and not intended to limit the scope of the present disclosure.

In 3220, the electronic device 110 (e.g., the microcontroller unit (MCU) of the intelligent lock) may determine whether the indoor temperature is greater than or equal to a temperature threshold.

The temperature threshold may be a preset critical value used to determine whether an abnormal situation (e.g., a fire disaster) occurs indoor. In response to a determination that the indoor temperature is greater than or equal to the threshold value, it may indicate that the indoor temperature is too high, and the abnormal situation such as a fire disaster may occur. In response to a determination that the indoor temperature is smaller than the threshold value, it may indicate that the indoor temperature is within an acceptable range, and there is no abnormality such as a fire disaster.

In some embodiments, the operation 3220 may further include one or more of the following sub-operations 3220-1, and 3220-2.

In 3220-1, electronic device 120 may determine whether the indoor temperature obtained from the temperature sensor within a preset time period is wrong.

The preset time period may be any suitable time period, e.g., 1 minute, 2 minutes, 3 minutes. In an actual application, the indoor temperature obtained by the temperature sensor may be wrong, due to, for example, a fault of the temperature sensor. Merely by way of an example, if the actual indoor temperature is only 25 degrees, the indoor temperature obtained by a temperature sensor having a fault is 60 degrees, and the temperature threshold is 50 degrees. The electronic device 110 may determine that the wrong indoor temperature is greater than the temperature threshold, thereby automatically unlocking the intelligent lock by mistake. Therefore, in order to avoid automatically unlocking the intelligent lock by mistake due to a wrong indoor temperature obtained by the temperature sensor, the electronic device 110 may determine whether the indoor temperature obtained by the temperature sensor within the preset time period is wrong by performing three methods as below.

In an embodiment, the electronic device 120 may determine whether a difference between a highest indoor temperature and a lowest indoor temperature obtained by the temperature sensor in the preset time period is within a preset difference threshold range. For example, if the preset time period is 3 minutes, and the preset difference threshold range is 0 to 2, the electronic device 120 may determine whether the difference between the highest indoor temperature and the lowest indoor temperature obtained by the temperature sensor within 3 minutes falls within 0 to 2. In response to a determination that the difference is falling within 0 to 2, the electronic device 120 may determine that the indoor temperature obtained by the temperature sensor within the preset time period is correct. The operation 3200 may proceed to the 3220-2. In response to a determination that the difference does not fall within 0 to 2, the electronic device 120 may determine that the difference between two values of the indoor temperature obtained by the temperature sensor in a short time is quite different, and the indoor temperature obtained by the temperature sensor may be wrong.

In another embodiment, a first indoor temperature at a start time point of the preset time period, a second indoor temperature at a middle time point of the preset time period, and a third indoor temperature at an end time point of the preset time period may be obtained by the temperature sensor. The electronic device 120 may further determine whether a difference of any two of the first indoor temperature, the second indoor temperature, and the third indoor temperature is within the preset difference threshold range. For example, if the preset time period is 3 minutes, and the preset difference threshold range is 0 to 2, the electronic device 120 may determine whether a difference of any two of the first indoor temperature, the second indoor temperature, and the third indoor temperature is within 0 to 2. The first indoor temperature, the second indoor temperature, and the third indoor temperature are obtained by the temperature sensor at the start time point, the middle time point, and the end time point of the 3 minutes, respectively. In response to a determination that the difference is within 0 to 2, the electronic device 120 may determine that the indoor temperature obtained by the temperature sensor within the preset time period is correct. The operation 3200 may proceed to the 3220-2. In response to a determination that the difference is not within 0 to 2, the processing device 110 may determine that the difference between two values of the indoor temperature obtained by the temperature sensor in a short time is quite different, and the indoor temperature obtained by the temperature sensor may be wrong.

In yet another embodiment, the electronic device 120 may determine whether a first difference between an indoor temperature obtained at an end of the preset time period and an indoor temperature obtained at an end of a prior time period by the temperature sensor is within the preset difference threshold range. And, the electronic device 120 may determine whether a second difference between the indoor temperature obtained at the end of the preset time period and an indoor temperature obtained at an end of a later time period by the temperature sensor is within the preset difference threshold range. In some embodiments, the preset time period may be a period after the prior time period, and the later time period may be a period after the preset time period. The duration of the preset time period, the prior time period, and the later time period may be the same or different. The preset time period, the prior time period, and the later time period may at least partially overlap with each other or not overlap at all. For example, if the preset time period is 3 minutes, and the preset difference threshold range is 0 to 2, the first difference may be a difference between the indoor temperature obtained at an end of the 3 minutes and the indoor temperature obtained at an end of another 3 minutes before the preset time period by the temperature sensor, and the second difference may be a difference between the indoor temperature obtained at the end of the 3 minutes and the indoor temperature obtained at an end of another 3 minutes after the preset time period by the temperature sensor. The electronic device 120 may determine whether the first difference is within 0 to 2, and whether the second difference is within 0 to 2. In response to a determination that both the first difference and the second difference are within 0 to 2, the electronic device 120 may determine that the indoor temperature obtained by the temperature sensor within the preset time period is correct. The operation 3200 may proceed to the 3220-2. In response to a determination that the difference is not within 0 to 2, the electronic device 120 may determine that the difference between two values of the indoor temperature obtained by the temperature sensor in a short time is quite different, and the indoor temperature obtained by the temperature sensor may be wrong.

In 3220-2, in response to a determination that the indoor temperature obtained by the temperature sensor within a preset time period is correct, the electronic device 120 may determine whether an average value of the indoor temperature obtained by the temperature sensor in the preset time period is greater than or equal to the temperature threshold.

In some embodiments, if the indoor temperature obtained by the temperature sensor within the preset time period is determined as correct, the electronic device 120 may further determine the average value of the indoor temperature in the preset time period, and determine whether the average value is greater than or equal to the temperature threshold. In response to a determination that the average value is greater than or equal to the temperature threshold, it may indicate that the indoor temperature is too high, and the abnormal situation such as a fire disaster may occur. In response to a determination that the average value is smaller than the temperature threshold, it may indicate that the indoor temperature is within an acceptable range, and there is no abnormality such as a fire disaster.

In 3230, in response to a determination that the indoor temperature is greater than or equal to the temperature threshold, the electronic device 120 (e.g., a microcontroller unit (MCU) of the intelligent lock) may automatically unlock the intelligent lock.

In some embodiments, if the indoor temperature is greater than or equal to the temperature threshold, it may indicate that the indoor temperature is too high, and the abnormal situation such as a fire disaster may occur. The electronic device 120 may automatically unlock the intelligent lock, thereby reducing a time period for an unlocking operation like pressing an unlocking button of the intelligent lock. In such implementation, indoor personnel may escape to the outdoor in time without the unlocking operation in time.

In some embodiments, the electronic device 120 may further transmit an unlocking command to the intelligent lock to cause the intelligent lock to retract a spring bolt. Upon a determination that the indoor temperature is greater than or equal to the temperature threshold, the electronic device 120 may transmit the unlocking command to a driver module of the intelligent lock, so as to control the driver module to automatically retract the spring bolt of the intelligent lock. In such implementation, the indoor personnel may escape to the outdoor from indoor fastly without the unlocking operation.

In some embodiments, upon a determination that the indoor temperature is greater than or equal to the temperature threshold, the electronic device 120 may send out alarm information. The alarm information may include voice information (e.g., a buzzing sound, a voice broadcast) and/or visible information (e.g., a text, a picture, a stroboscopic light). The alarm information may be sent to the indoor personnel to alert the indoor personnel that the indoor temperature has exceeded the temperature threshold, an abnormal situation (e.g., a fire disaster) may occur, and it is necessary to escape to the outdoor as soon as possible. Merely by way of an example, an alarm device may be pre-installed on the surface of the inner assembly of the intelligent lock or a corresponding position on a door on which the intelligent lock is mounted. The alarm device may raise an alarm based on the alarm information received from the electronic device 120. The alarm device may raise the alarm in a form of a text and/or a picture, a stroboscopic light, a buzzing sound and/or a voice broadcast to alert the indoor personnel.

In some embodiments, the electronic device 120 may establish a communication with a fire alarm platform in advance. Correspondingly, upon a determination that the indoor temperature is greater than or equal to the temperature threshold, the electronic device 120 may communicate with the fire alarm platform, and transmit fire alarm information to the fire alarm platform. The fire alarm information may be in the form of a telephone call and/or a short message. As an example, the electronic device 120 may establish wireless communication with the fire alarm platform in advance through a wireless manner (e.g., a wireless fidelity (Wi-Fi), a wireless local area network (WLAN), a cellular network). In such implementation, upon the determination that the indoor temperature obtained by the temperature sensor exceeds the temperature threshold, the fire alarm information may be sent to the fire alarm platform through the wireless communication established in advance with the fire alarm platform. The fire alarm information may be in the form of the telephone call and/or the short message, e.g., 119 calls, or a short message including a detailed address where the abnormal situation (e.g., a fire disaster) occurs.

In some embodiments, the electronic device 120 may establish a communication with a user terminal in advance. A first notification that a fire may occur indoor and the fire alarm information has been sent to the fire alarm platform may be sent to the user terminal via the communication. As an example, the electronic device 120 may also establish wireless communication with the user terminal (e.g., a mobile phone, a tablet computer) via the wireless manner (e.g., a Wi-Fi, a WLAN, a cellular network). In such implementation, after the fire alarm information was sent to the fire alarm platform, the first notification may be pushed to the user terminal through the wireless communication established in advance with the user terminal. The first notification may indicate that the abnormal situation such as a fire disaster may occur, and the fire alarm information has been sent to the fire alarm platform. The first notification may be in a form of telephone call and/or short message, e.g., calling the mobile phone of a user, sending a short message to the user terminal. The user may take corresponding measures according to an actual situation.

In some embodiments, the electronic device 120 may establish a communication with a user terminal in advance. A second notification that the intelligent lock has been unlocked may be sent to the user terminal through the communication. As an example, the electronic device 120 may also establish the wireless communication with the user terminal (e.g., a mobile phone, a tablet computer) via a wireless manner (e.g., a Wi-Fi, a WLAN, a cellular network). In such implementation, if the electronic device 120 automatically unlocks the intelligent lock in operation 3230, the second notification that the intelligent lock has been unlocked may be pushed to the user terminal through the wireless communication established in advance with the user terminal. The second notification may be in a form of the telephone call and/or the short message, e.g., calling the mobile phone of a user, sending a short message to the user terminal.

In some embodiments, the intelligent lock may also establish wireless communication with other intelligent home devices indoor through wireless communication methods (e.g., a Bluetooth, a Wi-Fi, a WLAN, a Zigbee). The other intelligent home devices may include a smoke sensor, a temperature sensor, a humidity sensor, etc. The other intelligent home devices may send information related to smoke, temperature, and humidity to the intelligent lock via the wireless communication. In such implementation, the intelligent lock may be automatically unlocked in a manner similar to the embodiments described above.

According to some embodiments of the present disclosure, an indoor temperature may be obtained by a temperature sensor mounted on the intelligent lock. If the indoor temperature is greater than a temperature threshold, the intelligent lock may be automatically unlocked. This may avoid such cases that a door cannot be unlocked, and help indoor personnel to escape to the outdoor as soon as possible, when a high temperature abnormality such as a fire disaster occurs.

It should be noted that the above description regarding the process 3200 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 3200 may be accomplished with one or more additional operations not described and/or without one or more of the operations discussed above. In some embodiments, there may be more than one temperature threshold. For example, a first temperature threshold and a second temperature threshold may be preset, wherein the first temperature threshold is smaller than the second temperature threshold. Merely by way of an example, if the indoor temperature is great than the second temperature threshold, the intelligent lock may be automatically unlocked. If the indoor temperature is smaller than the first temperature threshold, or great than the first temperature threshold and greater than the second temperature threshold, alarm information including a severity level may be sent to the user terminal.

Figure 33:
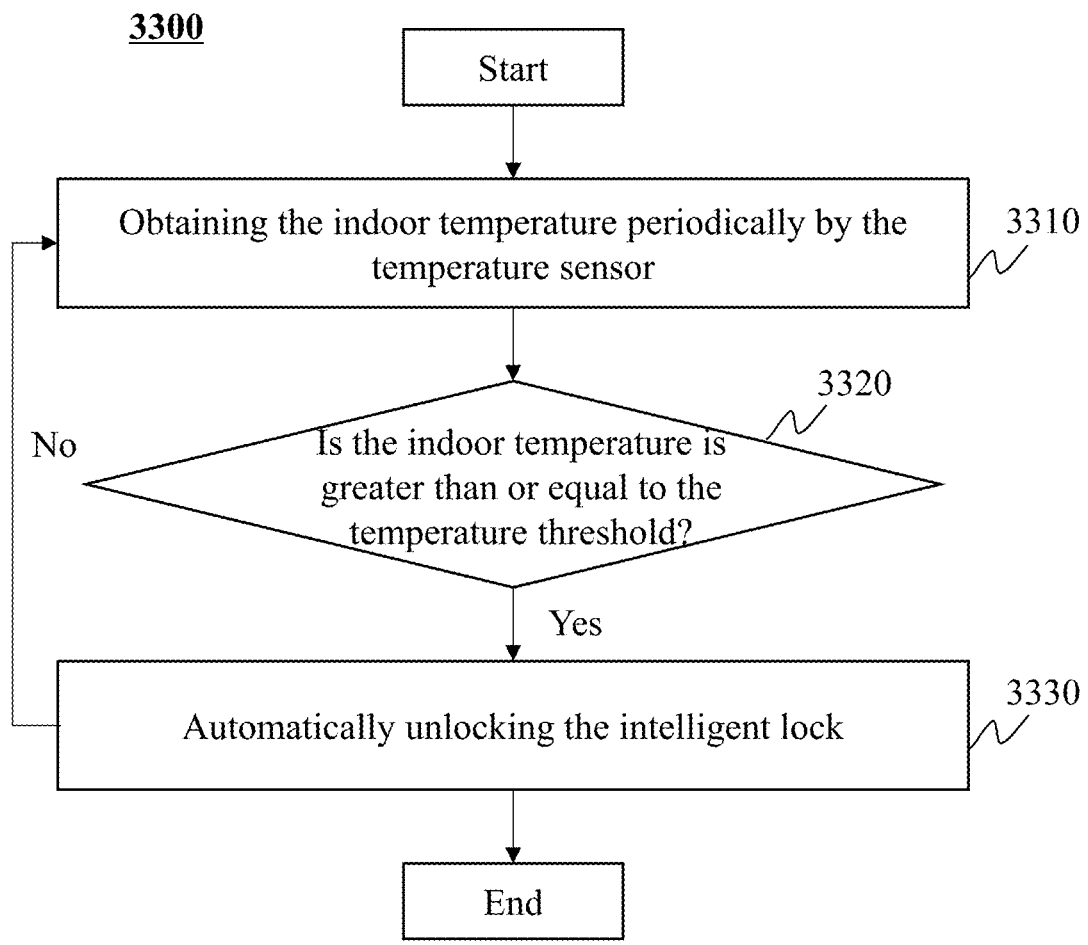
FIG. 33 is a flowchart illustrating another exemplary process for automatically unlocking an intelligent lock according to some embodiments of the present disclosure.

FIG. 33 is a flowchart illustrating another exemplary process for automatically unlocking an intelligent lock according to some embodiments of the present disclosure. In some embodiments, process 3300 may be executed by the system 100. For example, the process 3300 may be implemented as a set of instructions (e.g., an application) stored in a storage device (e.g., the storage device 130). In some embodiments, the electronic device 120 may execute the set of instructions and may accordingly be directed to perform the process 3300.

In 3310, the electronic device 120 may obtain the indoor temperature periodically from the temperature sensor mounted on the surface of the inner assembly of the intelligent lock. The specific time interval between which the indoor temperature is obtained by the electronic device 120 may be any suitable intervals, for example, 1 minute, 2 minutes, 3 minutes.

In 3320, the electronic device 120 may determine whether the indoor temperature is greater than or equal to the temperature threshold.

In 3330, in response to a determination that the indoor temperature is greater than or equal to the temperature threshold, the electronic device 120 may automatically unlock the intelligent lock. In response to a determination that the indoor temperature is greater than or equal to the temperature threshold, the processing device may proceed to operation 3310. More descriptions regarding the process 3300 may be found elsewhere in the present disclosure. See, e.g., FIG. 32 and relevant descriptions thereof.

It should be noted that the above description regarding the process 3300 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 3300 may be accomplished with one or more additional operations not described and/or without one or more of the operations discussed above. For example, if the indoor temperature is greater than or equal to the temperature threshold, the specific time interval may be changed, such as to be smaller.

Figure 34:
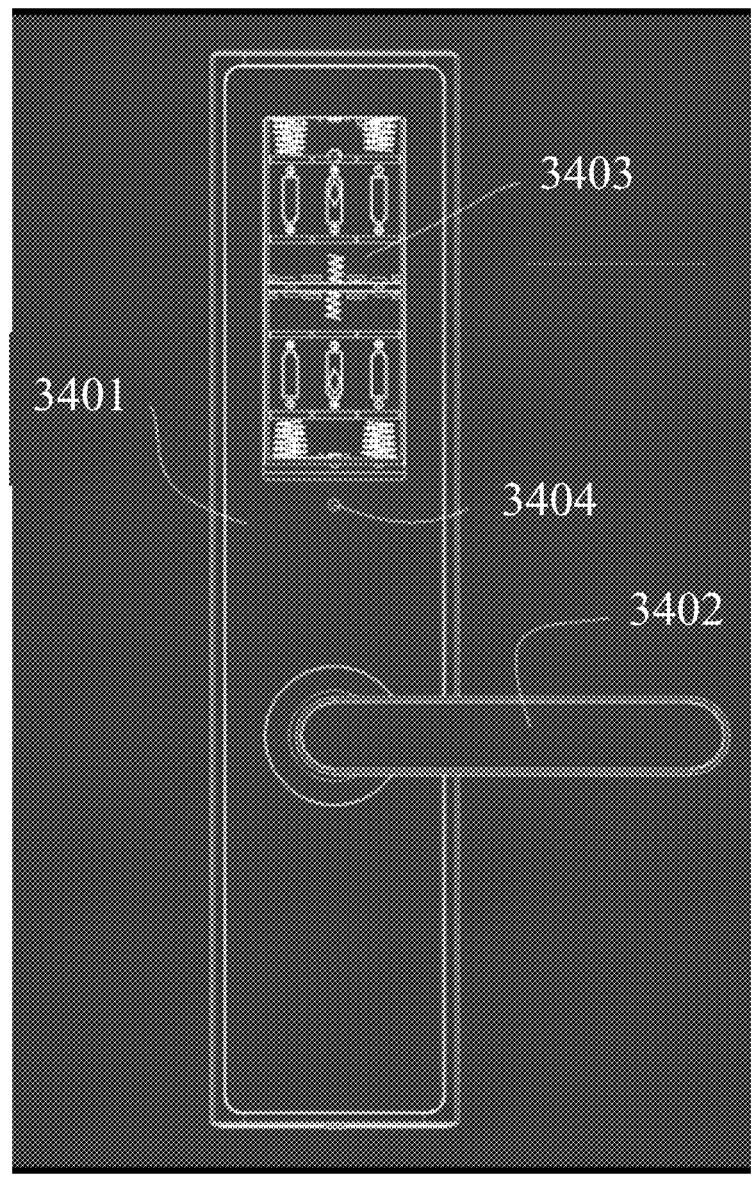
FIG. 34 is a schematic diagram illustrating an exemplary intelligent lock according to some embodiments of the present disclosure.

FIG. 34 is a schematic diagram illustrating an exemplary intelligent lock according to some embodiments of the present disclosure.

As shown in FIG. 34, the intelligent lock 3400 may include a temperature sensor 3440, an MCU (inside the intelligent lock 3400, not shown in FIG. 34), an inner assembly 3410, an inner assembly handle 3420, and a battery compartment 3430.

The temperature sensor 3440 may be used to obtain the indoor temperature. The temperature sensor 3440 may be mounted inside the intelligent lock. For example, the temperature sensor 3440 may be mounted on the surface of the inner assembly 3410. In such implementation, the indoor temperature obtained by the temperature sensor 3440 may be closer to the actual indoor temperature.

The MCU may be configured to access the indoor temperature obtained by the temperature sensor 3440, and determine whether the indoor temperature obtained by the temperature sensor 3440 is greater than or equal to the temperature threshold. If the indoor temperature obtained by the temperature sensor 3440 is greater than or equal to the temperature threshold, the intelligent lock 3400 may be automatically unlocked. More descriptions regarding automatically unlocking the intelligent lock 3400 may be found elsewhere in the present disclosure. See, e.g., FIG. 32 and relevant descriptions thereof.

According to some embodiments of the present disclosure, an intelligent lock may be provided herein. The intelligent lock may obtain an indoor temperature obtained from the temperature sensor, and determine whether the indoor temperature is greater than or equal to the temperature threshold. If the indoor temperature is greater than or equal to the temperature threshold, the intelligent lock may be automatically unlocked. In such implementation, a person may escape from indoor to outdoor as soon as possible, when a high temperature abnormality such as a fire disaster occurs.

It should be noted that the above description regarding the intelligent lock 3400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the intelligent lock 3400 may further include a communication component.

Figure 35:
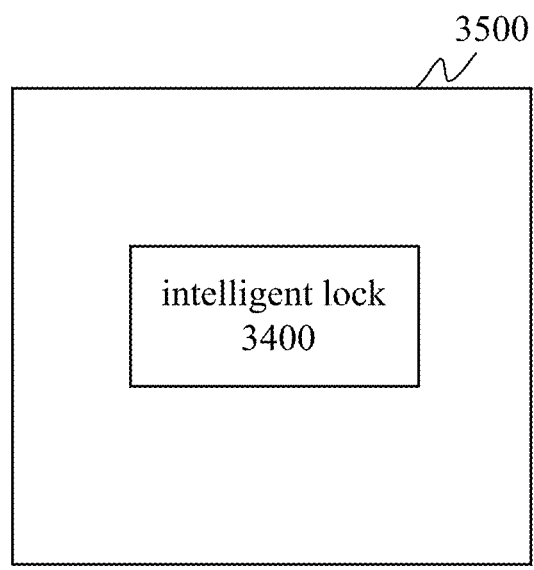
FIG. 35 is a block diagram illustrating an exemplary door according to some embodiments of the present disclosure.

FIG. 35 is a block diagram illustrating an exemplary door according to some embodiments of the present disclosure. The door 3500 may include the intelligent lock 3400.

In some embodiments, the intelligent lock 3400 may obtain the indoor temperature periodically by the temperature sensor, and may be automatically unlocked if the indoor temperature is greater than or equal to the temperature threshold. More descriptions regarding automatically unlocking the intelligent lock 3400 of the door 3500 may be found elsewhere in the present disclosure. See, e.g., FIG. 32 and relevant descriptions thereof. In such implementation, a person may escape from indoor to outdoor as soon as possible, when a high temperature abnormality such as a fire disaster occurs.

It should be noted that the above description regarding the door 3500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 36:
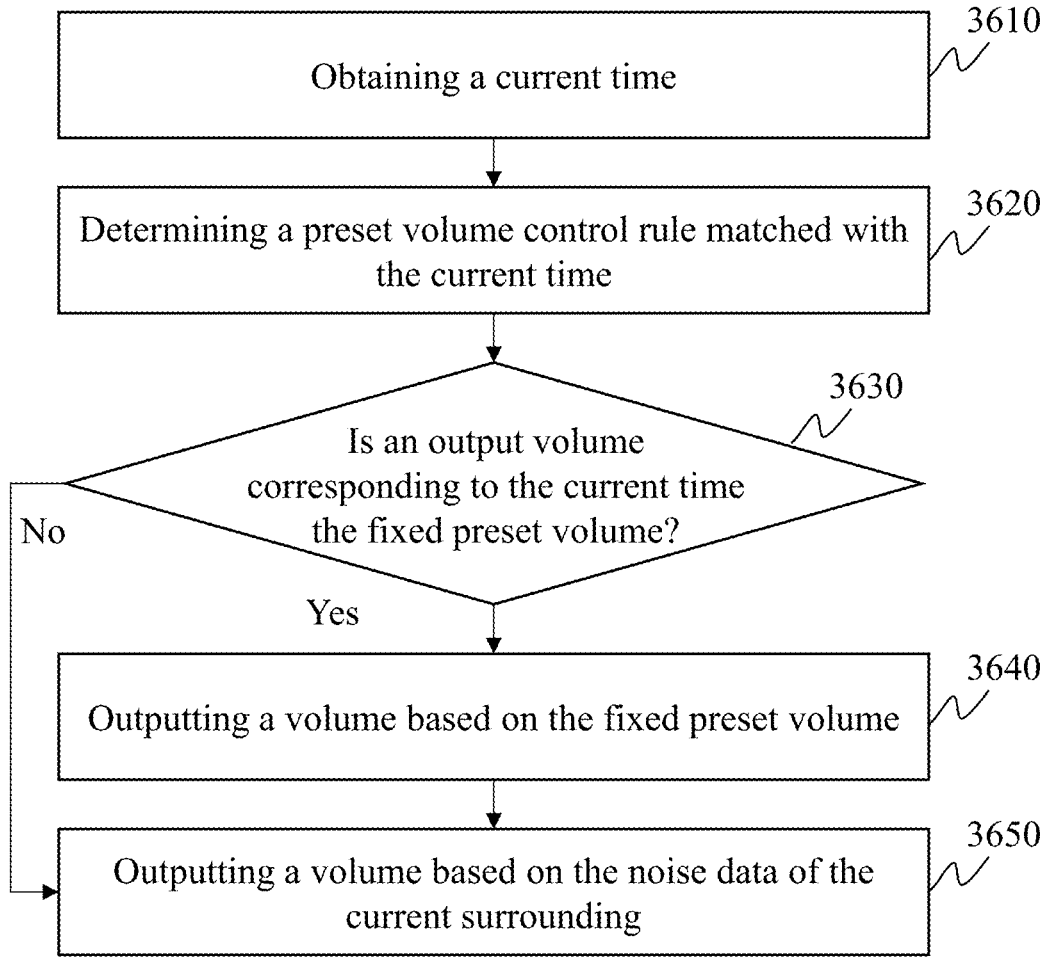
FIG. 36 is a flowchart illustrating an exemplary process for a volume adjustment according to some embodiments of the present disclosure.

FIG. 36 is a flowchart illustrating an exemplary process for a volume adjustment according to some embodiments of the present disclosure. In some embodiments, process 3600 may be executed by the system 100. For example, the process 3600 may be implemented as a set of instructions (e.g., an application) stored in a storage device (e.g., the storage device 130). In some embodiments, the electronic device 120 may execute the set of instructions and may accordingly be directed to perform the process 3600. In some embodiments, the process 3600 may be performed on any electronic device that emits a voice, such as a mobile phone, a tablet, a notebook, a door lock controller, etc. As shown in FIG. 36, process 3600 may include one or more of the following operations.

In 3610, the electronic device 120 (e.g., a time acquisition module 3910) may obtain a current time.

The current time may be obtained by a clock chip mounted on electronic device 120, or via a remote communication.

In 3620, the electronic device 120 (e.g., a rule obtaining module 3920) may determine a preset volume control rule matched with the current time.

In some embodiments. the preset volume control rule corresponding to each time period may be determined. The preset volume control rule may specify a volume corresponding a time period is output based on a fixed preset volume, or an adaptive volume which is determined based on noise data. For example, during the daytime that is noisy, the volume may be output based on the adaptive volume from 06:00 am to 12:00 pm and from 14:00 pm to 20:00 pm, in order to decrease noise effect. During the noon and evening when people are at rest, the volume may be output based on a minimum volume from 12:00 to 14:00 and from 20:00 to 06:00, in order not to bother people's rest.

In some embodiments, the preset volume control rule may be set by a user. The preset volume control rule may be determined by the user pressing a volume key, or be obtained from a remote control device. For example, the user may control the volume by pressing a volume increasing key and a volume decreasing key on the electronic device 120 such as an intelligent lock. Merely by way of an example, the volume may be increased to level 5 corresponding to the current time. As another example, a plurality of preset volume levels may be set. The plurality of preset volume levels may include a mute level, a minimum volume level, a medium volume level, a maximum volume level, and an automatic adjusting volume level. The user may send a volume control command via an application installed on a mobile phone. For example, if the volume control command is to set the volume corresponding to the current time to the mute level, the volume of the electronic device 120 may be switched to the mute level.

In addition, the volume(s) corresponding to a plurality of time periods may be set at the same time. For example, the volume corresponding to a time period from 12:00 pm to 13:00 pm may be set as the mute level, the volume corresponding to 08:00 am to 12:00 pm may be set as the medium volume level, and the volume corresponding to a time period from 00:00 am to 06:00 am may be set as the minimum volume level.

The time period in which the preset volume level is set may be considered as an effective time period corresponding to the preset volume level. During a time period other than the effective time period, the volume may be an adaptive volume which is determined based on the noise data of a current surroundings.

In some embodiments, the preset volume control rule may include two cases. One is that the volume corresponding to a time period may be set as the fixed preset volume. Another is that volume corresponding to a time period may be set as the adaptive volume which is determined based on the noise data of a current surroundings.

For example, the volume corresponding to a time period from 06:00 pm to 20:00 may be determined based on the noise data of the current surroundings, i.e., the adaptive volume, and the volume corresponding to a time period from 20:00 pm to 06:00 may be set as a minimum volume level. In other words, the effective time of the minimum volume level may be the time period from 20:00 pm to 06:00 am, and the effective time of the adaptive volume may be the time period from 06:00 pm to 20:00. In some embodiment, the volume of different time periods may be set by the user according to a user requirement, thereby increasing the flexibility of the automatic volume adjustment, making the automatic volume adjustment more intelligent, and improving user experience.

The volume output mode corresponding to a time period may include outputting the volume based on the fixed preset volume, or outputting the volume based on the noise data (or the adaptive volume determined based on the noise data). It should be noted that, if a volume output mode corresponding to the current time is determined, during the effective time corresponding to the determined volume output mode, the electronic device 120 may not query the volume output mode corresponding to the current time again. If the effective time corresponding to the determined volume output mode is overdue, the electronic device 120 may query a volume output mode corresponding to a new current time.

Correspondingly, the electronic device 120 may include two built-in work modes, including an automatic volume adjustment mode and a fixed volume mode. In the automatic volume adjustment mode, the volume may be output based on a current surroundings (e.g., the noise data of the current surroundings) and the current time. In the fixed volume adjustment mode, the volume may always be output based on the fixed preset volume. The user may operate the electronic device 120 to change the work modes according to actual demands, thereby improving the user experience.

In 3630, the electronic device 120 (e.g., a volume determination module 3903) may determine whether the output volume corresponding to the current time is the fixed preset volume. If the output volume is the fixed preset volume, process 3600 may proceed to operation 3640. If the output volume is not the fixed preset volume, process 3600 may proceed to operation 3650.

Specifically, the electronic device 120 may determine whether the output volume corresponding to the current time is the fixed preset volume based on the preset volume control rule. The preset volume control rule may specify the volume corresponding a time period is output based on the fixed preset volume, or the adaptive volume which is determined based on noise data.

In 3640, the electronic device 120 (e.g., a first volume outputting module 3940) may output the volume based on the fixed preset volume.

In some embodiments, the electronic device 120 may determine that the volume corresponding to the current time is the fixed preset volume, and output the fixed preset volume as the output volume.

In 3650, the electronic device 120 (e.g., a second volume outputting module 3950) may output the volume based on the noise data of the current surroundings.

As used herein, "output the volume based on the noise data of the current surroundings" may refer to that the output volume may be adaptive adjusted based on the noise data of the current surroundings of the electronic device 120. For example, if the noise data of a current surroundings is high, the output volume of the electronic device 120 may be higher. If the noise data of the current surroundings is low, the output volume of the electronic device 120 may be smaller.

In some embodiments of the present disclosure, after obtaining the current time, the electronic device 120 may determine the preset volume control rule matched with the current time. Then, the electronic device 120 may determine whether the output volume corresponding to the current time is the fixed preset volume or an adaptively adjusted volume. The volume outputting may have several modes, and it may improve the user experience.

Figure 37:
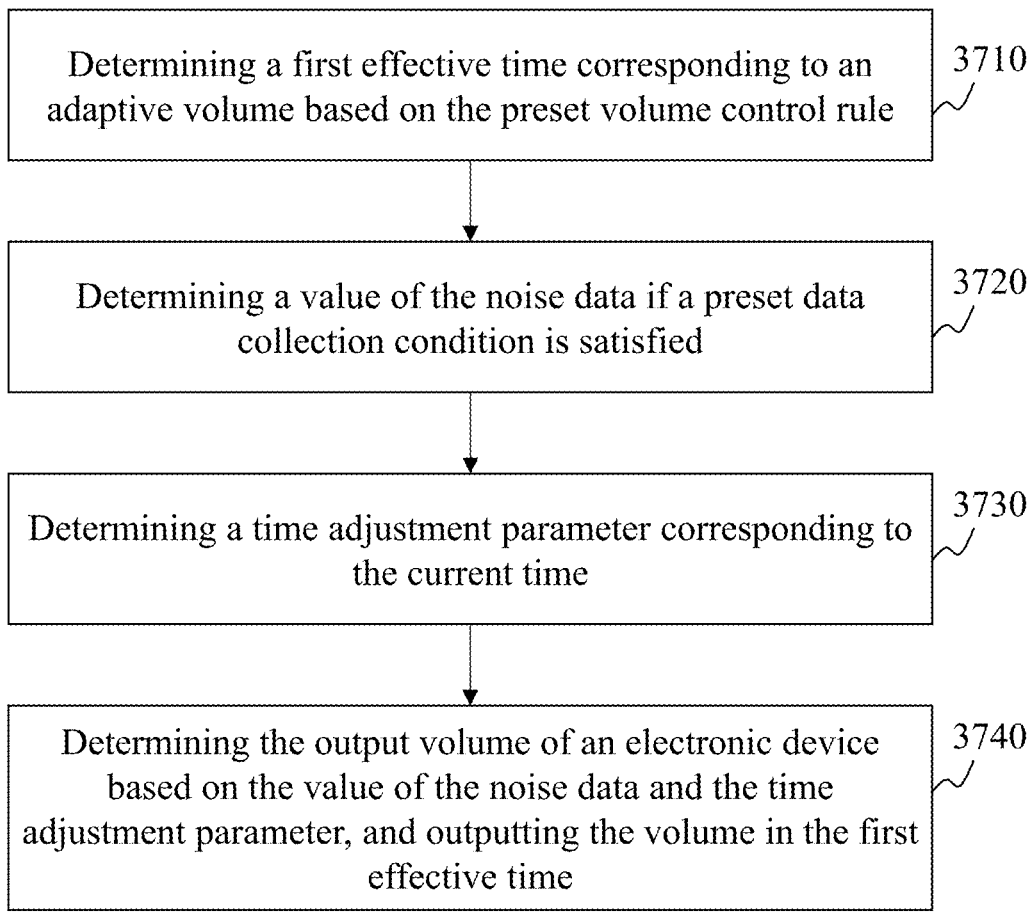
FIG. 37 is a flowchart illustrating an exemplary process for outputting the volume based on the noise data according to some embodiments of the present disclosure.

FIG. 37 is a flowchart illustrating an exemplary process for outputting the volume based on the noise data according to some embodiments of the present disclosure. In some embodiments, process 3700 may be executed by the system 100. For example, the process 3700 may be implemented as a set of instructions (e.g., an application) stored in a storage device (e.g., the storage device 130). In some embodiments, the electronic device 120 may execute the set of instructions and may accordingly be directed to perform the process 3700. In some embodiments, one or more operations of the process 3700 may be performed to achieve at least part of operation 3650 as described in connection with FIG. 36.

In 3710, the electronic device 120 (e.g., the second volume outputting module 3950) may determine a first effective time corresponding to the adaptive volume based on the preset volume control rule.

As described above, in the preset volume control rule, the volume output mode corresponding to a time period may include outputting the volume based on the fixed preset volume, or outputting the volume based on the noise data. The time period corresponding to the outputting the volume based on the noise data may be referred to as the first effective time.

In 3720, the electronic device 120 (e.g., the second volume outputting module 3950) may determine a value of the noise data if a preset data collection condition is satisfied.

The value of the noise data may refer to a noise value of the surroundings where the electronic device 120 is located.

In some embodiments, the electronic device 120 may perform operations 3720-1 to 3720-3 to determine the value of the noise data.

In 3720-1, the electronic device 120 may obtain a plurality of initial noise values in a manner of data acquisition at a fixed interval, or after receiving a preset wake-up command.

The initial noise values may be obtained by a decibel sensor, and may be sent to the electronic device 120. The data collection may be performed at a fixed interval. For example, if a data acquisition time is 500 ms, and the fixed interval is 10 minutes, the initial noise values (e.g., 640 initial noise values) may be collected during 500 ms every 10 minutes.

Additionally or alternatively, the initial noise values may be collected after electronic device 120 receives a preset wake-up command. The preset wake-up command may include a password keyboard wake-up command, a fingerprint wake-up command, a facial recognition wake-up command.

It should be noted that, under a normal circumstance, the data collection may be performed at the fixed interval period. If the preset wake-up command is received, the data acquisition may be performed immediately. Thereafter, the data acquisition may be performed at the fixed interval period again.

In some embodiments, the initial noise values may be stored in a buffer, and may be processed later.

In 3720-2, the electronic device 120 may determine a maximum value, a minimum value, and an average value among the initial noise values.

For example, the electronic device 120 may obtain 640 initial noise values. The maximum value and minimum value may be determined from the 640 initial noise values, and the average value may be calculated based on the 640 initial noise values.

In 3720-3, the electronic device 120 may determine a greater value of a difference between the maximum value and the minimum value and the average value as the value of the noise data.

The difference between the maximum value and the minimum value and the average value may represent the average noise level of the current surroundings. The difference or the average value may be determined as the value of the noise data, to ensure that the volume of the sound emitted by the electronic device 120 is greater than a volume of the surroundings.

In 3730, the electronic device 120 (e.g., the second volume output module 3905) may determine a time adjustment parameter corresponding to the current time.

In some embodiments, the time adjustment parameter may be used to determine a proportional relationship of the output volume of the electronic device 120 to the value of the noise data.

The electronic device 120 may obtain a correspondence between a time and the time adjustment parameter, and search for a time adjustment parameter corresponding to the current time based on the correspondence.

Specifically, under the circumstances that the system is powered on, a time adjustment parameter discrete curve is set. The time adjustment parameter discrete curve may indicate the correspondence between the time and the time adjustment parameter. The time adjustment parameter discrete curve may include different time adjustment parameters corresponding to different times. The time adjustment parameter corresponding to different times may be used as a weighting factor of the value of the noise data. The time adjustment parameter may be greater than 1, to ensure that the output volume of the electronic device 120 is greater than the value of the noise data of the current surroundings.

Merely by way of an example, the time adjustment parameter may be set at an interval of 2 hours. For example, the time adjustment parameter from 00:00 to 02:00 may be set to 1.8, the time adjustment parameter from 02:00 to 04:00 may be set to 1.7, and the time adjustment parameter from 04:00 to 06:00 may be set to 1.8.

After obtaining the correspondence between a time and the time adjustment parameter, the time adjustment parameter corresponding to the current may be determined by retrieving the correspondence.

In 3740, the electronic device 120 (e.g., the second volume outputting module 3950) may determine the output volume based on the value of the noise data and the time adjustment parameter, and output the volume in the first effective time.

In some embodiments, the determined output volume may be output by, for example, a speaker.

In some embodiments of the present disclosure, the output volume of the electronic device 120 may be determined based on the value of the noise data and the time adjustment parameter. That is, the output volume of the electronic device 120 may be automatically adjusted based on the surroundings, thereby improving the user experience, and additionally, solving a problem that a loud interaction voice with the electronic device 120 (e.g., a prompt tone for unlocking an intelligent lock) at late night may disturb other people.

FIG. 38 is a flowchart illustrating an exemplary process for outputting the volume based on the fixed preset volume according to some embodiments of the present disclosure. In some embodiments, process 3800 may be executed by the system 100. For example, the process 3800 may be implemented as a set of instructions (e.g., an application) stored in a storage device (e.g., the storage device 130). In some embodiments, the electronic device 120 may execute the set of instructions and may accordingly be directed to perform the process 3800. In some embodiments, one or more operations of the process 3800 may be performed to achieve at least part of operation 3640 as described in connection with FIG. 36.

In 3810, the electronic device 120 (e.g., the first volume outputting module 3940) may determine a product of the value of the noise data and the time adjustment parameter as an initial value of the output volume.

In some embodiments, the initial value of the output volume may be determined according to a function denoted as, the initial value of the output volume=the value of the noise data×time adjustment parameter. For the value of the noise data is determined as the greater value of the difference between the maximum value and the minimum value and the average value, it may indicate that the determined value of the noise data may represent a noise value of the current surroundings. The time adjustment parameter may be greater than 1, and the determined initial value of the output volume may be greater than the value of the noise data. Thus, the output volume of the electronic device 120 may be greater than the value of the noise data, ensuring that the user can hear the sound of the electronic device 120.

In 3820, the electronic device 120 (e.g., the first volume outputting module 3940) may determine a preset volume level that is closest to the initial value of the output volume from the plurality of preset volume levels.

In 3830, the electronic device 120 (e.g., the first volume outputting module 3940) may designate the preset volume level as the output volume.

The plurality of preset volume levels may be set by the user. The plurality of preset volume levels may include a mute level, a minimum volume level, a medium volume level, a maximum volume level, and an automatic volume adjustment level.

After determining the initial value of the output volume, one of the preset volume levels that is closest to the initial value of the output volume may be determined as the output volume. Since the preset volume levels are set by the user, the determined output volume may be more aligned with a user's need.

In some embodiments, the initial value of the output volume may be determined as the output volume directly.

In some embodiments, the product of the value of the noise data and the time adjustment parameter may be determined as the initial value of the output volume. The preset volume level closest to the initial value of the output volume may be determined from the plurality of preset volume levels, and determined as the output volume. It may meet the user's need better.

Optionally, to achieve at least part of operation 3640 as described in connection with FIG. 36, the processing device 110 may also perform operations as below.

The electronic device 120 may determine a second effective time corresponding to the fixed preset volume based on the preset volume control rule, and output the fixed preset volume within the second effective time. In some embodiments, the second effective time may be the same as or different from the first effective time. In some embodiments, the second effective time may be set according to the user's need.

Figure 39:
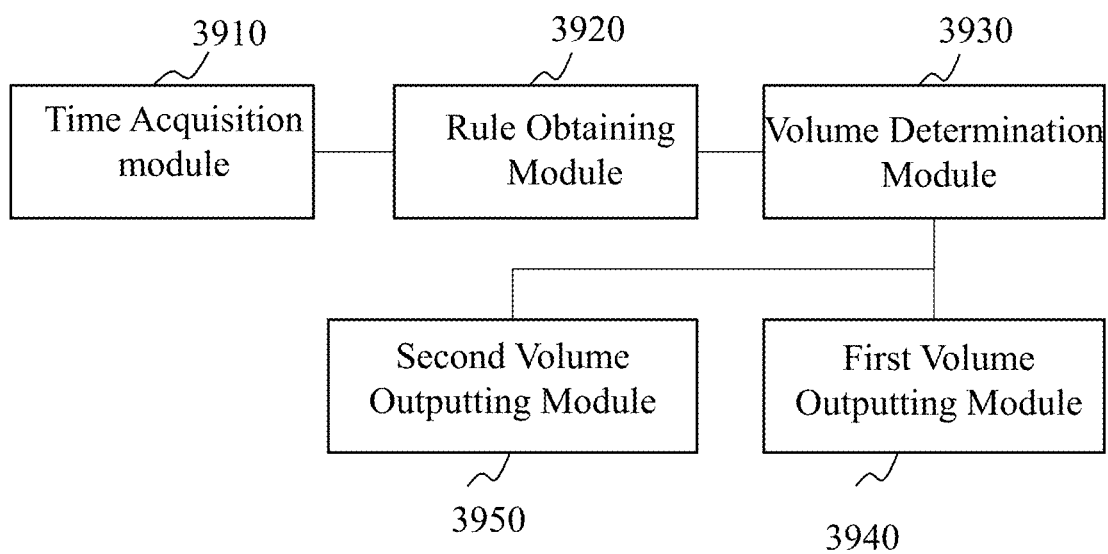
FIG. 39 is a block diagram illustrating an exemplary computing device for adjusting output volume according to some embodiments of the present disclosure.

FIG. 39 is a block diagram illustrating an exemplary computing device for adjusting output volume according to some embodiments of the present disclosure. In some embodiments, at least a portion of the computing module 3900 may be implemented in, for example, the electronic device 120 in FIG. 1. As shown in FIG. 39, the computing device 3900 may include a time acquisition module 3910, a rule obtaining module 3920, a volume determination module 3930, a first volume outputting module 3940, and a second volume outputting module 3950.

The time acquisition module 3910 may be configured to obtain the current time.

The rule obtaining module 3920 may be configured to determine the preset volume control rule matched with the current time.

The volume determination module 3930 may be configured to determine whether the output volume corresponding to the current time is the fixed preset volume based on the preset volume control rule.

The first volume outputting module 3940 may be configured to output the volume output based on the fixed preset volume.

The second volume outputting module 3950 may be configured to output the volume based on the noise data of the current surroundings.

In some embodiments, the processing device 3900 may further include a rule generation module. The rule generation module may include a first rule generation sub-module and a second rule generation sub-module.

The first rule generation sub-module may be configured to obtain the preset volume control rule determined by the user by pressing the volume key.

The second rule generation sub-module may be configured to receive the preset volume control rule sent by the remote control device.

In some embodiments of the present disclosure, after obtaining the current time, the preset volume control rule matched with the current time may be determined. Then, the output volume corresponding to the current time may be determined whether is the fixed preset volume or an adaptively adjusted volume. The volume outputting may have several modes, and it may improve the user experience.

More descriptions regarding a work process of the modules described above may be found elsewhere in the present disclosure. See, e.g., FIG. 36 and relevant descriptions thereof.

Optionally, the second volume outputting module 3950 may include a first time determination sub-module, a first data determination sub-module, a second data determination sub-module, and a first volume output sub-module.

The first time determination sub-module may be configured to determine the first effective time corresponding to the adaptive volume based on the preset volume control rule.

The first data determination sub-module may be configured to determine the value of the noise data if the preset data collection condition is satisfied.

The second data determination sub-module may be configured to determine the time adjustment parameter corresponding to the current time. The time adjustment parameter may be used to determine the proportional relationship of the output volume of the electronic device 120 to the value of the noise data.

The first volume output sub-module may be configured to determine the output volume of the electronic device 120 based on the value of the noise data and the time adjustment parameter, and output the volume in the first effective time.

Furthermore, the first data determination sub-module may include an obtaining unit, a first determination unit, and a second determination unit.

The obtaining unit may be configured to obtain a plurality of initial noise values in a manner of data acquisition at a fixed interval, or after receiving a preset wake-up command.

The first determination unit may be configured to determine the maximum value, the minimum value, and the average value among the initial noise values.

The second determination unit may be configured to determine the greater value of the difference between the maximum value and the minimum value and the average value as the value of the noise data.

Further, to determine the time adjustment parameter corresponding to the current time, the second data determination sub-module may be configured to obtain a correspondence between the time and the time adjustment parameter, and search for a time adjustment parameter corresponding to the current time from the correspondence.

In some embodiments of the present disclosure, the output volume of the electronic device 120 may be determined based on the value of the noise data and the time adjustment parameter. That is, the output volume of the electronic device 120 may be automatically adjusted based on the surroundings, thereby improving the user experience, and additionally, solving a problem that a loud interaction voice with the electronic device 120 (e.g., a prompt tone for unlocking an intelligent lock) at late night may disturb other people.

More descriptions regarding a work process of the modules and units described above may be found elsewhere in the present disclosure. See, e.g., FIGS. 37-38 and relevant descriptions thereof.

Optionally, the first volume output sub-module may include a calculation unit, a third determination unit, and a fourth determination unit.

The calculation unit may be configured to determine the product of the value of the noise data and the time adjustment parameter as an initial value of the output volume.

The third determination unit may be configured to determine the preset volume level that is closest to the initial value of the output volume from the plurality of preset volume levels.

The fourth determination unit may be configured to designate the preset volume level as the output volume.

In some embodiments, the product of the value of the noise data and the time adjustment parameter may be determined as the initial value of the output volume. The preset volume level closest to the initial value of the output volume may be determined from the plurality of preset volume levels, and determined as the output volume. It may meet the user's need better.

More descriptions regarding a work process of the units described above may be found elsewhere in the present disclosure. See, e.g., FIG. 38 and relevant descriptions thereof.

Optionally, the first volume outputting module 3940 may include a second time determination sub-module, and a second volume output sub-module.

The second time determination sub-module may be configured to determine the second effective time corresponding to the fixed preset volume based on the preset volume control rule.

The second volume output sub-module may be configured to output the fixed preset volume within the second effective time.

In this embodiment, the fixed volume may be output according to the user's need.

More descriptions regarding a work process of the modules described above may be found elsewhere in the present disclosure. See, e.g., FIG. 38 and relevant descriptions thereof.

Figure 40:
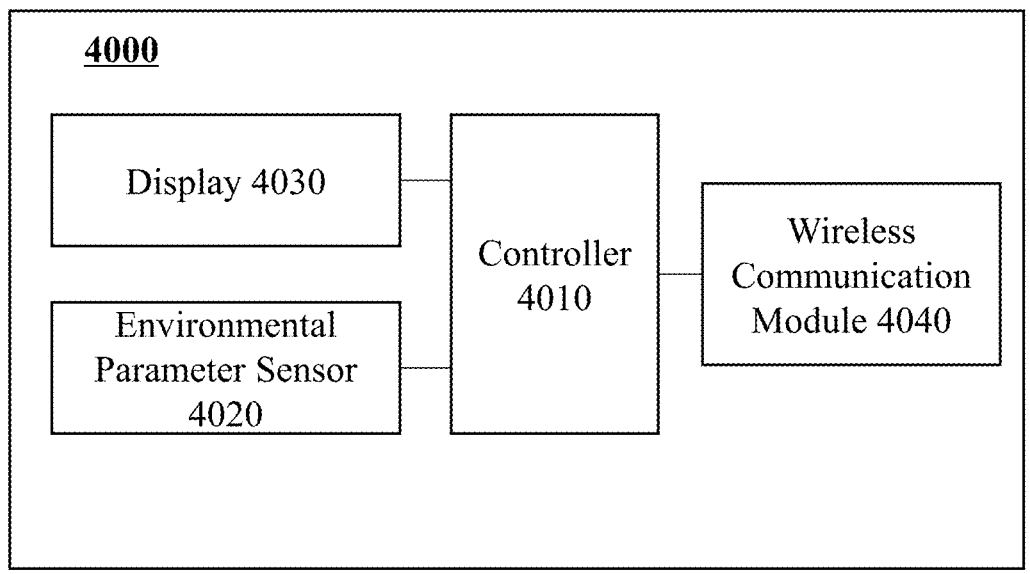
FIG. 40 is a block diagram illustrating an exemplary electronic device according to some embodiments of the present disclosure.

FIG. 40 is a block diagram illustrating an exemplary electronic device according to some embodiments of the present disclosure. In some embodiments, the electronic device may be implemented on the electronic device 120 in FIG. 1. As shown in FIG. 40, the electronic device 4000 may include a controller 4010, an environmental parameter sensor 4020, a display 4030 connected to the controller 4010, and a wireless communication module 4040.

The controller 4010 may be a control core of the electronic device 4000.

The environmental parameter sensor 4020 may be configured to collect environmental parameters of a current surroundings of the electronic device 4000, and send the environmental parameters to the controller 4010. The environmental parameter sensor 4020 may include a temperature and humidity sensor, an air quality sensor, etc. The temperature and humidity sensor may be configured to collect temperature and humidity of the current surroundings of the electronic device 4000, and the air quality sensor may be configured to detect air quality information of the current surroundings of the electronic device 4000. The temperature and humidity sensor and the air quality sensor may be integrated inside the electronic device 4000.

The display 4030 may be configured to display information, for example, the environmental parameters collected by the environmental parameter sensor 4020, or other information such as time information. For example, the display screen 4030 may include an LCD display or an LED display.

The wireless communication module 4040 may be coupled to the controller 4010. The wireless communication module 4040 may include any capable module for wireless communication, e.g., a Bluetooth module, a WiFi module, a ZigBee module, or the like. The wireless communication module 4040 may also be implemented by other wireless communication technologies, and will not be described in detail herein.

For example, the electronic device 4000 may communicate with a server through the WiFi module, and upload the environment parameter collected by the environmental parameter sensor 4020 to the server.

As another example, the electronic device 4000 may communicate with a mobile intelligent terminal (e.g., a mobile phone, a tablet computer, etc.) through a near field wireless communication module such as the Bluetooth module or the ZigBee module. Specifically, the mobile application terminal may have a corresponding application (APP), and the application may be bound to an electronic device 4000 that has established communication with application, so that the user may directly obtain the status and the environment parameter of the electronic device 4000 from the server through the application.

Figure 41:
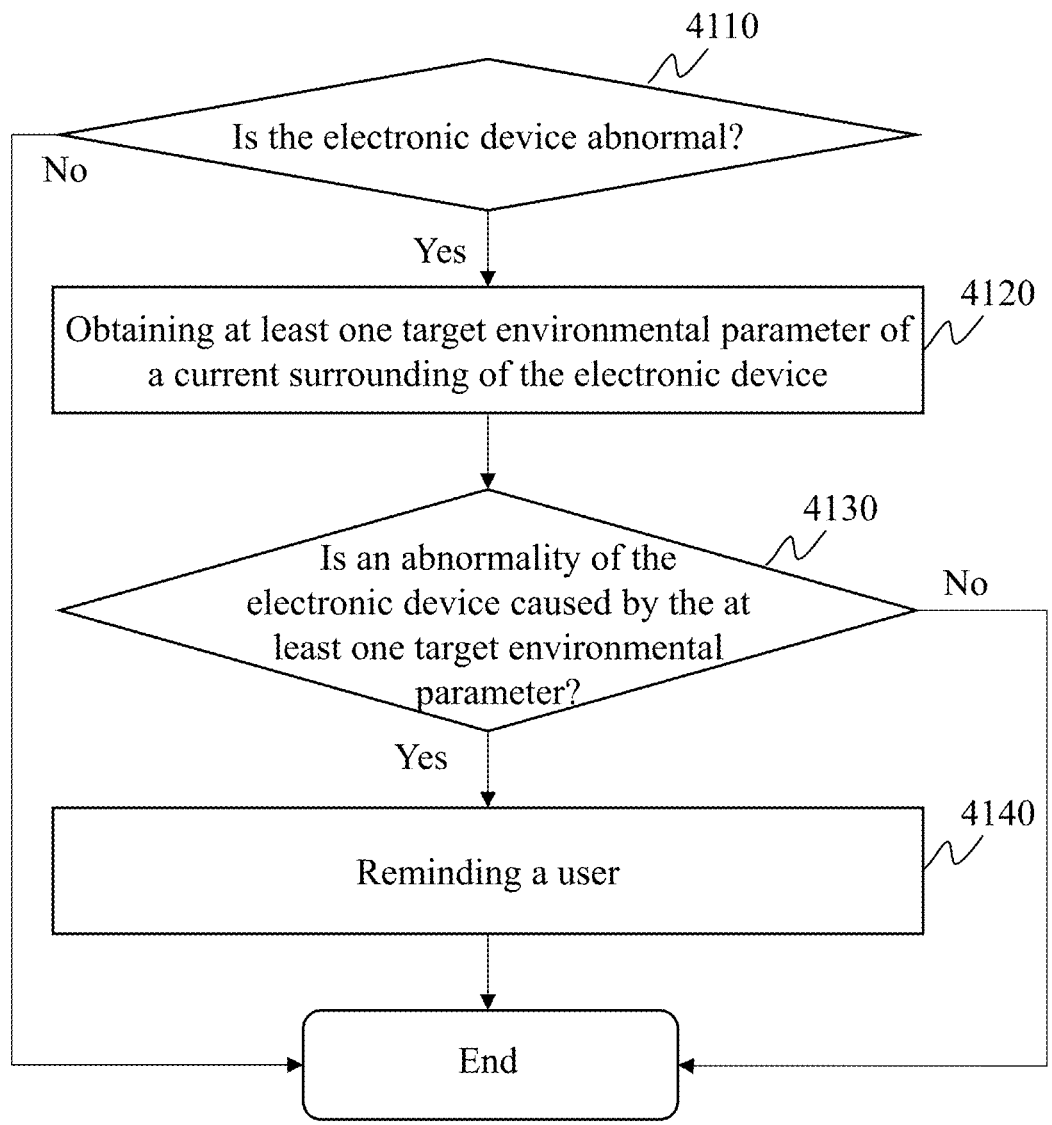
FIG. 41 is a flowchart illustrating an exemplary process for determining an association between an abnormality of the electronic device and a target environmental parameter according to some embodiments of the present disclosure.

FIG. 41 is a flowchart illustrating an exemplary process for determining an association between an abnormality of an electronic intelligent lock and a target environmental parameter according to some embodiments of the present disclosure. In some embodiments, process 4100 may be executed by the system 100. For example, the process 4100 may be implemented as a set of instructions (e.g., an application) stored in a storage device (e.g., the storage device 130). In some embodiments, the electronic device 120 may execute the set of instructions and may accordingly be directed to perform the process 4100. In some embodiments, the process 4100 may be implemented on the controller 4010 described in FIG. 40.

In 4110, the electronic device 120 (e.g., the controller 4010, an abnormality detection module 4510) may determine whether the electronic device is abnormal. If the electronic device is abnormal, the process 4100 may proceed to operation 4120. If the electronic device is not abnormal, the process 4100 may be ended.

In some embodiments, the abnormality of the electronic device may include a hardware exception of the electronic device, for example, a display (e.g., the display 4003) may not work properly. Alternatively, the abnormality of the electronic device may also include an abnormality in a detection process. For example, for an electronic device having a fingerprint recognition function, a fingerprint recognition rate is lower than a recognition threshold.

If the electronic device is not abnormal, the process 4100 may be terminated, and the electronic device may be re-detected for an abnormality after a period.

In 4120, the electronic device 120 (e.g., the controller 4010, an obtaining module 4610) may obtain at least one target environmental parameter of a current surroundings of the electronic device.

In some embodiments, the at least one target environmental parameter may refer to an environmental parameter related to the abnormality of the electronic device. For example, a target environmental parameter corresponding to a lower fingerprint recognition rate may include ambient humidity. As another example, a target environmental parameter corresponding to a breakdown display of the intelligent lock may be ambient temperature.

The electronic device 120 may obtain the environmental parameter from the environmental parameter sensor, or obtain the target environmental parameter from a server.

In 4130, the electronic device 120 (e.g., the controller 4010, the abnormality determining module 4520) may determine whether the abnormality of the electronic device is caused by the at least one target environmental parameter. If the abnormality of the electronic device is caused by the at least one target environmental parameter, the process 4100 may proceed to operation 4140. If the abnormality of the electronic device is not caused by the at least one target environmental parameter, the process 4100 may be ended.

In some embodiments, the electronic device 120 may further determine whether the target environmental parameter is abnormal. For example, based on whether the environmental parameter value is within an abnormal threshold range. If a value of the target environmental parameter is within an abnormal threshold range, the target environmental parameter may be considered to be abnormal, and the abnormality of the electronic device may be considered to be caused by an abnormality of the target environmental parameter. If the value of the target environmental parameter is not within the abnormal threshold range, the target environmental parameter may be considered to be normal, and the abnormality of the electronic device may not be related to the target environmental parameter.

In 4140, the electronic device 120 (e.g., the controller 4010, a reminding module 4530, or a notification module 4640) may remind a user.

In some embodiments, the electronic device 120 may remind the user that the abnormality of the electronic device is related to the at least one target environmental parameter. Additionally, the electronic device 120 may remind the user to take an appropriate measure.

For example, if the lower fingerprint recognition rate of the electronic device is related to the ambient humidity, the user may be reminded that the humidity of the current surroundings is too low, and an unlocking fingerprint may be re-entered.

As another example, if the breakdown display of the electronic device is related to the ambient temperature, the user may be reminded that the display does not work properly due to the abnormal ambient temperature.

In some embodiments of the present disclosure, a method for determining a connection between an abnormality of the electronic device and a target environmental parameter is provided. By implementing the method, the electronic device may obtain the target environment parameter of the current surroundings, and determine the abnormality of the electronic device related to the target environmental parameter. Specifically, for the electronic device with an abnormality, it may be determined whether the abnormality of the electronic device is caused by the at least one target environmental parameter. If the abnormality of the electronic device is related to the target environmental parameter, the user may be reminded that the abnormality of the electronic device is related to the target environmental parameter, thereby helping the user to determine a cause of the abnormality of the electronic device as soon as possible. If the abnormality of the electronic device is not related to the target environmental parameter, thereby helping the user to exclude the cause of the abnormality. In such implementation, a function of the intelligent lock using the environment parameter may be extended and the user experience may be improved.

Figure 42:
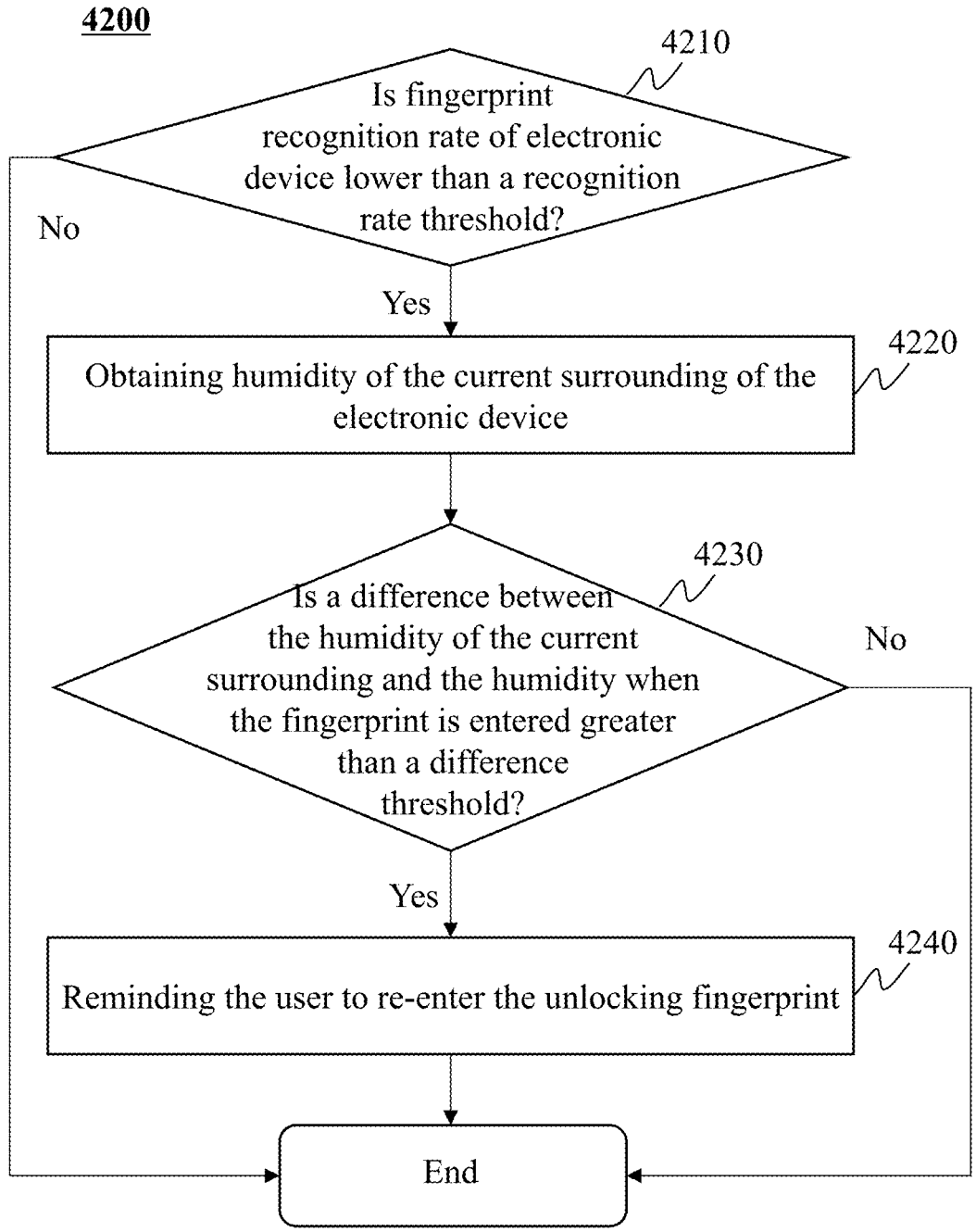
FIG. 42 is a flowchart illustrating an exemplary process for determining an association between the lower fingerprint recognition rate of the electronic device and the humidity of the current surroundings according to some embodiments of the present disclosure.

FIG. 42 is a flowchart illustrating an exemplary process for determining an association between the lower fingerprint recognition rate of the electronic device and the humidity of the current surroundings according to some embodiments of the present disclosure. In some embodiments, process 4200 may be executed by the system 100. For example, the process 4200 may be implemented as a set of instructions (e.g., an application) stored in a storage device (e.g., the storage device 130). In some embodiments, the electronic device 120 may execute the set of instructions and may accordingly be directed to perform the process 4200.

In 4210, the electronic device 120 (e.g., the controller 4010, a parameter determination module 4630) may determine whether the fingerprint recognition rate of the electronic device is lower than a recognition rate threshold. If the fingerprint recognition rate of the electronic device is lower than a recognition rate threshold, the process 4200 may proceed to operation 4220. If the fingerprint recognition rate of the electronic device is higher than or equal to the recognition rate threshold, the process 4200 may be ended.

The ambient humidity may affect a characteristic of human skin. In different seasons, a moistness degree of the human skin may be different, which results in different fingerprint recognition rates. For example, if the ambient humidity is too low, the skin may be quite dry, which greatly reduces the fingerprint recognition rate.

In some embodiments, if a fingerprint recognition fails for three consecutive times, the fingerprint recognition rate may be considered to be lower. In such case, a cause for the lower fingerprint recognition rate may be determined at least partly based on the humidity of the current surroundings of the electronic device.

In some embodiments, the fingerprint recognition rate over a period of time may be determined. If the fingerprint recognition rate is less than the recognition rate threshold, the cause for the lower fingerprint recognition rate may be determined at least partly based on the humidity of the current surroundings of the electronic device.

In 4220, the electronic device 120 (e.g., the controller 4010, an obtaining module 4610) may obtain the humidity of the current surroundings of the electronic device.

In some embodiments, the electronic device 120 may obtain the humidity of collected by the temperature and humidity sensor.

In 4230, the electronic device 120 (e.g., the controller 4010, the abnormality determining module 4520) may determine whether a difference between the humidity of the current surroundings of the electronic device and the humidity of a surroundings of the electronic device when the fingerprint is entered is greater than a difference threshold. If the difference is greater than the difference threshold, the process 4200 may proceed to operation 4240. If the difference is smaller than or equal to the difference threshold, the process 4200 may be ended.

In some embodiments, if the difference is greater than the difference threshold, the electronic device 120 may determine that the lower fingerprint recognition rate is related to the humidity of the current surroundings of the electronic device. If the difference is less than or equal to the difference threshold, the electronic device 120 may determine that the lower fingerprint recognition rate is not related to the humidity of the current surroundings of the electronic device.

In 4240, the electronic device 120 (e.g., the controller 4010, the reminding module 4530, the notification module 4640) may remind the user to re-enter an unlocking fingerprint.

In some embodiments, if the lower fingerprint recognition rate is not related to the humidity of the current surroundings of the electronic device, the user may be reminded that the current surroundings is dry, and the unlocking fingerprint may need to be re-entered.

In some embodiments, the electronic device may include a voice module, which may be configured to broadcast prompt information. For example, the voice module may broadcast the prompt information like the weather is dry and the unlocking fingerprint needs to be re-entered.

In some embodiments, the electronic device may include a display (e.g., the display 4030), and the prompt information may be displayed on the display. For example, the display may display the prompt information like the weather is dry and the unlocking fingerprint needs to be re-entered.

It should be noted that the prompt information may only have a reminding function, if a user wants to re-enter the unlocking fingerprint, the user may need to obtain a permission to enter the fingerprint to ensure the security of the electronic device.

By the implementation of the process 4200, the humidity of the current surroundings of the electronic device may be used to assist the determination that whether the lower fingerprint recognition rate is caused by a dry weather. If so, the user may be reminded to re-enter the unlocking fingerprint to improve the fingerprint recognition rate of the electronic device, thereby improving the user experience.

Figure 43:
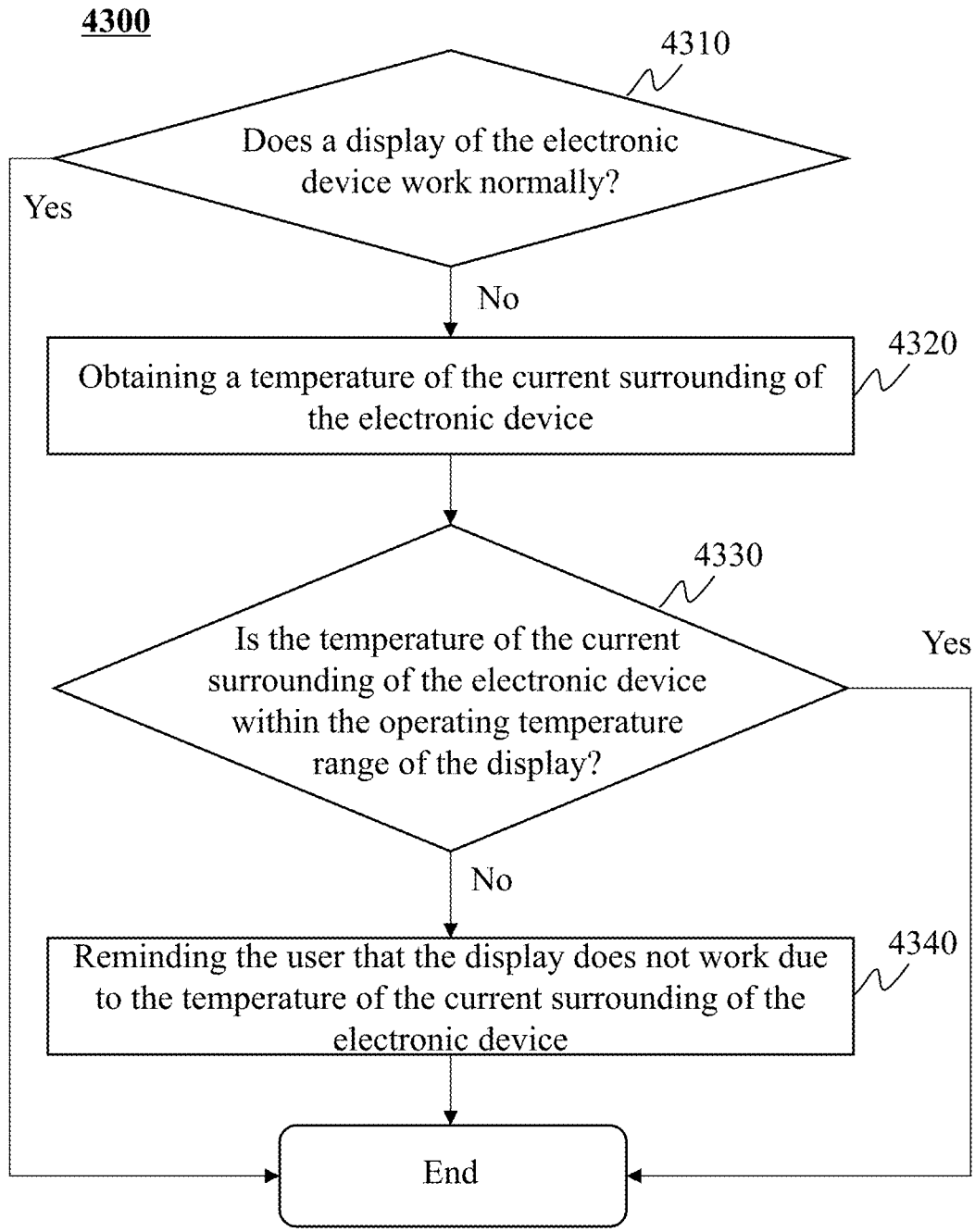
FIG. 43 is a flowchart illustrating an exemplary process for determining an association between the breakdown display of the electronic device and the temperature of the current surroundings according to some embodiments of the present disclosure.

FIG. 43 is a flowchart illustrating an exemplary process for determining an association between the breakdown display of the electronic device and the temperature of the current surroundings according to some embodiments of the present disclosure. In some embodiments, process 4300 may be executed by the system 100. For example, the process 4300 may be implemented as a set of instructions (e.g., an application) stored in a storage device (e.g., the storage device 130). In some embodiments, the electronic device 120 may execute the set of instructions and may accordingly be directed to perform the process 4300.

In 4310, the electronic device 120 (e.g., the controller 4010, the abnormality detection module 4510) may determine whether the display of the electronic device works normally. If the display of the electronic device works normally, the process 4300 may proceed to operation 4320. If the display of the electronic device does not work normally, the process 4300 may be ended.

In some embodiments, the electronic device 120 may determine whether a communication between the electronic device 120 to the display is normal. If the communication is not normal, the display may be considered not to work normally. If the communication is normal, the display may be considered to work normally.

In 4320, the electronic device 120 (e.g., the controller 4010, the obtaining module 4610) may obtain the temperature of the current surroundings of the electronic device.

In some embodiments, the display may have an operating temperature range, for example, −10° to 90°. If the temperature of the current surroundings is lower than a minimum value of the operating temperature range, the display may not work normally. Therefore, if the display does not work normally, it may be preferable to check whether a cause for the breakdown display is due to the temperature of the current surroundings being too low. In some embodiments, the electronic device 120 may obtain the temperature of the current surroundings collected by the temperature and humidity sensor.

In 4330, the electronic device 120 (e.g., the controller 4010, the abnormality determination module 4520) may determine whether the temperature of the current surroundings of the electronic device falls outside the operating temperature range of the display. If the temperature of the current surroundings of the electronic device falls outside the operating temperature range of the display, the process 4300 may proceed to operation 4340. Otherwise, the process may be ended.

In 4340, the electronic device 120 (e.g., the controller 4010, the reminding module 4530, the notification module 4640) may remind the user that the display does not work due to the temperature of the current surroundings of the electronic device.

In some embodiments, the electronic device may include a voice module, which may be configured to broadcast prompt information. For example, the voice module may broadcast the prompt information like the display does not work normally due to the abnormal temperature of the current surroundings.

In some embodiments, if the display does not work normally due to an abnormal temperature of the current surroundings, the electronic device 120 may send the prompt information to the server through the wireless module (e.g., the wireless communication module 4040). Then, the server may send the prompt information to an APP of a mobile smart terminal bound to the electronic device, so that the user can obtain the prompt information in time.

In some embodiments, the electronic device 120 may also determine whether the display works normally after been determining that the temperature of the current surroundings is abnormal. If the display does not work normally, the electronic device 120 may determine that the display does not work normally due to the abnormal temperature of the current surroundings.

In some embodiments, if the display does not work normally due to the temperature of the current surroundings being too low, an appropriate protective measure may be performed. For example, a heating module may be mounted on the electronic device to make the display to work normally by heating.

In some embodiments, if the user or a maintenance man determines that the display of the electronic device is damaged, the temperature of the current surroundings of the electronic device may be obtained from the server through the mobile smart terminal bound to the electronic device. Then, the temperature may be determined whether is abnormal. If the temperature is abnormal, the display may be considered not to work normally due to the abnormal temperature of the current surroundings.

By the implementation of the process 4300, the temperature of the current surroundings of the electronic device may be used to assist the determination that whether the abnormality of the display of the electronic device is caused by the abnormal temperature of the current surroundings. If so, the user may be reminded that the display does not work normally due to the abnormal temperature of the current surroundings, and the appropriate measures need to be performed, for example, repairing the electronic device or adjust the temperature of the surroundings of the electronic device.

Figure 44:
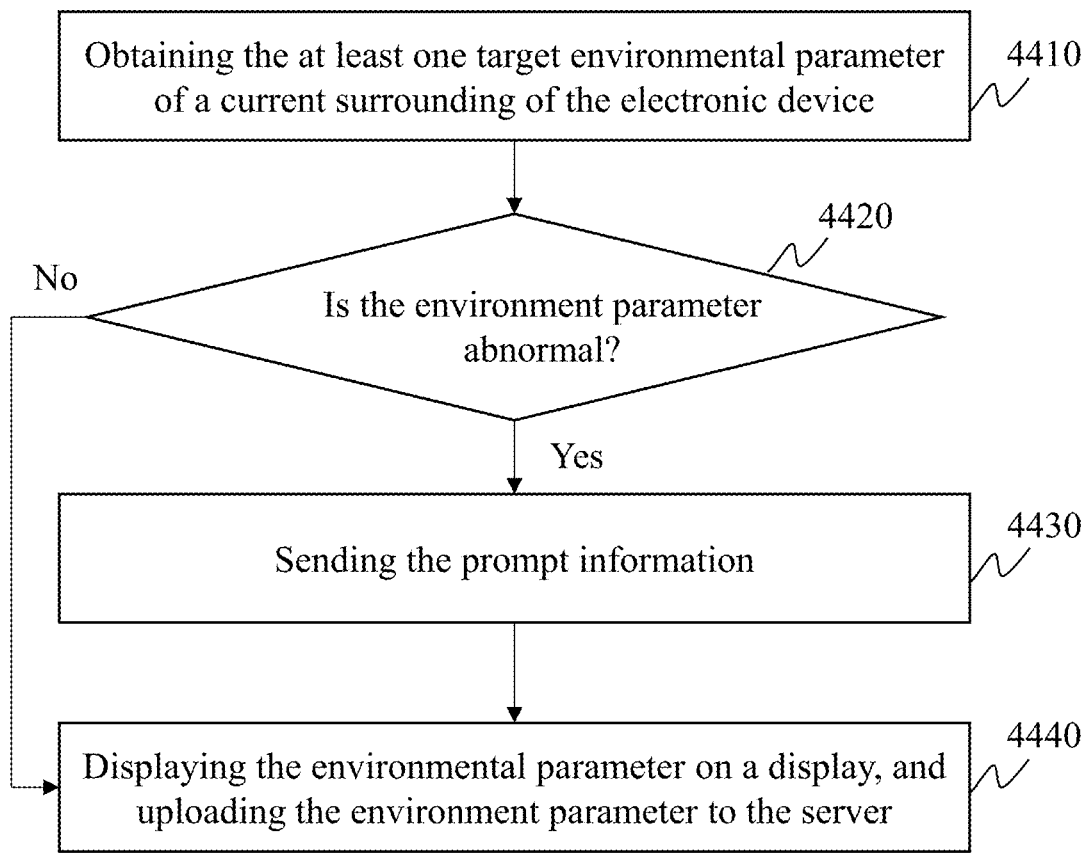
FIG. 44 is a flowchart illustrating an exemplary process for determining an association between the electronic device and the target environmental parameter according to some embodiments of the present disclosure.

FIG. 44 is a flowchart illustrating an exemplary process for determining an association between the electronic device and the target environmental parameter according to some embodiments of the present disclosure. In some embodiments, process 4400 may be executed by the system 100. For example, the process 4400 may be implemented as a set of instructions (e.g., an application) stored in a storage device (e.g., the storage device 130). In some embodiments, the electronic device 110 may execute the set of instructions and may accordingly be directed to perform the process 4400. In some embodiments, the target environment parameter obtained by the intelligent lock may be displayed on the display in real-time, or may be sent to the server.

In 4410, the electronic device 120 (e.g., the controller 4010, the obtaining module 4610) may obtain at least one environmental parameter of a current surroundings of the electronic device.

In some embodiments, a sampling frequency, an abnormal temperature threshold range, an abnormal humidity threshold range, or the like, may be set for the environmental parameter sensor (e.g., the temperature and humidity sensor). The temperature and humidity sensor may collect the temperature and humidity of the current surroundings according to the set sampling frequency, and transmit the temperature and humidity to the electronic device 120 for further analysis.

In 4420, the electronic device 120 (e.g., the controller 4010, the parameter determination module 4630) may determine whether the environment parameter is abnormal. If the environment parameter is abnormal, the process 4400 may proceed to operation 4440. If the environment parameter is normal, the process 4400 may proceed to operation 4430.

In some embodiments, after obtaining the temperature and/or humidity of the current surroundings collected from the environmental parameter sensor, the electronic device 120 may determine whether the temperature and/or humidity is abnormal based on the abnormal temperature and/or humidity threshold set in 4410, respectively. The electronic device 120 may obtain the temperature and/or humidity of the current surroundings collected by the environmental parameter sensor, and determine whether the temperature and/or humidity is abnormal based on the abnormal temperature range and/or humidity threshold range set in 4410, respectively. For example, the electronic device 120 may determine whether the temperature and/or the humidity of the current surroundings is within the abnormal temperature and/or humidity threshold, respectively. If so, the temperature and/or humidity of the current surroundings may be abnormal. If not, the temperature and humidity of the current surroundings may be normal.

In 4430, the electronic device 120 (e.g., the controller 4010, the reminding module 4530, the notification module 4640) may send the prompt information.

In some embodiments, if the environment parameter (e.g., the temperature and/or humidity of the current surroundings) is abnormal, the user may be reminded to take appropriate measures. For example, a message may be sent to, or a call may be made to the mobile smart terminal that is bound to the intelligent lock.

In 4440, the electronic device 120 may display the environmental parameter on a display, and upload the environment parameter to the server. The server may send the environment parameter to the mobile intelligent terminal bound with the electronic device for display.

The obtained temperature and humidity of the current surroundings of the intelligent lock may be displayed directly on the display. The user may obtain a real-time temperature and humidity of the current surroundings through the display when the electronic device is being used. In addition, the electronic device 120 may directly upload the obtained temperature and humidity of the current surroundings to the server through the wireless module. The server may send the temperature and humidity to the APP of the mobile intelligent terminal bound to the electronic device for displaying, so that users can obtain the temperature and humidity of the surroundings of the electronic device at any time and any place.

In some embodiments, the environment parameter may be uploaded to the server at the moment that the environment parameter is obtained, or may be uploaded to the server after determining whether the environment parameter is abnormal.

By the implementation of the process 4300, after obtaining the environment parameter of the current surroundings of the electronic device, the environment parameter may be determined whether is normal. If so, the environment parameter may be displayed on a display, so that the user may obtain the environmental parameter of the current environment directly from the display. In addition, the environment parameter may be uploaded to the server, so that the user may obtain the environment parameter directly through a mobile intelligent terminal from the server. In such implementation, the user may obtain the environment parameter of the electronic device at any time and any place.

Figure 45:
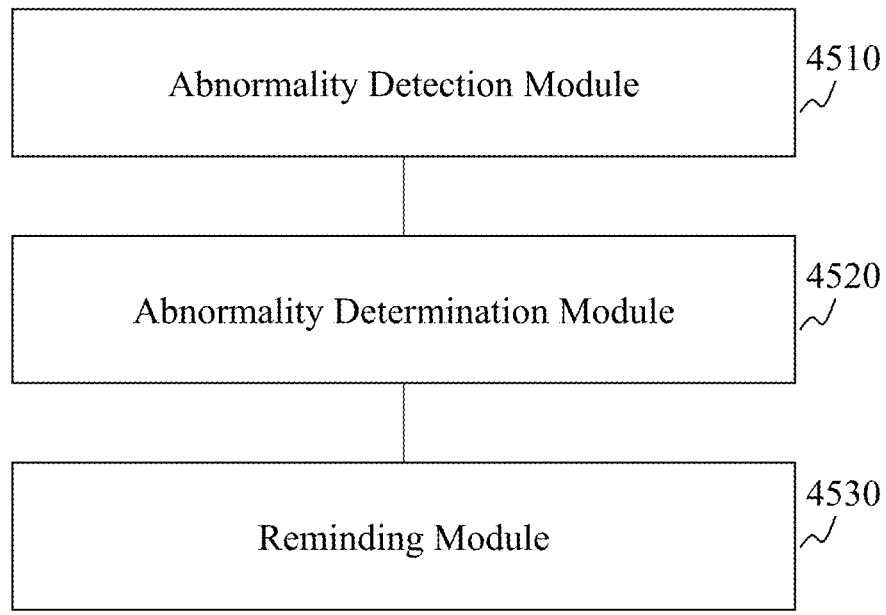
FIG. 45 is a block diagram illustrating an exemplary electronic device for determining an association between an electronic device with an environmental parameter according to some embodiments of the present disclosure.

FIG. 45 is a block diagram illustrating an exemplary electronic device for determining an association between the electronic device with an environmental parameter according to some embodiments of the present disclosure. In some embodiments, the electronic device 4500 may be implemented on the electronic device 120 in FIG. 1. As shown in FIG. 45, the electronic device 4500 may include an abnormality detection module 4510, an abnormality determination module 4520, and a reminding module 4530.

The abnormality detection module 4510 may be configured to determine whether the electronic device is abnormal.

In some embodiments, the abnormality of the electronic device may include a hardware exception of the electronic device, for example, a display (e.g., the display 4003) may not work properly. Alternatively, the abnormality of the electronic device may also include an abnormality in a detection process. For example, for an electronic device having a fingerprint recognition function, a fingerprint recognition rate is lower than a certain threshold.

In some embodiments, the electronic device may include a fingerprint recognition component. The abnormality of the electronic device may include a low fingerprint recognition rate. In such case, the abnormality detection module 4510 may be configured to determine whether the fingerprint recognition rate is lower than a fingerprint recognition rate. If the fingerprint recognition rate is lower than the recognition rate threshold, the electronic device may be abnormal. If the fingerprint recognition rate is greater than or equal to the recognition rate threshold, the electronic device may be normal.

In some embodiments, the electronic device may include a display. The abnormality of the electronic device may include a breakdown display. In such case, the abnormality detection module 4510 may be configured to determine whether the display works properly. If the display does not work properly, the electronic device may be abnormal. If the display works properly, the electronic device may be normal.

The abnormality determining module 4520 may be configured to obtain the target environmental parameter of the surroundings of the electronic device that is abnormal, and determine whether the abnormality of the electronic device is caused by the target environmental parameter.

In some embodiments, the at least one target environmental parameter may refer to an environmental parameter related to the abnormality of the electronic device. After obtaining the at least one target environmental parameter, the target environmental parameter may be determined whether is abnormal. If the target environmental parameter is abnormal, the abnormal of the electronic device may be determined as caused by the target environmental parameter. If the target environmental parameter is normal, the abnormality of the electronic device may be considered to be irrelevant to the target environmental parameter.

In some embodiments, the electronic device may have a lower fingerprint recognition rate, and the corresponding target environmental parameter may be the humidity. In such case, the abnormality determination module 4520 may be configured to, if the fingerprint recognition rate of the electronic device is lower than a recognition rate threshold, obtain the humidity of the current surroundings of the electronic device. The abnormality determination module 4520 may further be configured to determine whether a difference between the humidity of the current surroundings of the electronic device and the humidity of a surroundings of the electronic device when the fingerprint is entered is greater than a difference threshold. if the difference is greater than the difference threshold, the abnormality determination module 4520 may determine that the lower fingerprint recognition rate is related to the humidity of the current surroundings of the electronic device. If the difference is less than or equal to the difference threshold, the abnormality determination module 4520 may determine that the lower fingerprint recognition rate is not related to the humidity of the current surroundings of the electronic device.

In some embodiments, the electronic device may have a breakdown display, and the corresponding target environmental parameter may be the temperature of the current surroundings. In such case, the abnormality determination module 4520 may be configured to, if the display of the electronic device does not work normally, obtain the temperature of the current surroundings of the electronic device. The abnormality determination module 4520 may further be configured to determine whether the temperature of the current surroundings of the electronic device falls outside the operating temperature range of the display. If the temperature of the current surroundings of the electronic device falls outside the operating temperature range of the display, the temperature of the current surroundings may be determined as the cause for the abnormality of the display. Otherwise, the temperature of the current surroundings may not be determined as the cause for the abnormality of the display.

The reminding module 4530 may be configured to remind the user that the abnormality of the electronic device is related to the target environmental parameter after determining the abnormality of the electronic device is caused by the target environmental parameter. For example, the reminding module 4530 may remind the user that the abnormality of the electronic device is related to the target environmental parameter, or an appropriate measure should be performed. Merely by way of an example, if the fingerprint recognition rate is lower than the recognition rate threshold, the user may be reminded to re-enter the unlocking fingerprint.

In some embodiments of the present disclosure, an electronic device for determining an association between an abnormality of the electronic device and a target environmental parameter is provided. The electronic device may perform a method. By implementing the method, the electronic device may obtain the target environment parameter of the current surroundings, and determine the abnormality of the electronic device related to the target environmental parameter. Specifically, for the electronic device with an abnormality, it may be determined whether the abnormality of the electronic device is caused by the at least one target environmental parameter. If the abnormality of the electronic device is related to the target environmental parameter, the user may be reminded that the abnormality of the electronic device is related to the target environmental parameter, thereby helping the user to determine a cause of the abnormality of the electronic device as soon as possible. If the abnormality of the electronic device is not related to the target environmental parameter, thereby helping the user to exclude the cause of the abnormality. In such implementation, a function of the electronic device using the environment parameter may be extended and the user experience may be improved.

Figure 46:
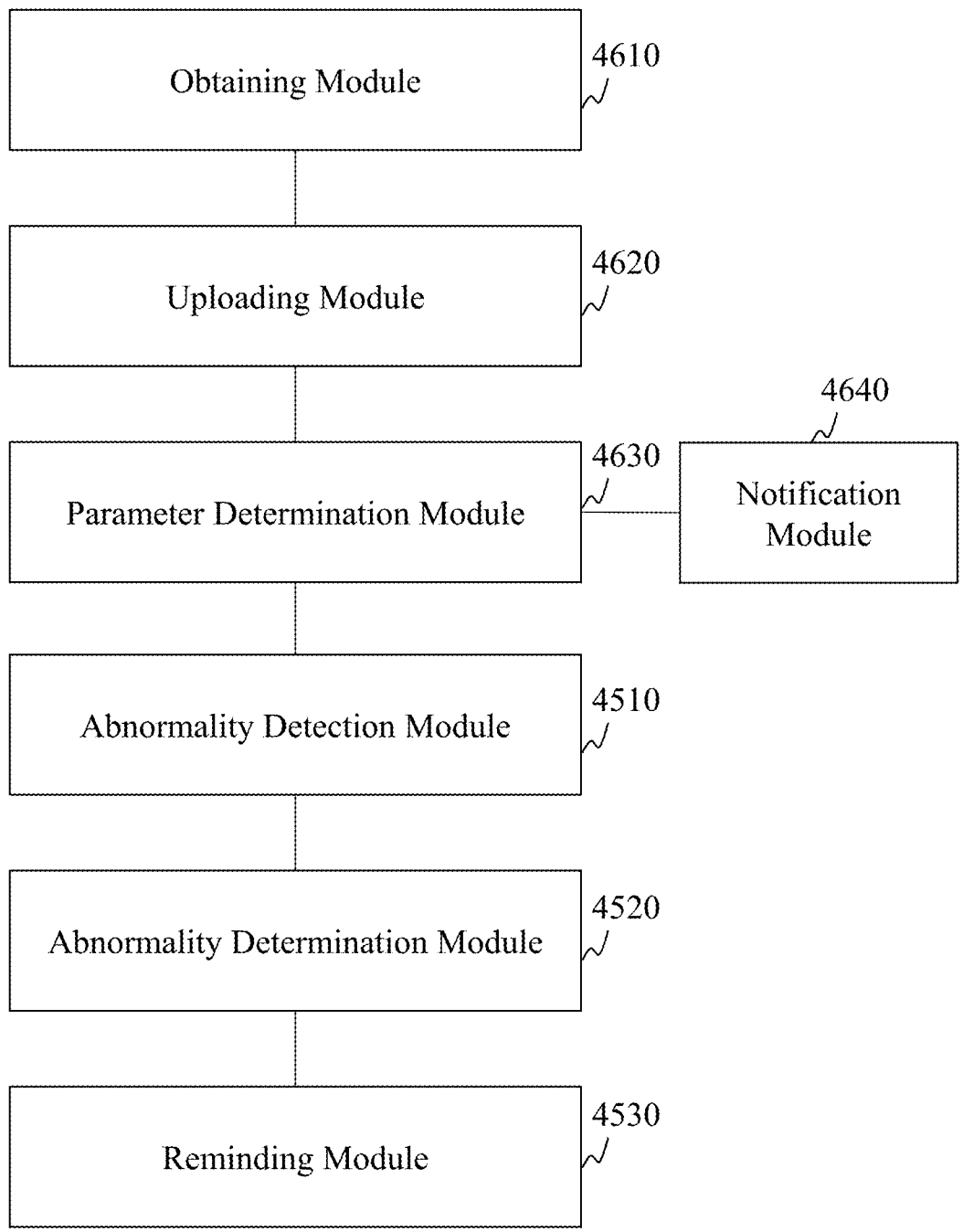
FIG. 46 is a block diagram illustrating an exemplary electronic device for determining an association between an electronic device with an environmental parameter according to some embodiments of the present disclosure.

FIG. 46 is a block diagram illustrating an exemplary electronic device for determining an association between an intelligent lock with an environmental parameter according to some embodiments of the present disclosure. In some embodiments, the electronic device 4500 may be implemented on the electronic device 120 in FIG. 1. As shown in FIG. 46, the device 4600 may include an obtaining module 4610, an uploading module 4620, a parameter determination module 4630, and a notification module 4640.

The obtaining module 4610 may be configured to obtain an environment parameter of the current surroundings of the electronic device.

In some embodiments, a sampling frequency, an abnormal temperature threshold range, an abnormal humidity threshold range, or the like, may be set for the environmental parameter sensor (e.g., the temperature and humidity sensor). The temperature and humidity sensor may collect the temperature and humidity of the current surroundings according to the set sampling frequency, and transmit the temperature and humidity to the electronic device 120 for further analysis.

The uploading module 4620 may be configured to upload the environment parameter to the server. The server may send the environment parameter to the mobile intelligent terminal bound with the electronic device for display.

In some embodiments, the environment parameter may be uploaded to the server the at the moment that the environment parameter is obtained, or may be uploaded to the server after determining whether the environment parameter is abnormal.

The parameter determination module 4630 may be configured to determine whether the environmental parameter is abnormal.

For example, the parameter determination module 4630 may determine whether the temperature and/or the humidity of the current surroundings is within the abnormal temperature and/or humidity threshold, respectively. If so, the temperature and/or humidity of the current surroundings may be abnormal. If not, the temperature and humidity of the current surroundings may be normal.

The notification module 4640 may be configured to remind the user that the environment parameter of the current surroundings of the electronic device is abnormal.

In some embodiments, if the environment parameter (e.g., the temperature and/or humidity of the current surroundings) is abnormal, the user may be reminded to take appropriate measures. For example, a message may be sent to, or a call may be made to the mobile smart terminal that is bound to the electronic device.

In some embodiments of the present disclosure, an electronic device for determining an association between an abnormality of the electronic device and a target environmental parameter is provided. The electronic device may perform a method. By implementing the method, after obtaining the environment parameter of the current surroundings of the electronic device, the environment parameter may be determined whether is normal. If so, the environment parameter may be displayed on a display, so that the user may obtain the environmental parameter of the current environment directly from the display. In addition, the environment parameter may be uploaded to the server, so that the user may obtain the environment parameter directly through a mobile intelligent terminal from the server. In such implementation, the user may obtain the environment parameter of the intelligent lock at any time and any place.

The device 4600 provided herein may be configured to determine whether the obtained environment parameter of the current surroundings of the electronic device is normal. If so, the environment parameter may be displayed on the display, so that the user may see the environmental parameter of the current environment directly from the display. In addition, the environment parameter may be uploaded to the server, so that the user may see the environment parameter directly through the mobile intelligent terminal from the server. In this way, the user may see the environment parameter of the electronic device at any time and any place.

The electronic device and/or the processing device described in the present disclosure may include a processor and a memory. The modules and/or units mentioned in the above embodiments may be stored in the memory as programs. The programs stored in the memory may be executed by the processor to implement the corresponding functions described in the present disclosure.

The processor may contain one or more kernels. The kernels may invoke the corresponding program unit(s) stored in the memory. The second electronic device may be controlled by adjusting parameters of the kernels.

The memory may include a non-persistent memory, a random access memory (RAM), and/or a non-volatile memory in a computer readable medium. For example, a read only memory (ROM) or a flash memory. The memory may include at least one memory chip.

Figure 47:
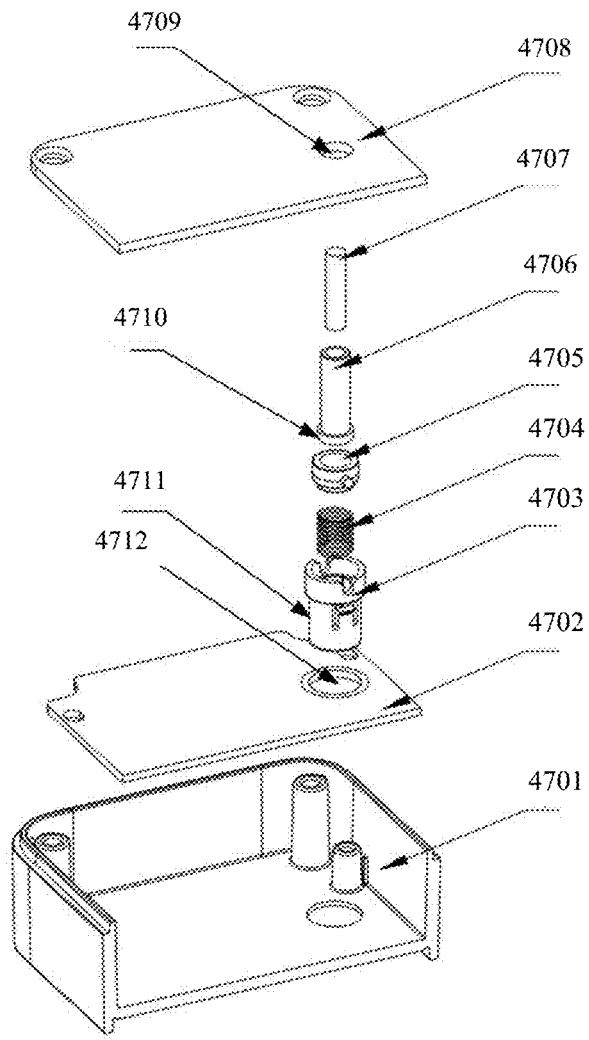
FIG. 47 illustrates an exploded view of an anti-pry switch according to some embodiments of the present disclosure.

The embodiments of the present disclosure provide an anti-pry switch. The anti-pry switch may be a part of the electronic device 120 in FIG. 1, for example, an intelligent lock. Referring to FIG. 47 and FIG. 48, FIG. 47 illustrates an exploded view of an anti-pry switch according to some embodiments of the present disclosure, FIG. 48 a section view of an anti-pry switch according to some embodiments of the present disclosure. As shown in FIG. 47 and FIG. 48, the anti-pry switch may include an annular capacitor, a core rod, a hold-down assembly (not shown), and a spring assembly. The middle of the annular capacitor may be provided with a through-hole 4712. A core rod may insert into the through-hole 4712, and the core rod may be divided into a first segment and a second segment having unequal dielectric constants along its own axis. When the first segment is placed in the through-hole 4712, the capacitance value of the annual capacitor may be a first capacitance value. When the second segment is placed in the through-hole 4712, the capacitance value of the annular capacitor may be a second capacitance value. The first capacitance value and the second capacitance value may not be equal. The hold-down assembly may be used to contact a first end of the core rod. The spring assembly may be used to contact a second end of the core rod. After the first end of the core rod is squeezed with the hold-down assembly, the first segment of the core rod is inserted through the through-hole (4712), and after the hold-down assembly is away from the first end of the core rod, the second segment of the core rod is inserted through the through-hole (4712).

The annular capacitor may usually be composed of one or more pairs of electrodes distributed on the same circle. When a core rod is inserted into the through-hole 4712, the dielectric constant between any pair of electrodes may be changed, thereby causing a change in the capacitance value of the entire annular capacitor.

The anti-pry switch may be connected to an alarm system, and the alarm system may raise an alarm according to the change of the capacitance value of the anonymous capacitor. In an actual situation, the core rod may be changed from the first capacitance value to the second capacitance value after a large movement. Specifically, if the first end of the core rod changes from a compressed state to a relaxed state, when the second segment of the core rod inserts into the through-hole 4712, the core rod should have moved at least 6 mm. That is to say, the core rod has moved at least 6 mm after the state of the alarm system changes from normal to alarm. It may effectively prevent the alarm system from generating false alarms due to installation errors or unevenness of the door panel. The hold-down assembly may usually be the front assembly of an intelligent lock (such as an intelligent door lock). When the intelligent lock was being violently destroyed, the hold-down assembly may be removed first. Once a pressing force provided by the hold-down assembly is lost, the core rod will move under a pushing force provided by the spring assembly. Finally, the second segment of the core rod will be inserted into the through-hole 4712 of the anonymous capacitor. The capacitance value of the annular capacitor will change, and the alarm system alarm will be triggered.

The anti-pry switch disclosed in the above embodiments may not only effectively prevent the false alarm of the alarm system, but also achieve the effect of timely warning when the intelligent lock is being violently damaged.

As shown in FIG. 47, the spring assembly may include a spring tube 4711, a spring 4704, and a spring limiting lid

4705. The spring tube 4711 has a cylindrical shape with an open top. The spring 4704 is embedded in the inner cavity of the spring tube 4711. The spring limiting lid 4705 is provided with a hole for the core rod to pass through. The spring limiting lid 4705 is fixedly disposed at the top end of the spring tube 4711 to prevent the spring 4704 from coming out of the spring tube 4711.

The connection between the spring limiting lid 4705 and the spring tube 4711 may not be limited. The spring limiting lid 4705 and the spring tube 4711 may be connected by a connecting member such as a screw or a bolt, or may be coupled to each other. In the embodiment, the top end of the side wall of the spring tube 4711 has a flared portion 4703. As shown in FIG. 47, the top end of the side wall of the spring tube 4711 is provided with a bayonet. The spring limiting lid 4705 is provided with a post corresponding to the bayonet, and the spring limiting lid 4705 is embedded in the flared portion 4703 and is connected to the bayonet by the post. The material of the spring limiting lid 4705 may not be limited. It may be made of metal or non-metal. In the embodiment of the present disclosure, the spring limiting lid 4705 is made of plastic material.

The post is provided one-to-one with the bayonet, and the number and the shape of the post are not limited. In the embodiment of the present disclosure, the spring tube 4711 has two bayonets. The two bayonets are symmetrically set. The outer wall of the spring limiting lid 4705 is radially provided with two posts corresponding to the bayonet. It should be noted that the number of the posts and the bayonets may be designed to be three, four, or more according to actual needs.

It will be understood by those skilled in the art that the way in which the core rod is formed into two segments and the dielectric constant between the two segments being not equal is not limited. For example, if the materials used in the two segments are different, the dielectric constants of the two segments may not be equal. As another example, if the diameters of the two segments made with the same material are different, the dielectric constants of the two segments may not be equal, too. In the embodiment of the present disclosure, the core rod may include a rod body made with a metal material (such as copper, steel or iron) and a plastic rod sleeve. The plastic rod sleeve may include a sleeve portion 4706 and an end portion 4710. The sleeve portion 4706 may have an open end at one end and a closed end at the other end. The end portion 4710 may be coupled to the closed end, and the core rod body 4707 may be inserted into the sleeve portion 4706 from the open end. Moreover, the sleeve portion 4706 and the core rod body 4707 which are integrally formed constitute the first segment, and the end portion 4710 may constitute the second segment. The end portion 4710 and the core rod body 4707 portions may be radially coincident with each other or may be mutually offset in the radial direction. If the end portion 4710 and the core rod body 4707 are radially offset from each other, the end portion 4710 may only include plastic materials.

As shown in FIG. 48, when the first end of the core rod is not squeezed, the second segment of the core rod may be inserted into the through-hole 4712 of the annular capacitor. And when the hold-down assembly (usually the front assembly of the intelligent lock) presses the first end of the core rod, the core rod may move toward the spring assembly. The first segment formed by the sleeve portion 4706 and the core rod body 4707 may be inserted into the through-hole 4712 of the annular capacitor.

As shown in FIG. 47 and FIG. 48, the diameter of the sleeve portion 4706 may not be greater than the diameter of through-hole 4712 of the annular capacitor. The diameter of the end portion 4710 may be greater than the diameter of the through-hole 4712 of the anonymous capacitor. When the core rod is installed, the end of the core rod without the end portion may be first inserted into the through-hole 4712 of the annular capacitor. The end portion 4710 may serve as a limit to prevent the bottom end of the core rod from coming out of the through-hole 4712, and the end portion 4710 may constitute the second end of the core rod.

Furthermore, the anti-pry switch may include a bottom case 4701 and a top cover 4708. As shown in FIG. 47 and FIG. 48, the bottom end of the spring tube 4711 may be fixedly disposed in the bottom case 4701. The top cover 4708 may be fixedly disposed at the top end of the bottom case 4701. The top cover 4708 may be provided with a hole 4709. The first end of the core rod may traverse the top cover 4708 through the hole 4709. Referring to FIG. 47 to FIG. 50, FIG. 49 illustrates a schematic diagram of the anti-pry switch according to some embodiments of the present disclosure, FIG. 50 illustrates another schematic diagram of the anti-pry switch according to some embodiments of the present disclosure. As shown in FIG. 47 to FIG. 50, after assembling (except for the hold-down assembly), the first end of the core rod passes through the top cover 4708.

Since the intelligent lock is usually provided with a PCB board 4702, in order to enhance the compactness of the entire anti-pry switch, the annular capacitor may be integrated on the PCB board 4702. As shown in FIG. 47 to FIG. 50, the PCB board 4702 may be mounted in the bottom case 4701, and may be fixed by means of a snap-fit or screw connection.

The anti-pry switch may be assembled as follows:
1) First placing the spring 4704 at the bottom of the spring tube 47611;
2) Inserting the core rod body 4707 from the top of the sleeve portion 4706, the two constitute a component A;
3) Inserting the component A from the bottom of the spring limiting lid 4705;
4) Inserting the post of the spring limit lid 4705 into the bayonet of the spring tube 4711 to obtain a component B;
5) Installing the PCB board 4702 in the bottom case 4701, then inserting the component B into a hole on the PCB board 4702 to make the spring tube 4703 match the PCB board 4702, and finally installing the top cover 4708 to complete the assembling.

In addition to this, an intelligent lock may be disclosed in the present disclosure. The intelligent lock may be provided with an anti-pry switch, and the anti-pry switch may be the anti-pry switch disclosed in any embodiments of the present disclosure.

The intelligent lock provided with the above-mentioned anti-pry switch may have the corresponding technical advantages of the anti-pry switch, and those skilled in the art may refer to each other, and no further description is provided herein.

The various embodiments in the present specification are described in a progressive manner, and each embodiment focuses on differences from other embodiments, and the same similar parts between the various embodiments may be referred to each other.

The description of the disclosed embodiments enables those skilled in the art to make or use the present disclosure. Various modifications to these embodiments are obvious to those skilled in the art, and the general principles defined herein may be implemented in other embodiments without departing from the spirit or scope of the present disclosure.

Therefore, the present disclosure will not be limited to the embodiments shown herein, but the broadest scope consistent with the principles and novel features disclosed herein.

The embodiments of the present disclosure provide a method for controlling an electronic device. The method may be implemented on a first electronic device which is connected to a second electronic device. The method may include one or more of the following opertaions. The first electronic device may display a control page of the second electronic device, page data of the control page may be transmitted by a web server to the first electronic device. The first electronic device may perform a preset instruction corresponding to an operation object to control the second electronic device based on an operation generated by a user on the operation object of the control page.

In some embodiments, the first electronic device performs a preset instruction corresponding to an operation object to control the second electronic device based on an operation generated by a user on the operation object of the control page may include one or more of the following operations. The first electronic device may execute a preset call instruction corresponding to the operation object based on the operation generated by the user on the operation object of the control page to invoke at least one control program in a preset controlling program library to control the second electronic device. The preset controlling program library may be stored in the first electronic device.

In some embodiments, the method may further include one or more of the following operations. The first electronic device may send an access request to the web server to access the control page of the second electronic device. The first electronic device may obtain the page data of the control page transmitted by the web server. The first electronic device displays the control page of the second electronic device may include one or more of the following operations. The first electronic device may display the control page of the second electronic device based on the obtained page data.

In some embodiments, the access request may at least include user identification information of the user of the first electronic device. The page data obtained by the first electronic device may be transmitted by the web server after the user identification information is approved.

In some embodiments, the first electronic device may encrypt at least one type of data transmitted during the controlling process of the second electronic device using the preset controlling program library.

In some embodiments, the first electronic device executes a preset call instruction corresponding to the operation object based on the operation generated by the user on the operation object of the control page to invoke at least one control program in a preset controlling program library to control the second electronic device may include one or more of the following operations. The first electronic device may execute the preset call instruction corresponding to the operation object based on the operation generated by the user on the operation object of the control page to invoke at least one interface of the preset controlling program library to invoke the control program corresponding to the at least one interface to generate a control message. The first electronic device may encrypt the control message using the preset controlling program library, and send the encrypted control message to the second electronic device to control the second electronic device.

In some embodiments, the preset instruction corresponding to the operation object may be an electronic device control flow instruction corresponding to the operation object.

The embodiments of the present disclosure provide a method for controlling an electronic device. The method may be implemented on a web server which connected with a first electronic device, the first electronic device is further connected with a second electronic device. The method may include one or more of the following operations. The web server may obtain an access request of a control page of the second electronic device sent by the first electronic device. The web server may transmit page data of the control page to the first electronic device to cause the first electronic device to display the control page of the second electronic device, and further cause the first electronic device to execute a control flow instruction corresponding to at least one operation object to control the second electronic device. In some embodiments, the first electronic device may execute the control flow instruction based on an operation generated by a user on the operation object of the control page. The page data may include at least one operation object and at least one electronic device control flow instruction corresponding to the at least one operation object.

The embodiments of the present disclosure provide an electronic device. The electronic device may be designated as the first electronic device. The first electronic device may be in communication with a second electronic device. The first electronic device may include a page displaying unit, and a controlling unit. The displaying unit may be configured to display a control page of a second electronic device, page data of the control page may be transmitted by a web server to the first electronic device. The controlling unit may be configured to perform the preset instruction corresponding to the operation object to control the second electronic device based on an operation generated by a user on the operation object of the control page.

In some embodiments, the controlling unit may further be configured to execute a preset call instruction corresponding to the operation object based on the operation generated by the user on the operation object of the control page to invoke at least one control program in a preset controlling program library to control the second electronic device. The preset controlling program library may be stored in the first electronic device.

In some embodiments, the electronic device may further include a request transmitting unit and a data obtaining unit. The request transmitting unit may be configured to send an access request to the web server to access the control page of the second electronic device before the page displaying unit displays the control page of the second electronic device. The data obtaining unit may be configured to obtain the page data of the control page transmitted by the web server.

The embodiments of the present disclosure provide a web server. The electronic device may be designated as the first electronic device. The web server may be connected with a first electronic device, the first electronic device may be further connected with a second electronic device. The web server may include a request obtaining unit, and a data transmitting unit. The may be configured to obtain an access request of a control page of the second electronic device sent by the first electronic device. The data transmitting unit may be configured to transmit page data of the control page to the first electronic device to cause the first electronic device to display the control page of the second electronic device, and further cause the first electronic device to execute a control flow instruction corresponding to at least one operation object to control the second electronic device. The first electronic device may execute the control flow instruction based on an operation generated by a user on the operation object of the control page. The page data may include at least one operation object and at least one electronic device control flow instruction corresponding to the at least one operation object.

The embodiments of the present disclosure provide a method for configuring an electronic device. The method may include one or more of the following operations: transmitting device information of a gateway to a server; obtaining configuration information sent by the server, the configuration information may include information of a first communication protocol to be configured by the gateway and information of a first cloud platform to be configured by the gateway; determining a first communication protocol component corresponding to the first communication protocol information; connecting to the first cloud platform by using the first communication protocol component.

In some embodiments, the method may further include one or more of the following operations: obtaining configuration update information from the server, the configuration update information may include information of a second communication protocol to be updated by the gateway, and information of a second cloud platform to be updated by the gateway; determining a second communication protocol component corresponding to the second communication protocol information; connecting to the second cloud platform by using the second communication protocol component;

The embodiments of the present disclosure provide a method for configuring an electronic device. The method may include one or more of the following operations: obtaining device information transmitted by the gateway; determining configuration information corresponding to the gateway, the configuration information may include information of a communication protocol to be configured by the gateway and information of a cloud platform to be configured by the gateway; transmitting the configuration information to the gateway to cause the gateway to determine a first communication protocol component corresponding to the information of the first communication protocol, and further connect the first cloud platform using the first communication protocol component.

In some embodiments, the method may further include one or more of the following operations: monitoring the number of disconnections between the first communication protocol component and the first cloud platform in a preset time period; If the number of disconnections exceeds a preset threshold, transmitting the configuration update information to the gateway to cause the gateway to determine the second communication protocol component corresponding to the information of the second communication protocol, and further connect the second cloud platform using the second communication protocol component. The configuration update information may include the information of the second communication protocol to be updated by the gateway and the information of the second cloud platform to be updated by the gateway.

In some embodiments, the obtaining device information transmitted by the gateway may include one or more of the following operations: obtaining at least one of information related to a product serial number, information related to a version number, or information related to a model transmitted by the gateway.

In some embodiments, the determining configuration information corresponding to the gateway may include one or more of the following operations: determining the configuration information corresponding to the device information of the gateway based on the information related to the product serial number.

The embodiments of the present disclosure provide an apparatus for configuring an electronic device. The apparatus may include a transmitting unit, an obtaining unit, a component determination unit, and a communication unit. The transmitting unit may be configured to transmit device information of a gateway to a server. The obtaining unit may be configured to obtain the configuration information transmitted by the server. The configuration information may include information of a first communication protocol to be configured by the gateway, and information of a first cloud platform to be configured by the gateway. The component determination unit may be configured to determine the first communication protocol component corresponding to the information of the first communication protocol. The communication unit may be configured to connect to the first cloud platform using the first communication protocol component.

The embodiments of the present disclosure provide an apparatus for configuring an electronic device. The apparatus may include an obtaining unit, a configuration information determination unit, and a transmitting unit. The obtaining unit may be configured to obtain the device information transmitted by the gateway. The configuration information determination unit may be configured to determine the configuration information corresponding to the device information of the gateway. The configuration information may include information of a communication protocol to be configured by the gateway and information of a cloud platform to be configured by the gateway. The transmitting unit may be configured to transmit the configuration information to the gateway to cause the gateway determines a first communication protocol component corresponding to the information of the first communication protocol, and further connect the first cloud platform using the first communication protocol component.

The embodiments of the present disclosure provide a storage medium which stores one or more programs. A method described above for configuring an electronic device may be implemented when the programs are executed by a processor.

The embodiments of the present disclosure provide an electronic device including a storage for storing program(s) and a processor for executing the program(s). A method described above for configuring an electronic device may be implemented when the programs are executed by a processor.

The embodiments of the present disclosure provide a method for verifying a firmware version. The method may be implemented on a server. The method may include one or more of the following operations: determining a firmware to be upgraded and generating at least one public-private key pair, the public-private key pair may include a public key stored in the firmware to be upgraded and a private key stored in the server, private keys belong two or more different public-private key pairs may be stored in the server, respectively; obtaining a digest of an upgrade version of the firmware to be upgraded; labeling the digest successively based on the private key(s) of at least one public-private key pair; transmitting information of a firmware upgrade package to an electronic device to cause the electronic device to verify the upgrade version of the firmware to be upgraded based on the information of the firmware upgrade package and the public key of the at least one public-private key pair, the information of the firmware upgrade package information may include data of the upgrade version of the firmware to be upgraded, the digest, and the label of the digest.

In some embodiments, the method may further include one or more of the following operations: generating at least one new public-private key pair corresponding to the at least one private key being abnormal, the number of the new generated public-private key pairs may be the same as the number of private keys being abnormal; replacing the at least one private key being abnormal stored in the server with a private key included in the generated at least one new public-private key pair, and replacing the at least one public key corresponding to the at least one private key being abnormal with he public key in the new generated at least one new public-private key pair through a firmware upgrade.

The embodiments of the present disclosure provide a method for verifying a firmware version. The method may be implemented on an electronic device. The method may include one or more of the following operations: obtaining information of a firmware upgrade package from a server, the information of the firmware upgrade package may include data of an upgrade version of a firmware to be upgraded, a digest of the upgrade version of the firmware to be upgraded, the digest being labelled by a private key of at least one public-private key pair, and a label of the digest; obtaining data of the upgrade version of the firmware to be upgraded, the digest, and the label of the digest, and verifying the upgrade version of the firmware to be upgraded based public key of the at least one public-private key pair and the label.

In some embodiments, the verifying the upgrade version of the firmware to be upgraded based public key of the at least one public-private key pair and the label may include one or more of the following operations: verifying the upgrade version of the firmware to be upgraded using the public key and the label when there is one public-private key pair; verifying the validity of the digest using the public keys in the public-private key pairs and label when there are two or more public-private key pairs, and verifying the validity of the upgrade version of firmware to be upgraded in response to a determination that the digest is valid.

In some embodiments, the verifying the validity of the digest using the public keys in the public-private key pairs and label when there are two or more public-private key pairs may include one or more of the following operations: verifying two or more public keys in the two or more public-private key pairs, the digest, and two or more labels using an algorithm; determining the digest as validity in response to a determination that the verification is passed.

In some embodiments, the verifying the upgrade version of the firmware to be upgraded based public key of the at least one public-private key pair and the label may include one or more of the following operations: determine whether the accuracy of the upgrade version of the firmware to be upgraded is not less than a first threshold using public keys in two or more public-private key pairs and the label; determining the verification for the upgrade version of the firmware to be upgraded as successful in response to that the accuracy is not less than the first threshold In some embodiments, the labelling the digest when there are two or more public-private key pairs may include one or more of the following operations: verifying the upgrade version of firmware using all normal private keys and of a predetermined number abnormal private keys when a first ratio of the number of the normal private keys in the two or more public-private key pairs to the total number of the private keys in the two or more public-private key pairs is not less than a second threshold, the second threshold may be less than the first threshold, a ratio of the sum of the predetermined number and the number of normal private keys to the total number of private keys may be the same as the first threshold.

The embodiments of the present disclosure provide a server. The server may include a determining unit, an obtaining unit, a labeling unit, and a transmitting unit. The determination unit may be configured to determine a firmware to be upgraded, and generate at least one public-private key pair, the public-private key pair may include a public key stored in the firmware to be upgraded and a private key stored in a server, private keys belong two or more different public-private key pairs may be stored in the server, respectively. The obtaining unit may be configured to obtain a digest of an upgrade version of the firmware to be upgraded. The labeling unit may be configured to label the digest based on the private key(s) of the at least one public-private key pair. The transmitting unit may be configured to transmit information of a firmware upgrade package to an electronic device to cause the electronic device to verify the upgrade version of the firmware to be upgraded based on the information of the firmware upgrade package and the public key of the at least one public-private key pair.

In some embodiments, the server may further include a key updating unit. The key updating unit may be configured to generate at least one new public-private key pair corresponding to the at least one private key being abnormal, the number of the new generated public-private key pairs may be the same as the number of private keys being abnormal. The key updating unit may further be configured to replace the at least one private key being abnormal stored in the server with a private key included in the generated at least one new public-private key pair, and replace the at least one public key corresponding to the at least one private key being abnormal with he public key in the new generated at least one new public-private key pair through a firmware upgrade.

The embodiments of the present disclosure provide an electronic device. The electronic device may include an obtaining unit, and a verification unit. The obtaining unit may be configured to obtain information of a firmware upgrade package from a server, the information of the firmware upgrade package may include data of an upgrade version of a firmware to be upgraded, a digest of the upgrade version of the firmware to be upgraded, the digest being labeled by a private key of at least one public-private key pair, and a label of the digest. The public-private key pair may include a public key stored in the firmware to be upgraded and a private key stored in a server, private keys belong two or more different public-private key pairs may be stored in the server, respectively. The verification unit may be configured to obtain the data of the upgrade version of the firmware to be upgraded, the digest, and the label of the digest, and verify the upgrade version of the firmware to be upgraded based on the public key of the at least one public-private key pair and the label.

In some embodiments, the verification unit may further be configured to verify the upgrade version of the firmware to be upgraded using the public key and the label when there is one public-private key pair. The verification unit may further be configured to verify the validity of the digest using the public keys in the public-private key pairs and label when there are two or more public-private key pairs, and verify the validity of the upgrade version of firmware to be upgraded in response to a determination that the digest is valid.

In some embodiments, the verification unit may further be configured to verify two or more public keys in the two or more public-private key pairs, the digest, and two or more labels using an algorithm, and determine the digest as validity in response to a determination that the verification is passed.

In some embodiments, the obtaining unit may further be configured to verify the upgrade version of firmware using all normal private keys and of a predetermined number abnormal private keys when a first ratio of the number of the normal private keys in the two or more public-private key pairs to the total number of the private keys in the two or more public-private key pairs is not less than a second threshold. The second threshold may be less than the first threshold, a ratio of the sum of the predetermined number and the number of normal private keys to the total number of private keys may be the same as the first threshold.

The embodiments of the present disclosure provide a system for verifying a firmware version. The system may include a server and an electronic device. The server may include a determining unit, an obtaining unit, a labeling unit, and a transmitting unit. The determination unit may be configured to determine a firmware to be upgraded, and generate at least one public-private key pair, the public-private key pair may include a public key stored in the firmware to be upgraded and a private key stored in a server, private keys belong two or more different public-private key pairs may be stored in the server, respectively. The obtaining unit may be configured to obtain a digest of an upgrade version of the firmware to be upgraded. The labeling unit may be configured to label the digest based on the private key(s) of the at least one public-private key pair. The transmitting unit may be configured to transmit information of a firmware upgrade package to an electronic device to cause the electronic device to verify the upgrade version of the firmware to be upgraded based on the information of the firmware upgrade package and the public key of the at least one public-private key pair. The electronic device may include an obtaining unit, and a verification unit. The obtaining unit may be configured to obtain information of a firmware upgrade package from a server, the information of the firmware upgrade package may include data of an upgrade version of a firmware to be upgraded, a digest of the upgrade version of the firmware to be upgraded, the digest being labeled by a private key of at least one public-private key pair, and a label of the digest. The public-private key pair may include a public key stored in the firmware to be upgraded and a private key stored in a server, private keys belong two or more different public-private key pairs may be stored in the server, respectively. The verification unit may be configured to obtain the data of the upgrade version of the firmware to be upgraded, the digest, and the label of the digest, and verify the upgrade version of the firmware to be upgraded based on the public key of the at least one public-private key pair and the label.

The embodiments of the present disclosure provide an anti-pry device of intelligent lock. The anti-pry device may include a front assembly installed on the outside of a door and a rear assembly installed on the inside of the door. The front assembly may include an acceleration sensor configured to collect an acceleration of the front assembly after a first preset time since the door is closed. The rear assembly may include a processor and an alertor. The processor may be connected to the acceleration and the alertor. The processor may be configured to determine whether the intelligent lock is being pried according to the acceleration of the front assembly, and trigger the alertor to raise an alarm in response to a determination that the intelligent lock is being pried.

In some embodiments, the anti-pry device may further include a connection line set between the processor and the front assembly. The processor may be further configured to detect whether the connecting line is disconnected, and trigger the alertor to raise an alarm in response to the determination that the connection line is disconnected.

In some embodiments, the anti-pry device may further include a damping apparatus mounted between the door and the front assembly.

In some embodiments, the anti-pry device may further include a power supply mounted in the rear assembly. The power supply may be connected to the acceleration sensor, the processor, and the alertor.

The embodiments of the present disclosure provide a method of anti-prying of an intelligent lock. The method may include one or more of the following operations: activating an acceleration sensor after detecting that the door is closed, and acquiring a real-time acceleration of the front assembly captured by the acceleration sensor; determining whether the intelligent lock is being pried based on the acceleration; in response to the determination that the intelligent lock is being pried, transmitting an alarm signal to an alertor to trigger the alertor to raise an alarm.

In some embodiments, the method may further include one or more of the following operations: detecting whether the connection line arranged between the front assembly and the rear assembly is disconnected; in response to a determination that the connecting line is disconnected, transmitting an alarm signal to an alertor to trigger the alertor to raise an alarm. The rear assembly may be mounted inside the door.

In some embodiments, the activating an acceleration sensor after detecting that the door is closed may include one or more of the following operations: activating the acceleration sensor after a first preset time after detecting the door is closed.

In some embodiments, the determining whether the intelligent lock is being pried based on the acceleration may include one or more of the following operations: determining whether the real-time acceleration of the front assembly is continuously greater than a preset value in a second preset time; In response to a determination that the real-time acceleration of the front assembly is continuously greater than a preset value in the second preset time, generating a determination that the intelligent lock is being pried.

The embodiments of the present disclosure provide a processor. The processor may include an acceleration obtaining unit, and a determination unit. The acceleration obtaining unit may be configured to activate an acceleration sensor after detecting that the door is closed, and acquire a real-time acceleration of the front assembly captured by the acceleration sensor. The front assembly may be mounted outside of the door. The determination unit may be configured to determine whether the intelligent lock is being pried according to the real-time acceleration of the front assembly, and transmit an alarm signal to an alertor to trigger the alertor to raise an alarm in response to a determination that the intelligent lock is being pried.

In some embodiments, the processor may further include a detection unit. The detection unit may be configured to detect whether the connection line arranged between the front assembly and the rear assembly is disconnected, and transmit an alarm signal to an alertor to trigger the alertor to raise an alarm in response to a determination that the connection line arranged between the front assembly and the rear assembly is disconnected.

In some embodiments, the determination unit may further be configured to determine whether the real-time acceleration of the front assembly is continuously greater than a preset value in a second preset time, and determine that the intelligent lock is being pried in response to a determination that the real-time acceleration of the front assembly is continuously greater than a preset value in the second preset time.

The embodiments of the present disclosure provide a method of unlocking an intelligent lock. The method may include one or more of the following operations: obtaining an indoor temperature from a temperature sensor, the temperature sensor may be mounted inner side the intelligent lock; determining whether the indoor temperature is greater than or equal to a temperature threshold; in response to a determination that the indoor temperature is greater than or equal to the temperature threshold, automatically unlocking the intelligent lock.

In some embodiments, the determining whether the indoor temperature is greater than or equal to a temperature threshold may include one or more of the following operations: determining whether the indoor temperature obtained from the temperature sensor within a preset time period is wrong; in response to a determination that the indoor temperature obtained by the temperature sensor within a preset time period is correct, determining whether an average value of the indoor temperature obtained by the temperature sensor in the preset time period is greater than or equal to the temperature threshold.

In some embodiments, the determining whether the indoor temperature obtained from the temperature sensor within a preset time period is wrong may include one or more of the following operations: determining whether a difference between the highest indoor temperature and the lowest indoor temperature obtained by the temperature sensor in the preset time period is within a preset difference threshold range; In response to a determination that the difference is within the preset difference threshold range, determining that the indoor temperature obtained by the temperature sensor within a preset time period is correct; or determining whether a difference of any two a first indoor temperature at a start time point of the preset time period, a second indoor temperature at a middle time point of the preset time period, and a third indoor temperature at an end time point of the preset time period obtained by the temperature sensor is within the preset difference threshold range; in response to a determination that the difference is within the preset difference threshold range, determining that the indoor temperature obtained by the temperature sensor within a preset time period is corrector determining whether a first difference between an indoor temperature obtained at an end of the preset time period and an indoor temperature obtained at an end of a prior time period by the temperature sensor is within the preset difference threshold range, and a second difference between the indoor temperature obtained at the end of the preset time period and an indoor temperature obtained at an end of a later time period by the temperature sensor is within the preset difference threshold range; in response to a determination that the first difference and the second difference are within the preset difference threshold range, determining that the indoor temperature obtained by the temperature sensor within a preset time period is correct.

In some embodiments, the automatically unlocking the intelligent lock may include one or more of the following operations: transmitting an unlocking command to the intelligent lock to cause the intelligent lock to retract a spring bolt.

In some embodiments, the method may further include: sending out alarm information. The alarm information may include voice information, or visible information.

In some embodiments, the method may further include: establishing a communication with a fire alarm platform in advance; and transmitting fire alarm information to the fire alarm platform. The fire alarm information may be in the form of a telephone call, or a short message.

In some embodiments, the method may further include: establishing a communication with a user terminal in advance; and transmitting a first notification that the intelligent lock has sent out fire alarm information to the user terminal.

In some embodiments, the method may further include: establishing a communication with a user terminal in advance; and transmitting a second notification that the intelligent lock has been unlocked to the user terminal.

In some embodiments, the method may further include: displaying the indoor temperature obtained by the temperature sensor on the intelligent lock.

The embodiments of the present disclosure provide an intelligent lock. The intelligent lock may include one or more a temperature sensor and a controller. The temperature sensor may be configured to obtain an indoor temperature from a temperature sensor, the temperature sensor may be mounted inner side the intelligent lock. The controller may be configured to access the indoor temperature and determine whether the indoor temperature is greater than or equal to a temperature threshold. In response to a determination that the indoor temperature is greater than or equal to the temperature threshold, the controller may be configured to automatically unlocking the intelligent lock.

The embodiments of the present disclosure provide a door. The door may include an intelligent lock described above.

The embodiments of the present disclosure provide a method of adjusting a volume. The method may include one or more of the following operations: obtaining a current time; determining a preset volume control rule matched with the current time; determining whether the output volume corresponding to the current time is the fixed preset volume; in response to a determination that the output volume corresponding to the current time is the fixed preset volume, outputting a volume based on the fixed preset volume; in response to a determination that the output volume corresponding to the current time is not the fixed preset volume, outputting a volume based on the noise data of the current surroundings.

In some embodiments, the outputting a volume based on the noise data of the current surroundings may include one or more of the following operations: determining a first effective time corresponding to an adaptive volume based on the preset volume control rule; determining a value of the noise data if a preset data collection condition is satisfied; determining a time adjustment parameter corresponding to the current time, the time adjustment parameter may be used to determine a proportional relationship of the output volume of the electronic device to the value of the noise data; and determining the output volume of an electronic device based on the value of the noise data and the time adjustment parameter, and outputting the volume in the first effective time.

In some embodiments, the determining a value of the noise data if a preset data collection condition is satisfied may include one or more of the following operations: obtaining a plurality of initial noise values in a manner of data acquisition at a fixed interval, or after receiving a preset wake-up command; determining a maximum value, a minimum value, and an average value among the initial noise values; and determining a greater value of a difference between the maximum value and the minimum value and the average value as the value of the noise data.

In some embodiments, the determining the output volume of an electronic device based on the value of the noise data and the time adjustment parameter may include one or more of the following operations: determining a product of the value of the noise data and the time adjustment parameter as an initial value of the output volume; determining a preset volume level that is closest to the initial value of the output volume from the plurality of preset volume levels; designating the preset volume level as the output volume In some embodiments, the outputting a volume based on the fixed preset volume may include one or more of the following operations: determining a second effective time corresponding to the fixed preset volume based on the preset volume control rule; and outputting the fixed preset volume within the second effective time.

In some embodiments, the process for determining the preset volume control rule may include: determining the preset volume control rule by a user pressing a volume key; or obtaining the preset volume control rule from a remote control device.

The embodiments of the present disclosure provide a device for adjusting volume. The device may include a time acquisition module, a rule obtaining module, a volume determination module, a first volume outputting module, and a second volume outputting module. The time acquisition module may be configured to obtain the current time. The rule obtaining module may be configured to determine the preset volume control rule matched with the current time. The volume determination module may be configured to determine whether the output volume corresponding to the current time is the fixed preset volume based on the preset volume control rule. The first volume outputting module may be configured to output the volume output based on the fixed preset volume. The second volume outputting module may be configured to output the volume based on the noise data of the current surroundings.

In some embodiments, the second volume outputting module may include a first time determination sub-module, a first data determination sub-module, a second data determination sub-module, and a first volume output sub-module. The first time determination sub-module may be configured to determine the first effective time corresponding to the adaptive volume based on the preset volume control rule. The first data determination sub-module may be configured to determine the value of the noise data if the preset data collection condition is satisfied. The second data determination sub-module may be configured to determine the time adjustment parameter corresponding to the current time. The time adjustment parameter may be used to determine the proportional relationship of the output volume of the electronic device 120 to the value of the noise data. The first volume output sub-module may be configured to determine the output volume of the electronic device 120 based on the value of the noise data and the time adjustment parameter, and output the volume in the first effective time.

The embodiments of the present disclosure provide a storage medium which stores one or more programs. A method described above for adjusting a volume may be implemented when the programs are executed.

The embodiments of the present disclosure provide a processor for executing program(s). A method described above for adjusting a volume may be implemented when the programs are executed by the processor.

The embodiments of the present disclosure provide a method of determining an association between an abnormality of the intelligent lock and a target environmental parameter. The method may include one or more of the following operations: determining whether the intelligent lock is abnormal; in response to a determination that the intelligent lock is abnormal, obtaining at least one target environmental parameter of a current surroundings of the intelligent lock, and determining whether the abnormality of the intelligent lock is caused by the at least one target environmental parameter; in response to a determination that the abnormality of the intelligent lock is caused by the at least one target environmental parameter, reminding a user that the abnormality of the intelligent lock is caused by the at least one target environmental parameter.

In some embodiments, the intelligent lock may include a fingerprint recognition component. The determining whether the intelligent lock is abnormal may include one or more of the following operations: determining whether a fingerprint recognition rate of the intelligent lock is lower than a fingerprint recognition rate; in response to a determination that the fingerprint recognition rate is lower than the recognition rate threshold, determining that the intelligent lock is abnormal; in response to a determination that the fingerprint recognition rate is greater than or equal to the recognition rate threshold, determining that the intelligent lock is normal.

In some embodiments, the obtaining at least one target environmental parameter of a current surroundings of the intelligent lock, and determining whether the abnormality of the intelligent lock is caused by the at least one target environmental parameter may include one or more of the following operations: in response to a determination that the fingerprint recognition rate is lower than the recognition rate threshold, obtaining humidity of the current surroundings of the intelligent lock; determining whether a difference between the humidity of the current surroundings of the intelligent lock and the humidity of a surroundings of the intelligent lock when the fingerprint is entered is greater than a difference threshold; in response to a determination that the difference is greater than the difference threshold, determining that the humidity of the current surroundings of the intelligent lock causes the abnormality that the fingerprint recognition rate is lower than the recognition rate threshold; in response to a determination that the difference is not greater than the difference threshold, determining that the abnormality that the fingerprint recognition rate is lower than the recognition rate threshold is not caused by the humidity of the current surroundings of the intelligent lock.

In some embodiments, the reminding a user that the abnormality of the intelligent lock is caused by the at least one target environmental parameter may include one or more of the following operations: reminding the user to re-enter the unlocking fingerprint.

In some embodiments, the intelligent lock may include a display. The determining whether the intelligent lock is abnormal may include one or more of the following operations: determining whether the display works properly; in response to a determination that the display works properly, determining that the intelligent lock is normal; in response to a determination that the display does not work properly, determining that the intelligent lock is abnormal.

In some embodiments, the obtaining at least one target environmental parameter of a current surroundings of the intelligent lock, and determining whether the abnormality of the intelligent lock is caused by the at least one target environmental parameter may include one or more of the following operations: in response to a determination that the display does not work properly, obtaining a temperature of the current surroundings of the intelligent lock; determining whether the temperature of the current surroundings of the intelligent lock falls outside the operating temperature range of the display; in response to a determination that the temperature of the current surroundings of the intelligent lock falls outside the operating temperature range of the display, determining that the temperature of the current surroundings of the intelligent lock causes the abnormality that the display do not work properly; recognition rate is lower than the recognition rate threshold; in response to a determination that the temperature of the current surroundings of the intelligent lock falls into the operating temperature range of the display, determining that the abnormality that the display do not work properly is not caused by the temperature of the current surroundings of the intelligent lock.

In some embodiments, the method may further include one or more of the following operations: obtaining at least one environmental parameter of a current surroundings of the intelligent lock, and uploading the at least one environmental parameter to a server to cause a mobile intelligent terminal bound to the intelligent lock to obtain and display the at least one environmental parameter; determining whether the environment parameter is abnormal; in response to a determination that the environment parameter is abnormal, reminding the user that the environment parameter is abnormal.

In some embodiments, the intelligent lock may include a display. The method may further include: displaying the environmental parameter on the display.

The embodiments of the present disclosure provide an apparatus for determining an association between an abnormality of the intelligent lock and a target environmental parameter. The apparatus may include an abnormality detection module, an abnormality determination module, and a reminding module. The abnormality detection module may be configured to determine whether the intelligent lock is abnormal. The abnormality determining module may be configured to obtain the target environmental parameter of the surroundings of the intelligent lock that is abnormal, and determine whether the abnormality of the intelligent lock is caused by the target environmental parameter. The reminding module may be configured to remind the user that the abnormality of the intelligent lock is related to the target environmental parameter after determining the abnormality of the intelligent lock is caused by the target environmental parameter.

In some embodiments, the apparatus may further include an obtaining module, an uploading module, a parameter determination module, and a notification module. The obtaining module may be configured to obtain an environment parameter of the current surroundings of the intelligent lock. The uploading module may be configured to upload the environment parameter to the server to cause a mobile intelligent terminal bound to the intelligent lock to obtain and display the at least one environmental parameter. The parameter determination module may be configured to determine whether the environmental parameter is abnormal. The notification module may be configured to remind the user that the environment parameter of the current surroundings of the intelligent lock is abnormal.

The embodiments of the present disclosure provide an anti-pry switch. The anti-switch may include one or more of the following components: an annular capacitor with a through-hole in the middle; a core rod inserted into the through hole, being divided into a first segment and a second segment having unequal dielectric constants along an axial direction thereof, a capacitance value of the annular capacitor is a first capacitance value after the first segment being inserted into the through-hole, and the capacitance value of the annular capacitor is a second capacitance value after the second segment being inserted into the through-hole, the first capacitance value differs from the second capacitance value; a hold-down assembly, for contacting a first end of the core rod; and a spring assembly, for contacting a second end of the core rod, after the first end of the core rod is squeezed with the hold-down assembly, the first segment of the core rod is inserted through the through-hole, and after the hold-down assembly is away from the first end of the core rod, the second segment of the core rod is inserted through the through-hole.

In some embodiments, the spring assembly may include a spring tube, a spring, and a spring limiting lid. The spring tube has a cylindrical shape with an open top. The spring is embedded in the inner cavity of the spring tube. The spring limiting lid is provided with a hole for the core rod to pass through. The spring limiting lid is fixedly disposed at the top end of the spring tube to prevent the spring from coming out of the spring tube.

In the embodiment, the top end of the side wall of the spring tube has a flared portion. The top end of the side wall of the spring tube is provided with a bayonet. The spring limiting lid is provided with a post corresponding to the bayonet, and the spring limiting lid is embedded in the flared portion and is connected to the bayonet by the post.

In some embodiments, the spring tube has two bayonets. The two bayonets are symmetrically set. The outer wall of the spring limiting lid is radially provided with two posts corresponding to the bayonet.

In some embodiments, the core rod may include a rod body made with a metal material and a plastic rod sleeve. The plastic rod sleeve may include a sleeve portion and an end portion. The sleeve portion may have an open end at one end and a closed end at the other end. The end portion may be coupled to the closed end, and the core rod body may be inserted into the sleeve portion 4706 from the open end. The sleeve portion and the core rod body which are integrally formed constitute the first segment, and the end portion may constitute the second segment.

In some embodiments, the diameter of the sleeve portion may not be greater than the diameter of through-hole of the annular capacitor. The diameter of the end portion may be greater than the diameter of the through-hole of the anonymous capacitor. The end portion may constitute the second end of the core rod.

In some embodiments, the anti-pry switch may include a bottom case and a top cover. The bottom end of the spring tube may be fixedly disposed in the bottom case. The top cover may be fixedly disposed at the top end of the bottom case. The top cover may be provided with a hole. The first end of the core rod may traverse the top cover through the hole.

In some embodiments, the annular capacitor may be an annular capacitor integrated on the PCB board.

In some embodiments, if the first end of the core rod changes from a compressed state to a relaxed state, when the second segment of the core rod inserts into the through-hole, the core rod may have moved at least 6 mm.

The embodiments of the present disclosure provide an intelligent lock. The intelligent lock may include an anti-prying switch described above.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object to be recognized oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local part network (LAN) or a wide part network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A method implemented on at least one electronic device, each of which has at least one processor and a storage for operating the electronic device, the method comprising:
    obtaining sensing data that includes sensing data of the electronic device and/or sensing data of a surrounding of the electronic device, wherein the sensing data further includes noise data of a current surrounding of the electronic device;
    determining whether the sensing data satisfies a preset condition;
    in response to a determination that the sensing data satisfies the preset condition, controlling the electronic device to execute a preset operation;
    obtaining a current time;
    determining a preset volume control rule matched with the current time;
    determining, based on the preset volume control rule, whether an output volume corresponding to the current time is a fixed preset volume;
    in response to a determination that the output volume corresponding to the current time is the fixed preset volume, outputting a volume based on the fixed preset volume; and
    in response to a determination that the output volume corresponding to the current time is not the fixed preset volume, outputting an adaptive volume based on the noise data.

2. The method of claim 1, wherein
the obtaining sensing data comprises:
    obtaining a real-time acceleration of the electronic device from at least one sensor;
    the determining whether the sensing data satisfies a preset condition comprises:
        determining whether the electronic device is being pried based on the real-time acceleration; and
    the controlling the electronic device to execute a preset operation comprises:
        in response to a determination that the electronic device is being pried, transmitting an alarm signal to an alertor to trigger the alertor to raise an alarm.

3. The method of claim 1, wherein the electronic device includes an intelligent lock, the obtaining sensing data comprises:
    obtaining an indoor temperature from at least one sensor;
    the determining whether the sensing data satisfies a preset condition comprises:
        determining whether the indoor temperature is greater than or equal to a temperature threshold; and
    the controlling the electronic device to execute a preset operation comprises:
        in response to a determination that the indoor temperature is greater than or equal to a temperature threshold, unlocking the intelligent lock.

4. The method of claim 1, wherein the method further comprises:
    determining whether the electronic device is abnormal;
    the obtaining sensing data comprises:
        in response to a determination that the electronic device is abnormal, obtaining at least one target environmental parameter of a current surrounding of the electronic device, wherein the at least one target environmental parameter is related to the abnormality of the electronic device;
    the determining whether the sensing data satisfies a preset condition comprises:
        determining whether an abnormality of the electronic device is caused by the at least one target environmental parameter; and
    the controlling the electronic device to execute a preset operation comprises:
        in response to a determination that the abnormality of the electronic device is caused by the at least one target environmental parameter, reminding a user that the abnormality of the electronic device is related to the at least one target environmental parameter.

5. A system, comprising:
    at least one storage medium including a set of instructions for operating an electronic device; and
    at least one processor in communication with the at least one storage medium, wherein when executing the instructions, the at least one processor is configured to direct the system to perform operations including:
        obtaining sensing data that includes sensing data of the electronic device and/or sensing data of a surrounding of the electronic device, wherein the sensing data further includes noise data of a current surrounding of the electronic device;
        determining whether the sensing data satisfies a preset condition;
        in response to a determination that the sensing data satisfies the preset condition, controlling the electronic device to execute a preset operation;
        obtaining a current time;
        determining a preset volume control rule matched with the current time;
        determining, based on the preset volume control rule, whether an output volume corresponding to the current time is a fixed preset volume;
        in response to a determination that the output volume corresponding to the current time is the fixed preset volume, outputting a volume based on the fixed preset volume; and
        in response to a determination that the output volume corresponding to the in response to a determination that the output volume corresponding to the current time is not the fixed preset volume, outputting an adaptive volume based on the noise data.

6. The system of claim 5, wherein to obtain the sensing data, the at least one processor is further configured to direct the system to perform additional operations including:

obtaining a real-time acceleration of the electronic device from at least one sensor;

to determine whether the sensing data satisfies a preset condition, the at least one processor is further configured to direct the system to perform additional operations including:

determining whether the electronic device is being pried based on the real-time acceleration; and to control the electronic device to execute a preset operation, the at least one processor is further configured to direct the system to perform additional operations including:

in response to a determination that the electronic device is being pried, transmitting an alarm signal to an alertor to trigger the alertor to raise an alarm.

7. The system of claim 5, wherein the electronic device includes an intelligent lock, and to obtain the sensing data, the at least one processor is further configured to direct the system to perform additional operations including:

obtaining an indoor temperature from at least one sensor;

to determine whether the sensing data satisfies a preset condition, the at least one processor is further configured to direct the system to perform additional operations including:

determining whether the indoor temperature is greater than or equal to a temperature threshold; and to control the electronic device to execute a preset operation, the at least one processor is further configured to direct the system to perform additional operations including:

in response to a determination that the indoor temperature is greater than or equal to a temperature threshold, unlocking the intelligent lock.

8. The system of claim 5, wherein the at least one processor is further configured to direct the system to perform additional operations including:

determining whether the electronic device is abnormal;

to obtain the sensing data, the at least one processor is further configured to direct the system to perform additional operations including:

in response to a determination that the electronic device is abnormal, obtaining at least one target environmental parameter of a current surrounding of the electronic device, wherein the at least one target environmental parameter is related to the abnormality of the electronic device;

to determine whether the sensing data satisfies a preset condition, the at least one processor is further configured to direct the system to perform additional operations including:

determining whether an abnormality of the electronic device is caused by the at least one target environmental parameter; and to control the electronic device to execute a preset operation, the at least one processor is further configured to direct the system to perform additional operations including:

in response to a determination that the abnormality of the electronic device is caused by the at least one target environmental parameter, reminding a user that the abnormality of the electronic device is related to the at least one target environmental parameter.

\* \* \* \* \*